(12) United States Patent
Liu et al.

(10) Patent No.: US 12,278,985 B2
(45) Date of Patent: Apr. 15, 2025

(54) SYNTAX REUSE FOR AFFINE MODE WITH ADAPTIVE MOTION VECTOR RESOLUTION

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/350,554

(22) Filed: Jul. 11, 2023

(65) Prior Publication Data

US 2024/0015320 A1  Jan. 11, 2024

Related U.S. Application Data

(63) Continuation of application No. 17/326,616, filed on May 21, 2021, now abandoned, which is a
(Continued)

(30) Foreign Application Priority Data

Sep. 19, 2018 (WO) ................ PCT/CN2018/106513
Feb. 1, 2019 (WO) ................ PCT/CN2019/074433

(51) Int. Cl.
*H04N 19/52* (2014.01)
*H04N 19/132* (2014.01)
(Continued)

(52) U.S. Cl.
CPC .......... *H04N 19/52* (2014.11); *H04N 19/132* (2014.11); *H04N 19/137* (2014.11);
(Continued)

(58) Field of Classification Search
None
See application file for complete search history.

(56) References Cited

U.S. PATENT DOCUMENTS 5,761,343 A    6/1998  Haruma
8,891,608 B2   11/2014 Lin
(Continued)

FOREIGN PATENT DOCUMENTS

CN    1550110 A    11/2004
CN    102291581 A  12/2011
(Continued)

OTHER PUBLICATIONS

US 11,303,901 B2, 04/2022, Liu et al. (withdrawn)
(Continued)

*Primary Examiner* — Tyler W. Sullivan
(74) *Attorney, Agent, or Firm* — Conley Rose, P.C.

(57) ABSTRACT

A method for video processing is disclosed to include: determining, for a conversion between a coded representation of a current block of a video and the current block, a motion vector difference (MVD) precision to be used for the conversion from a set of allowed multiple MVD precisions applicable to a video region containing the current video block; and performing the conversion based on the MVD precision.

20 Claims, 37 Drawing Sheets

Related U.S. Application Data continuation of application No. 16/814,840, filed on Mar. 10, 2020, now abandoned, which is a continuation of application No. PCT/IB2019/057897, filed on Sep. 19, 2019.

(51) Int. Cl.

| | | |
|---|---|---|
| *H04N 19/137* | (2014.01) | |
| *H04N 19/159* | (2014.01) | |
| *H04N 19/176* | (2014.01) | |
| *H04N 19/184* | (2014.01) | |
| *H04N 19/186* | (2014.01) | |
| *H04N 19/513* | (2014.01) | |
| *H04N 19/523* | (2014.01) | |
| *H04N 19/53* | (2014.01) | |
| *H04N 19/56* | (2014.01) | |
| *H04N 19/567* | (2014.01) | |
| *H04N 19/70* | (2014.01) | |
| *G06T 7/223* | (2017.01) | |
| *H04N 19/139* | (2014.01) | |

(52) U.S. Cl.
CPC ......... *H04N 19/159* (2014.11); *H04N 19/176* (2014.11); *H04N 19/184* (2014.11); *H04N 19/186* (2014.11); *H04N 19/513* (2014.11); *H04N 19/53* (2014.11); *H04N 19/56* (2014.11); *H04N 19/70* (2014.11); *G06T 7/223* (2017.01); *H04N 19/139* (2014.11); *H04N 19/523* (2014.11); *H04N 19/567* (2014.11)

(56) References Cited

U.S. PATENT DOCUMENTS

| | | | |
|---|---|---|---|
| 9,930,358 B2 | 3/2018 | Kim | |
| 10,306,240 B2 | 5/2019 | Xiu | |
| 10,448,010 B2 | 10/2019 | Chen | |
| 10,455,231 B2 | 10/2019 | Xu | |
| 10,523,964 B2 | 12/2019 | Chuang | |
| 10,560,712 B2 | 2/2020 | Zou | |
| 10,609,384 B2 | 3/2020 | Chen | |
| 10,757,417 B2 | 8/2020 | Zhang | |
| 10,778,999 B2 | 9/2020 | Li | |
| 10,841,609 B1 | 11/2020 | Liu | |
| 10,880,547 B2 | 12/2020 | Xu | |
| 10,979,732 B2 | 4/2021 | Chen | |
| 11,109,055 B2 | 8/2021 | Liu | |
| 11,245,921 B2 | 2/2022 | Robert | |
| 11,265,573 B2 | 3/2022 | Liu | |
| 11,330,289 B2 | 5/2022 | Liu | |
| 11,356,693 B2 * | 6/2022 | Chien | H04N 19/52 |
| 11,431,965 B2 | 8/2022 | Liu | |
| 11,477,458 B2 | 10/2022 | Liu | |
| 11,653,020 B2 | 5/2023 | Liu et al. | |
| 12,108,072 B2 | 10/2024 | Liu et al. | |
| 2007/0025442 A1 | 2/2007 | Okada | |
| 2009/0092189 A1 | 4/2009 | Tsuchiya | |
| 2009/0168868 A1 | 7/2009 | Jahanghir | |
| 2011/0176611 A1 | 7/2011 | Huang | |
| 2012/0093226 A1 | 4/2012 | Chien | |
| 2012/0300839 A1 | 11/2012 | Sze | |
| 2013/0170553 A1 | 7/2013 | Chen et al. | |
| 2013/0177084 A1 | 7/2013 | Wang | |
| 2013/0287116 A1 | 10/2013 | Helle | |
| 2015/0092833 A1 | 4/2015 | Ku | |
| 2015/0092834 A1 | 4/2015 | Cote | |
| 2015/0124882 A1 | 5/2015 | Yu | |
| 2015/0195562 A1 | 7/2015 | Li | |
| 2015/0264348 A1 | 9/2015 | Zou | |
| 2015/0264386 A1 | 9/2015 | Pang et al. | |
| 2015/0373358 A1 | 12/2015 | Pang | |
| 2015/0382010 A1 | 12/2015 | Rapaka et al. | |
| 2016/0007046 A1 | 1/2016 | Chou | |
| 2016/0100189 A1 | 4/2016 | Pang | |
| 2016/0323600 A1 | 11/2016 | Ma | |
| 2016/0337649 A1 | 11/2016 | Chuang | |
| 2016/0337662 A1 | 11/2016 | Pang | |
| 2016/0353110 A1 | 12/2016 | Zhang | |
| 2016/0360210 A1 | 12/2016 | Xiu et al. | |
| 2017/0099495 A1 | 4/2017 | Rapaka | |
| 2017/0332095 A1 | 11/2017 | Zou | |
| 2017/0347116 A1 | 11/2017 | Lin | |
| 2018/0070102 A1 | 3/2018 | Zhang | |
| 2018/0091816 A1 | 3/2018 | Chien | |
| 2018/0098063 A1 | 4/2018 | Chen | |
| 2018/0098089 A1 | 4/2018 | Chen | |
| 2018/0131940 A1 | 5/2018 | Misra | |
| 2018/0160134 A1 | 6/2018 | Zhang | |
| 2018/0192053 A1 | 7/2018 | Zhou | |
| 2018/0278949 A1 | 9/2018 | Karczewicz | |
| 2018/0324463 A1 | 11/2018 | Zhang | |
| 2018/0324464 A1 | 11/2018 | Zhang | |
| 2018/0359483 A1 | 12/2018 | Chen | |
| 2018/0359485 A1 | 12/2018 | Liu | |
| 2019/0045193 A1 | 2/2019 | Socek | |
| 2019/0045214 A1 | 2/2019 | Ikai | |
| 2019/0058896 A1 | 2/2019 | Huang | |
| 2019/0075293 A1 | 3/2019 | Lim | |
| 2019/0082191 A1 | 3/2019 | Chuang | |
| 2019/0089960 A1 | 3/2019 | Chen | |
| 2019/0089974 A1 | 3/2019 | Lee | |
| 2019/0110076 A1 | 4/2019 | Lim | |
| 2019/0191167 A1 | 6/2019 | Drugeon | |
| 2019/0215534 A1 | 7/2019 | Kondo | |
| 2019/0222865 A1 | 7/2019 | Zhang | |
| 2019/0238864 A1 | 8/2019 | Xiu | |
| 2019/0246143 A1 | 8/2019 | Zhang | |
| 2019/0349588 A1 | 11/2019 | Chen | |
| 2019/0373280 A1 | 12/2019 | Abe | |
| 2019/0387247 A1 | 12/2019 | Huang | |
| 2019/0387250 A1 | 12/2019 | Boyce | |
| 2020/0021837 A1 | 1/2020 | Ikai | |
| 2020/0029091 A1 | 1/2020 | Chien | |
| 2020/0045310 A1 | 2/2020 | Chen | |
| 2020/0137398 A1 | 4/2020 | Zhao | |
| 2020/0145688 A1 | 5/2020 | Zou | |
| 2020/0177877 A1 | 6/2020 | Chen | |
| 2020/0186802 A1 | 6/2020 | Chuang | |
| 2020/0213594 A1 | 7/2020 | Liu | |
| 2020/0213612 A1 | 7/2020 | Liu | |
| 2020/0221117 A1 | 7/2020 | Liu | |
| 2020/0259045 A1 | 8/2020 | Kim | |
| 2020/0267408 A1 | 8/2020 | Lee | |
| 2020/0275094 A1 | 8/2020 | Lee | |
| 2020/0275117 A1 | 8/2020 | Jeong | |
| 2020/0288141 A1 | 9/2020 | Chono | |
| 2020/0304805 A1 | 9/2020 | Li | |
| 2020/0351513 A1 | 11/2020 | Lee | |
| 2020/0359029 A1 | 11/2020 | Liu | |
| 2020/0374551 A1 | 11/2020 | Chiang | |
| 2020/0382771 A1 | 12/2020 | Liu | |
| 2020/0382795 A1 | 12/2020 | Zhang | |
| 2020/0396453 A1 | 12/2020 | Zhang | |
| 2020/0396465 A1 | 12/2020 | Zhang | |
| 2020/0396477 A1 | 12/2020 | Furht | |
| 2020/0404253 A1 | 12/2020 | Chen | |
| 2020/0404255 A1 | 12/2020 | Zhang | |
| 2020/0404260 A1 | 12/2020 | Zhang | |
| 2020/0413040 A1 | 12/2020 | Lim | |
| 2020/0413048 A1 | 12/2020 | Zhang | |
| 2020/0413078 A1 | 12/2020 | Li | |
| 2021/0092366 A1 | 3/2021 | Liu | |
| 2021/0127112 A1 | 4/2021 | Choi | |
| 2021/0136390 A1 | 5/2021 | Chuang | |
| 2021/0195200 A1 | 6/2021 | Chen | |
| 2021/0211707 A1 | 7/2021 | Liu | |
| 2021/0266588 A1 | 8/2021 | Liu | |
| 2021/0289225 A1 | 9/2021 | Liu | |
| 2021/0314596 A1 | 10/2021 | Wang | |
| 2021/0314623 A1 | 10/2021 | Chang | |
| 2021/0360256 A1 | 11/2021 | Liu | |
| 2021/0360279 A1 | 11/2021 | Liu | |

(56) References Cited

U.S. PATENT DOCUMENTS

| | | | |
|---|---|---|---|
| 2021/0368198 A1 | 11/2021 | Zhang | |
| 2022/0021885 A1 | 1/2022 | Liu | |
| 2022/0116662 A1* | 4/2022 | Chen | H04N 19/13 |
| 2022/0150505 A1 | 5/2022 | Luo | |
| 2022/0248048 A1 | 8/2022 | Zeng | |
| 2022/0264144 A1 | 8/2022 | Liu | |
| 2023/0115118 A1* | 4/2023 | Wang | H04N 19/189 375/240.02 |
| 2024/0205461 A1* | 6/2024 | Chen | H04N 19/46 |

FOREIGN PATENT DOCUMENTS

| | | |
|---|---|---|
| CN | 102783149 A | 11/2012 |
| CN | 103561263 A | 2/2014 |
| CN | 103621099 A | 3/2014 |
| CN | 103733625 | 4/2014 |
| CN | 103733625 A | 4/2014 |
| CN | 103797799 A | 5/2014 |
| CN | 103988437 A | 8/2014 |
| CN | 104221374 A | 12/2014 |
| CN | 104303506 A | 1/2015 |
| CN | 104335586 A | 2/2015 |
| CN | 104363451 A | 2/2015 |
| CN | 104521237 A | 4/2015 |
| CN | 104620576 A | 5/2015 |
| CN | 104662906 A | 5/2015 |
| CN | 104768016 A | 7/2015 |
| CN | 105163116 A | 12/2015 |
| CN | 105532000 A | 4/2016 |
| CN | 105556964 A | 5/2016 |
| CN | 105874789 A | 8/2016 |
| CN | 105900420 A | 8/2016 |
| CN | 106165419 A | 11/2016 |
| CN | 106303543 A | 1/2017 |
| CN | 106471806 A | 3/2017 |
| CN | 106797229 A | 5/2017 |
| CN | 106797476 A | 5/2017 |
| CN | 107113424 A | 8/2017 |
| CN | 107113442 A | 8/2017 |
| CN | 107257480 A | 10/2017 |
| CN | 107431820 A | 12/2017 |
| CN | 107710761 A | 2/2018 |
| CN | 107979756 A | 5/2018 |
| CN | 108028919 A | 5/2018 |
| CN | 108235007 A | 6/2018 |
| CN | 108353176 A | 7/2018 |
| CN | 108432250 A | 8/2018 |
| CN | 108781284 A | 11/2018 |
| CN | 109155855 A | 1/2019 |
| CN | 109417631 A | 3/2019 |
| EP | 1469682 A1 | 10/2004 |
| EP | 3203743 A1 | 8/2017 |
| EP | 3291557 A1 | 3/2018 |
| EP | 3301918 A1 | 4/2018 |
| GB | 2539212 A | 12/2016 |
| GB | 2539213 A | 12/2016 |
| JP | 2012060208 A | 3/2012 |
| JP | 2018524918 A | 8/2018 |
| JP | 2021526340 A | 9/2021 |
| JP | 7568753 B2 | 10/2024 |
| JP | 7583084 B2 | 11/2024 |
| TW | 201739252 A | 11/2017 |
| TW | 201818719 A | 5/2018 |
| TW | 201902222 A | 1/2019 |
| WO | 2007003340 A2 | 1/2007 |
| WO | 2013006473 A1 | 1/2013 |
| WO | 2013168407 A1 | 11/2013 |
| WO | 2015131388 A1 | 9/2015 |
| WO | 2016183224 A1 | 11/2016 |
| WO | 2017052000 A1 | 3/2017 |
| WO | 2017082443 A1 | 5/2017 |
| WO | 2017156705 A1 | 9/2017 |
| WO | 2017194773 A1 | 11/2017 |
| WO | WO-2017200771 A1 * | 11/2017 ........... H04N 19/124 |
| WO | 2018002021 A1 | 1/2018 |
| WO | 2018047668 A1 | 3/2018 |
| WO | 2018064524 A1 | 4/2018 |
| WO | 2018065296 A1 | 4/2018 |
| WO | 2018067672 A1 | 4/2018 |
| WO | 2018095313 A1 | 5/2018 |
| WO | 2018110203 A1 | 6/2018 |
| WO | 2018117546 A1 | 6/2018 |
| WO | 2018169923 A1 | 9/2018 |
| WO | 2018175720 A1 | 9/2018 |
| WO | 2019235896 A1 | 12/2019 |
| WO | 2020009446 A1 | 1/2020 |
| WO | 2020047132 A1 | 3/2020 |
| WO | 2020131659 A2 | 6/2020 |
| WO | 2020132272 A1 | 6/2020 |

OTHER PUBLICATIONS

Non-Final Office Action from U.S. Appl. No. 17/490,806 dated Oct. 18, 2022.

International Search Report and Written Opinion from International Patent Application No. PCT/CN2020/074122 dated Apr. 1, 2020 (10 pages).

International Search Report and Written Opinion from International Patent Application No. PCT/CN2020/074123 dated Apr. 30, 2020 (9 pages).

International Search Report and Written Opinion from International Patent Application No. PCT/CN2020/074135 dated Apr. 22, 2020 (10 pages).

International Search Report and Written Opinion from PCT/IB2019/057897 dated Jan. 2, 2020 (21 pages).

International Search Report and Written Opinion from PCT/I82019/057895 dated Jan. 2, 2020 (18 pages).

International Search Report and Written Opinion from PCT/I82019/057892 dated Feb. 25, 2020 (21 pages).

Notice of Allowance from U.S. Appl. No. 16/814,832 dated Oct. 28, 2020.

Final Office Action from U.S. Appl. No. 17/229,064 dated Oct. 29, 2021.

Li et al. "Adaptive Motion Vector Resolution for Screen Content," Joint Collaborative Team on Video Coding (JCT-VC) of ITU-T SG 16 WP 3 and ISO/IEC JTC 1/SC 29/WG 11, 19th Meeting, Strasbourg, FR, Oct. 17-24, 2014, document JCTVC-S0085, 2014.

Notice of Allowance from U.S. Appl. No. 17/229,064 dated Mar. 16, 2022.

Non-Final Office Action from U.S. Appl. No. 17/386,346 dated Aug. 29, 2023.

Non-Final Office Action from U.S. Appl. No. 17/729,284 dated Aug. 31, 2023.

Non-Final Office Action from U.S. Appl. No. 17/326,616 dated Nov. 23, 2022.

Non-Final Office Action from U.S. Appl. No. 17/490,806 dated Jul. 10, 2023.

Document: JVET-N0434, Yang, Y., et al., "Non-CE4: Unified context model of AMVR and Affine AMVR," Joint Video Experts Team (JVET) of ITU-T SG 16 WP 3 and ISO/IEC JTC 1/SC 29/WG 11 14th Meeting: Geneva, CH, Mar. 19-27, 2019, 3 pages.

Document: JVET-K1001-v5, Bross, B., et al., "Versatile Video Coding (Draft 2)," Joint Video Experts Team (JVET) of ITU-T SG 16 WP 3 and ISO/IEC JTC 1/SC 29/WG 11 11th Meeting: Ljubljana, SI, Jul. 10-18, 2018, 131 pages.

Document: JVET-M0453-v3, Bossen, F., et al., "CE5 on arithmetic coding: experiments 5.1.1, 5.1.2, 5.1.3, 5.1.4, 5.1.5, 5.1.6, 5.1.7, 5.1.8, 5.1.10, 5.1.11, 5.1.12, 5.1.13, 5.2, and more," Joint Video Experts Team (JVET) of ITU-T SG 16 WP 3 and ISO/IEC JTC 1/SC 29/WG 11 13th Meeting: Marrakech, MA, Jan. 9-18, 2019, 28 pages.

Document: JVET-M0246-r1, Liu, H., et al., "CE2: Adaptive Motion Vector Resolution for Affine Inter Mode (Test 2.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, 13 pages.

(56) References Cited

OTHER PUBLICATIONS

Document: JVET-L1001-v9, Bross, B., et al., "Versatile Video Coding (Draft 3)," Joint Video Experts Team (JVET) of ITU-T SG 16 WP 3 and ISO/IEC JTC 1/SC 29/WG 11 12th Meeting: Macao, CN, Oct. 3-12, 2018, 11 pages.

Document: JVET-M0453-v2, Bossen, F., et al., "CE5 on arithmetic coding: experiments 5.1.1, 5.1.2, 5.1.3, 5.1.4, 5.1.5, 5.1.6, 5.1.7, 5.1.8, 5.1.10, 5.1.11, 5.1.12, 5.1.13, 5.2, and more," Joint Video Experts Team (JVET) of ITU-T SG 16 WP 3 and ISO/IEC JTC 1/SC 29/WG 11 13th Meeting: Marrakech, MA, Jan. 9-18, 2019, 28 pages.

Final Office Action from U.S. Appl. No. 17/386,346 dated Jan. 25, 2024, 27 pages.

Notice of Allowance from U.S. Appl. No. 17/490,806 dated Feb. 14, 2024, 16 pages.

ITU-T H.265 "High efficiency video coding" Series H: Audiovisual and Multimedia Systems Infrastructure of audiovisual services—Coding of movingvideo, Telecommunicationstandardization Sectorof ITU, Feb. 2018).

C. Rosewarne et al. "High Efficiency Video Coding (HEVC) Test Model 16 (HM 16) Improved Encoder Description Update 7" Joint Collaborative Team on Video Coding (JCT-VC) of ITU-T SG16 WP3 and ISO/IEC JTC1/SC29/WG 11 25th Meeting: Chengdu, Cn, (JCTVC-Y1002), (Oct. 2016).

J. Chen et al. "Algorithm description of Joint Exploration Test Model 7 (JEM7)" MPEG Meeting (JVET-G1001-v1), Jul. 2017.

JEM-7.0: https://jvet.hhi.fraunhofer.de/svn/svn_HMJEMSoftware/tags/ HM-16.6-38JEM-7.0, May 20, 2021.

Yu Han et al. "CE4.1.3: Affine motion compensation prediction" Joint Video Exploration Team (JVET)of ITU-T SG 16 WP 3 and ISO/IEC JTC 1/SC 29/WG 1111th Meeting: Ljubljana, SI, (JVET-K0337), (Jul. 2018).

L. Li, H. Li etc., "An Efficient Four-Parameter Affine Motion Model for Video Coding," IEEE Transactions on Circuits and Systems for Video Technology, vol. 28, Issue: 8, Aug. 2018.

Sri Nitchith Akula, et al. "Description of SOR, HOR and 360° video coding technology proposal considering mobile i: Application scenario by Samsung, Huawei, GoPro, and HiSilicon" (JVET)of ITU-T SG 16 WP 3 and ISO/IEC JTC 1/SC 29/WG 1110th Meeting: San Diego, US, (JVET-J0024_v2), (Apr. 2018).

Huanbang Chen, et al. ""CE4: Symmetrical MVD mode (Test 4.4.3)"" (JVET) of ITU-T SG 16 WP 3 and ISO/IEC JTC/SC 29/WG 1113th Meeting: Marrakech, MA, (JVET-M0481), (Jan. 2019).

Jiancong Luo et al. "CE2-related: Symmetric MVD for Affine Bi-prediction Coding" Joint Video Experts Team (JVET) of ITU-T SG 16 WP 3 and ISO/IEC JTC 1/SC 29/WG 1113th Meeting: Marrakech, MA, (JVET-M0467), (Jan. 2019).

Jicheng An et al. "Progressive MV Resolution" (JCT-VG) of ITU-T SG16 WP3 and ISO/IEC JTC1/SC29/WG11, 6th Meeting: Torino, IT, (JCTVC-F125), (Jul. 2011).

Chen-Yen Lai et al. "CE4.3.4: Removal of AMVR flag constraint" (JVET) of ITU-T SG 16 WP 3 and ISO/IEC JTC 1/SC 29/WG 11, 11th Meeting: Ljubljana, SI, (JVET-K0247-v1), (Jul. 2018).

Yuwen He et al. "CE4-related: Adaptive precision for affine MVD coding" (JVET) of ITU-T SG 16 WP 3 and ISO/IEC JTC 1/SC 29/WG 11, 12th Meeting: Macao, CN, (JVET-L0259), (Oct. 2018).

Weijia Zhu et al. "Simplified HMVP" Joint Video Experts Team (JVET)of ITU-T SG 16 WP 3 and ISO/IEC JTC 1/SC 9/WG 11 13th Meeting: Marrakech, MA, (JVET-M0473-v2), (Jan. 2019).

Luo, Jiancong et al. CE4-related: Simplified symmetric MVD based on CE4.4.3 Joint Video Experts Team(JVET)of ITU-T SG 16 WP 3 and ISO/IEC JTC 1/SC 29/WG 11, 13th Meeting: Marrakech, MA, Jan. 9-18, 2019, Document JVET-M0444 Jan. 18, 2019.

Chen, Huabang et al. CE4: symmetrical mode for bi-prediction (Test3.2) Joint Video Experts Team (JVET) of ITU-T-SG16 WP3 and ISO/IEC JTC 1/SC 29/WG11, 11th Meeting :Ljubljana SI, Jul. 10-18, 2018, Document: JVET-K0188 Jul. 18, 2018.

Liu et al. "CE2: Adaptive Motion Vector Resolution for Affine Inter Mode (Test 2.1.2)," Joint Video Experts Team (JVET) of ITU-T SG 16 WP 3 and ISO/IEC JTC 1/SC 29/WG 11, 13th Meeting: Marrakech, MA, Jan. 9-18, 2019, Document No. JVET-M0246.

Liu et al. CE4-Related:Adaptive Motion Vector Resolution for Affine Inter Mode, Joint Video Experts Team (JVET) of ITU-T SG 16 WP 3 and ISO/IEC JTC 1/SC 29/WG 11, 12th Meeting: Macao, Oct. 2018, Document No. JVET-L0332.

Specification of U.S. Appl. No. 62/724,500 supporting WO2020/047132, 2018.

Bross et al. "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1001, 2018.

Alshin A et al. "Description of SDR, HDR and 360 degree video coding technology proposal by considering mobile application sceniario by Samsung, Huawei, GoPro, and HiSilicon," 10, JVET Meeting; Apr. 10-20, 2018; San Diego, the Joint Video Exploration Team of ISO/IEC JTC1/SC29/WG11 and ITU-T SG.16; URL: http://phenix.int-evry.fr/jvet/ . . . , No. JVET-J0024-v2; Apr. 14, 2018.

Alshin A et al. "Description of SDR, HDR and 360 degree video coding technology proposal by Samsung, Huawei, GoPro, and HiSilicon Mobile Application Scenario", 10 JVET Meeting; Apr. 10-20, 2018; San Diego, the Joint Video Exploration Team of ISO/IEC JTC1/SC29/WG11 and ITU-T SG.16; URL: http://phenix.int-evry.fr/jvet/ . . . , No. JVETJ0024-v5; Apr. 14, 2018.

Rosewarne C et al. "High Efficiency Video Coding (HEVC) Test Model 16 (HM16) Encoder Description Update 9", 28, JCT-VC Meeting; Jul. 15-21, 2017; Torino, Joint Collaborative Team on Video Coding of ISO-IEC JTC1/SC29/WG11 and ITU-T SG.16, JCTVC-AB1002, Jul. 21, 2017, Retrieved from the internet: URL:http://wftp3.itu.int/av-arch/jctvc-site/.

Wang et al. "Adaptive Motion Vector Resolution Prediction in Block-based Video Coding," 2015 Visual Communications and Image Processing (VCIP), IEEE, Dec. 13, 2015, pp. 1-4, XP032894127.

Xu et al. "Intra Block Copy in HEVC Screen Content Coding Extensions," IEEE Journal on Emerging and Selected Topics in Circuits and Systems, IEEE, Piscataway, NJ, USA, 6(4):409-419; Dec. 1, 2016.

Luo et al. "CE2-related: Symmetric MVD for Affine Bi-prediction Coding" Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0467, Jan. 2019.

Sri Nitchith Akula et al. "Description of SOR, HOR and 360° video coding technology proposal considering mobile application scenario by Samsung, Huawei, GoPro, and HiSilicon" (JVET)of ITU-T SG 16 WP 3 and ISO/IEC JTC 1/SC 9/WG 111oth Meeting: San Diego, US, (JVET-J0024_v2), (Apr. 2018).

Huang et al. "Control-Point Representation and Differential Coding Affine-Motion Compensation," IEEE Transactions on Circuits and Systems for Video Technology, Oct. 2013, 23(10):1651-1660.

Zhu et al. "Simplified HMVP" Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0473, Jan. 2019.

English Translation of WO2020/009446 A1 provided by STIC (Year: 2018).

Chen et al. "EE4: Enhanced Motion Vector Difference Coding," Joint Video Exploration Team (JVET) of ITU-T SG 16 WP 3 and 1SO/IEC JTC 1/SC 29/WG 11 5th Meeting: Geneva, CH, Jan. 12-20, 2017, document JVET-E0076, 2011.

Chen et al. "Description of SOR, HOR and 360° Video Coding Technology Proposal by Qualcomm and Technicolor—Low and High Complexity Versions," Joint Video Exploration Team (JVET) of ITU-T SG 16 WP 3 and ISO/IEC JTC 1/SC 29/WG 11 1oth Meeting: San Diego, US, Apr. 10-20, 2018, document JVET-J0021, 2018.

Extended European Search Report from European Patent Application No. 20749576.3 dated Jul. 11, 2022 (11 pages).

Final Office Action from U.S. Appl. No. 17/204,448 dated Aug. 15, 2022.

International Search Report and Written Opinion from PCT/IB2019/055131 dated Nov. 25, 2019, (18 pages).

(56) References Cited

OTHER PUBLICATIONS

International Search Report and Written Opinion from PCT/IB2019/055132 dated Nov. 25, 2019, (19 pages).
International Search Report and Written Opinion from PCT/IB2019/055134 dated Nov. 20, 2019, (18 pages).
International Search Report and Written Opinion from PCT/IB2019/055135 dated Nov. 20, 2019, (18 pages).
International Search Report and Written Opinion from PCT/IB2019/055141 dated Nov. 25, 2019, (19 pages).
International Search Report and Written Opinion from PCT/CN2020/074135 dated Apr. 22, 2020 (10 pages).
Non-Final Office Action from U.S. Appl. No. 16/940,959 dated Sep. 24, 2020.
Non-Final Office Action from U.S. Appl. No. 16/814,840 dated Sep. 29, 2020.
Final Office Action from U.S. Appl. No. 16/814,840 dated Jan. 21, 2021.
Non-Final Office Action from U.S. Appl. No. 16/814,832 dated Apr. 15, 2021.
Non-Final Office Action from U.S. Appl. No. 17/229,064 dated Jun. 15, 2021.
Notice of Allowance from U.S. Appl. No. 16/940,959 dated Jun. 23, 2021.
Corrected Notice of Allowability from U.S. Appl. No. 16/940,959 dated Feb. 25, 2022.
Non-Final Office Action from U.S. Appl. No. 17/204,448 dated Mar. 1, 2022.
Chinese Office Action from Chinese Application No. 202080011162.9 dated Apr. 20, 2024, 18 pages.
Extended European Search Report from European Application No. 23219635.2 dated Apr. 17, 2024, 14 pages.
Notice of Allowance from U.S. Appl. No. 17/729,284 dated Mar. 25, 2024, 24 pages.
Corrected Notice of Allowability for U.S. Appl. No. 16/940,595, mailed Feb. 25, 2022, 15 Pages.
"Series H: Audiovisual And Multimedia Systems Infrastructure Of Audiovisual Services—Coding of Moving Video," Telecommunication Standardization Sector Of ITU, Infrastructure of Audio Services—Coding of Moving Video, High Efficiency Video Coding, ITU-T H.265, CH, Nov. 2019, 712 Pages.
Bross B., "Versatile Video Coding (Draft 2)," Joint Video Experts Team (JVET) of ITU-T SG WP 3 ans ISO/IEC JTC 1/SC 29/WG 11, 11th Meeting: Ljubljana, SI, Jul. 10-18, 2018, Document JVET-K1001-v7,280 Pages.
Decision to Grant a Patent issued Japanese Application No. 2023-027696, mailed Oct. 2024, 6 pages.
Chinese Office Action from Chinese Patent Application No. 202080011121.X dated Dec. 26, 2024, 18 pages.
Chinese Office Action from Chinese Patent Application No. 202080013267.8 dated Dec. 27, 2024, 17 pages.
Certified Foreign Priority for International Application No. PCT/IB2019/055135, filed Jun. 19, 2019, 81 Pages.
Guo L., et al., "Adaptive Motion Vector Resolution with Implicit Signaling," Proceedings of 2010 17th IEEE International Conference on Image Processing (ICIP2010), HongKong, Piscataway, JN, USA, Sep. 26-29, 2010, pp. 2057-2060, 4 Pages, Sep. 1, 2010, XP055564982.
Han Y., et al., "CE4.1.3: Affine Motion Compensation Prediction," Joint Video Exploration Team (JVET) of ITU-T SG 16 WG 3 and ISO/IEC JTC 1/SC 29/WG 11, 11th Meeting: Ljubljana, SI, Jul. 10-18, 2018, Document JVET-K0337, 46 Pages.
International Search Report and Written Opinion for International Application No. PCT/CN2020/081575, mailed Jun. 22, 2020, 10 Pages.
International Search Report and Written Opinion for International Application No. PCT/CN2020/081580, mailed Jun. 22, 2020, 11 Pages.
ITU-T: "Series H: Audiovisual and Multimedia Systems, Infrastructure of Audiovisual Services—Coding of Moving Video, High Efficiency Video Coding," Recommendation ITU-T H.265 (V9) | ISO/IEC 23008-2 (in Force Edition), Sep. 2023, 718 Pages.
Zhang Y., et al., "Adaptive Motion Vector Resolution Rounding Align," Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0377, 9 Pages.

\* cited by examiner

| Merge_idx | L0 | L1 |
|---|---|---|
| 0 | mvL0_A,ref0 | - |
| 1 | - | mvL1_B,ref0 |
| 2 | | |
| 3 | | |
| 4 | | |

| Merge_idx | L0 | L1 |
|---|---|---|
| 0 | mvL0_A,ref0 | combine |
| 1 | mvL0_A,ref0 | mvL1_B,ref0 |
| 2 | | mvL1_B,ref0 |
| 3 | | |
| 4 | | |

FIG. 7

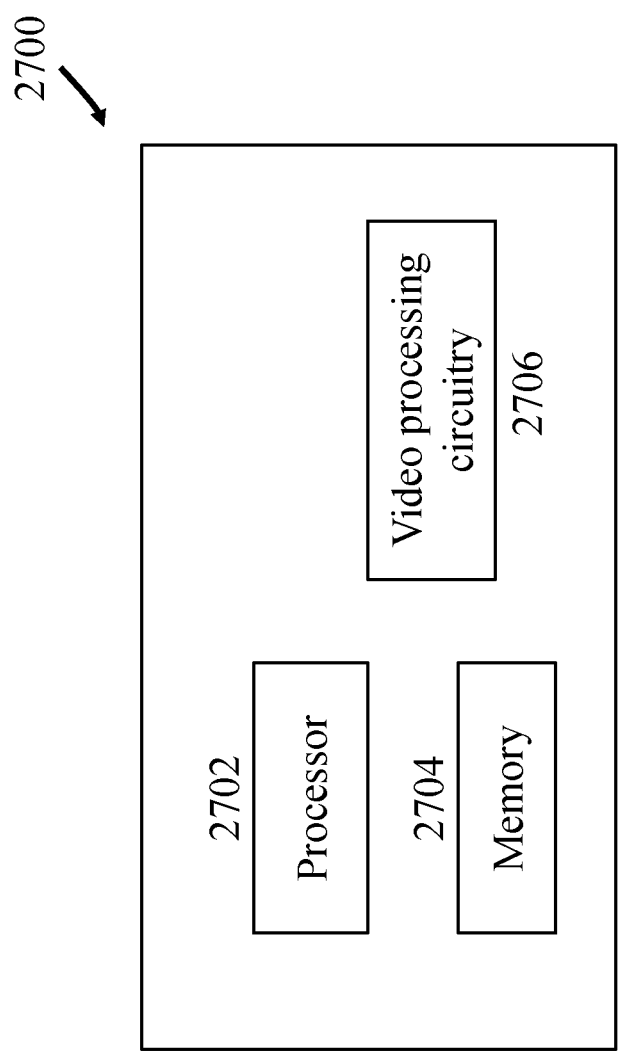

SYNTAX REUSE FOR AFFINE MODE WITH ADAPTIVE MOTION VECTOR RESOLUTION

CROSS-REFERENCE TO RELATED DOCUMENTS

This application is a continuation of U.S. application Ser. No. 17/326,616 filed on May 21, 2021, which is a continuation of U.S. application Ser. No. 16/814,840 filed on Mar. 10, 2020, which is a continuation of International Application No. PCT/IB2019/057897 filed Sep. 19, 2019, which claims the priority to and benefits of International Patent Application No. PCT/CN2018/106513, filed on Sep. 19, 2018, and International Patent Application No. PCT/CN2019/074433, filed on Feb. 1, 2019. For all purposes under the law, the entire disclosure of the aforementioned application is incorporated by reference as part of the disclosure of this application.

TECHNICAL FIELD

This patent document relates to video processing techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to motion vector predictor derivation and signaling for affine mode with adaptive motion vector resolution (AMVR) are described. The described methods may be applied to both the existing video coding standards (e.g., High Efficiency Video Coding (HEVC)) and future video coding standards or video codecs.

In one representative aspect, the disclosed technology may be used to provide a method for video processing. This method includes determining, for a conversion between a coded representation of a current block of a video and the current block, a motion vector difference (MVD) precision to be used for the conversion from a set of allowed multiple MVD precisions applicable to a video region containing the current video block; and performing the conversion based on the MVD precision.

In one representative aspect, the disclosed technology may be used to provide a method for video processing. This method includes determining, for a video region comprising one or more video blocks of a video and a coded representation of the video, a usage of multiple motion vector difference (MVD) precisions for the conversion of the one or more video blocks in the video region; and performing the conversion based on the determining.

In another representative aspect, the disclosed technology may be used to provide a method for video processing. This method includes determining, for a video region comprising one or more video blocks of a video and a coded representation of the video, whether to apply an adaptive motion vector resolution (AMVR) process to a current video block for a conversion between the current video block and the coded representation of the video; and performing the conversion based on the determining.

In another representative aspect, the disclosed technology may be used to provide a method for video processing. This method includes determining, for a video region comprising one or more video blocks of a video and a coded representation of the video, how to apply an adaptive motion vector resolution (AMVR) process to a current video block for a conversion between the current video block and the coded representation of the video; and performing the conversion based on the determining.

In one representative aspect, the disclosed technology may be used to provide a method for video processing. This method includes determining, based on a coding mode of a parent coding unit of a current coding unit that uses an affine coding mode or a rate-distortion (RD) cost of the affine coding mode, a usage of an adaptive motion vector resolution (AMVR) for a conversion between a coded representation of a current block of a video and the current block; and performing the conversion according to a result of the determining.

In one representative aspect, the disclosed technology may be used to provide a method for video processing. This method includes determining a usage of an adaptive motion vector resolution (AMVR) for a conversion between a coded representation of a current block of a video and the current block that uses an advanced motion vector prediction (AMVP) coding mode, the determining based on a rate-distortion (RD) cost of the AMVP coding mode; and performing the conversion according to a result of the determining.

In one representative aspect, the disclosed technology may be used to provide a method for video processing. This method includes generating, for a conversion between a coded representation of a current block of a video and the current block, a set of MV (Motion Vector) precisions using a 4-parameter affine model or 6-parameter affine model; and performing the conversion based on the set of MV precisions.

In one representative aspect, the disclosed technology may be used to provide a method for video processing. This method includes determining, based on a coding mode of a parent block of a current block that uses an affine coding mode, whether an adaptive motion vector resolution (AMVR) tool is used for a conversion, wherein the AMVR tool is used to refine motion vector resolution during decoding; and performing the conversion according to a result of the determining.

In one representative aspect, the disclosed technology may be used to provide a method for video processing. This method includes determining, based on a usage of MV precisions for previous blocks that has been previously coded using an affine coding mode, a termination of a rate-distortion (RD) calculations of MV precisions for a current block that uses the affine coding mode for a conversion between a coded representation of the current block and the current block; and performing the conversion according to a result of the determining.

In another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 7 shows an example of generating a combined bi-predictive merge candidate.

FIG. 27 is a block diagram of an example of a hardware platform for implementing a visual media decoding or a visual media encoding technique described in the present document.

DETAILED DESCRIPTION

Figure 1:
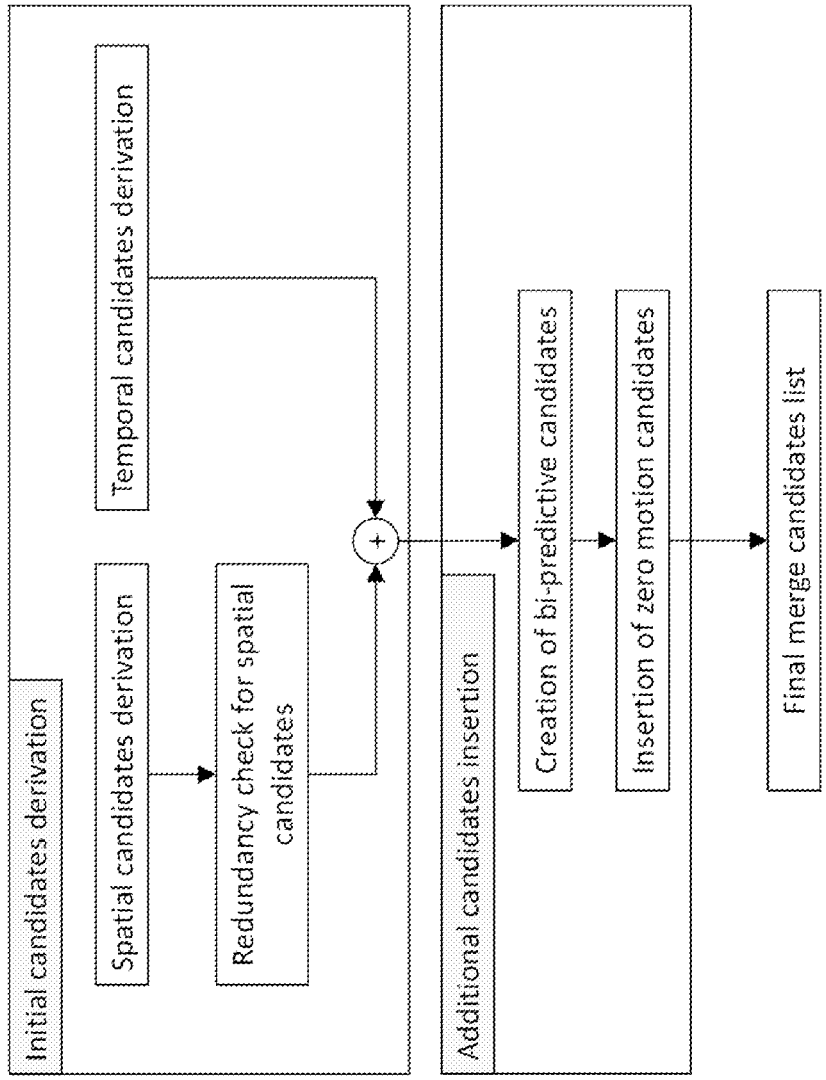
FIG. 1 shows an example of constructing a merge candidate list.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. EXAMPLES OF INTER-PREDICTION IN HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

1.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates FIG. 1 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

1.1.2 Constructing Spatial Merge Candidates

Figure 2:
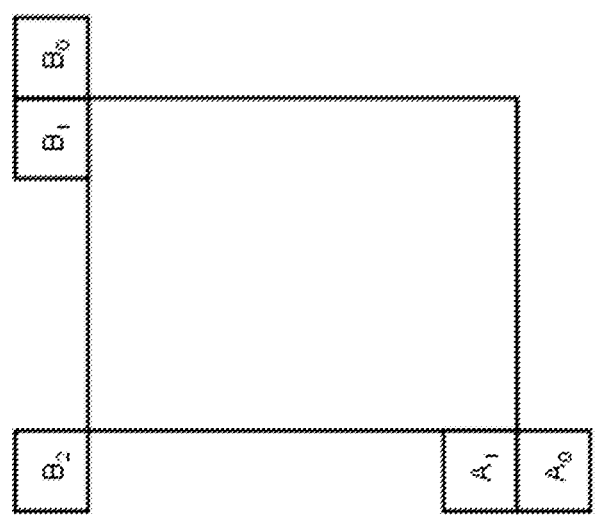
FIG. 2 shows an example of positions of spatial candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
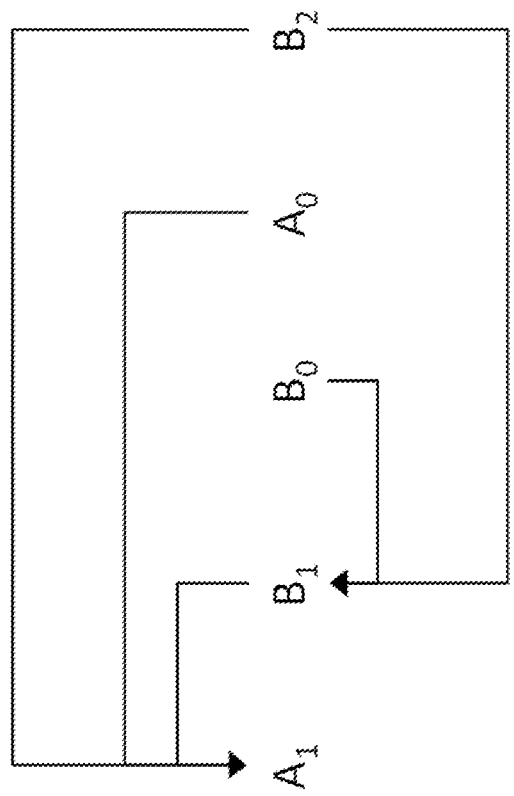
FIG. 3 shows an example of candidate pairs subject to a redundancy check of spatial merge candidates.
Figure 4B:
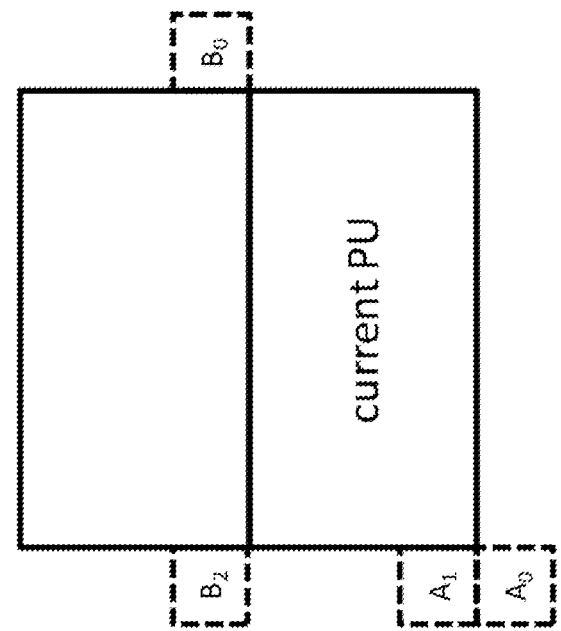
FIGS. 4A and 4B show examples of the position of a second prediction unit (PU) based on the size and shape of the current block.
Figure 4A:
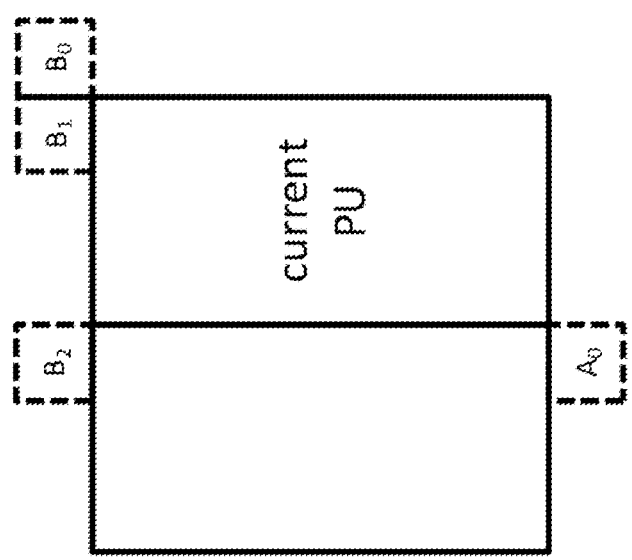

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_1$ is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header.

Figure 5:
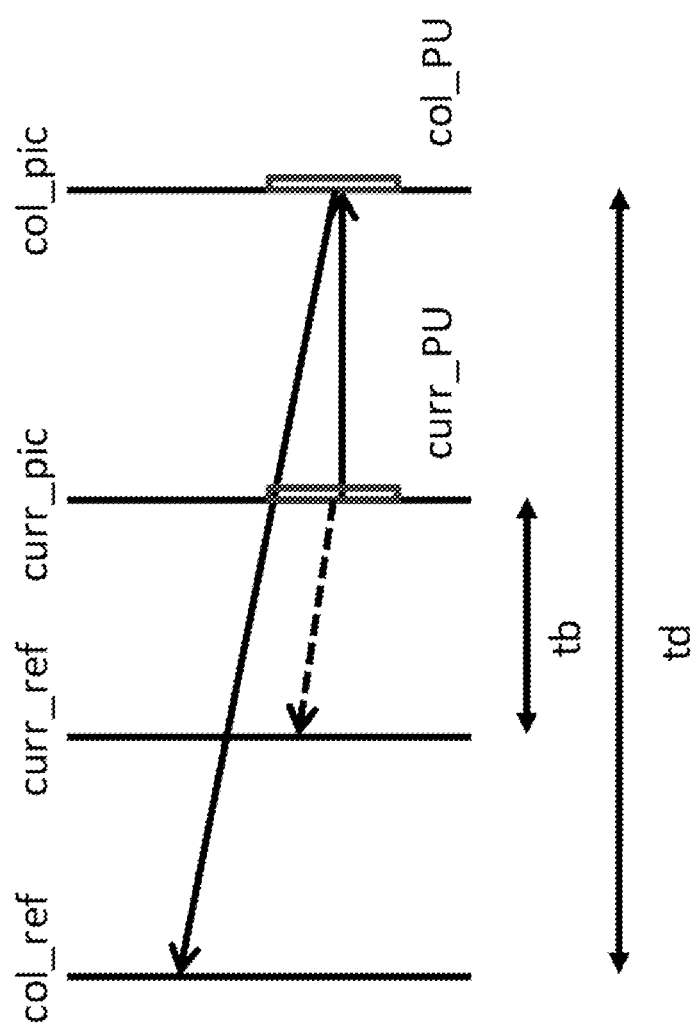
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 6:
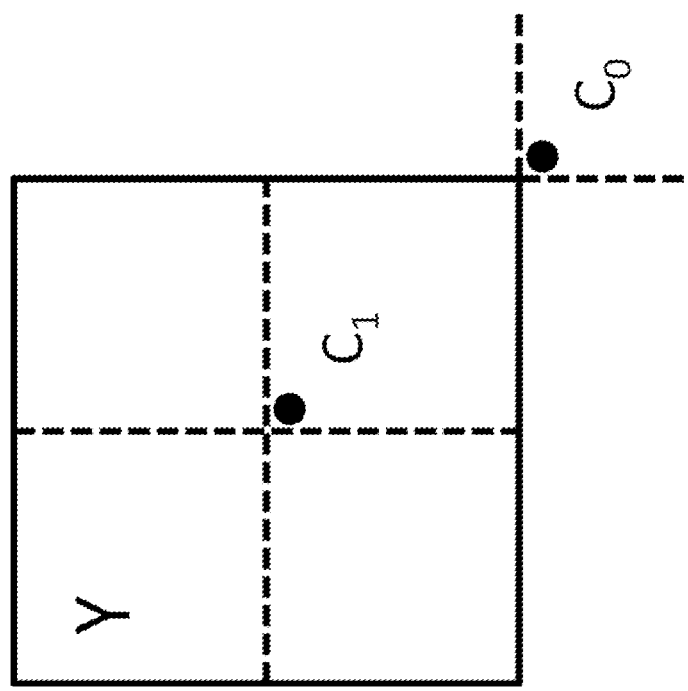
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU, position $C_1$ is used. Otherwise, position $C_0$ is used in the derivation of the temporal merge candidate.

1.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

1.1.5 Examples of Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, a motion estimation region (MER) may be defined. The size of the MER may be signaled in the picture parameter set (PPS) using the "log 2_parallel_merge_level_minus2" syntax element. When a MER is defined, merge candidates falling in the same region are marked as unavailable and therefore not considered in the list construction.

1.2 Embodiments of Advanced Motion Vector Prediction (AMVP)

AMVP exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

1.2.1 Examples of Constructing Motion Vector Prediction Candidates

Figure 8:
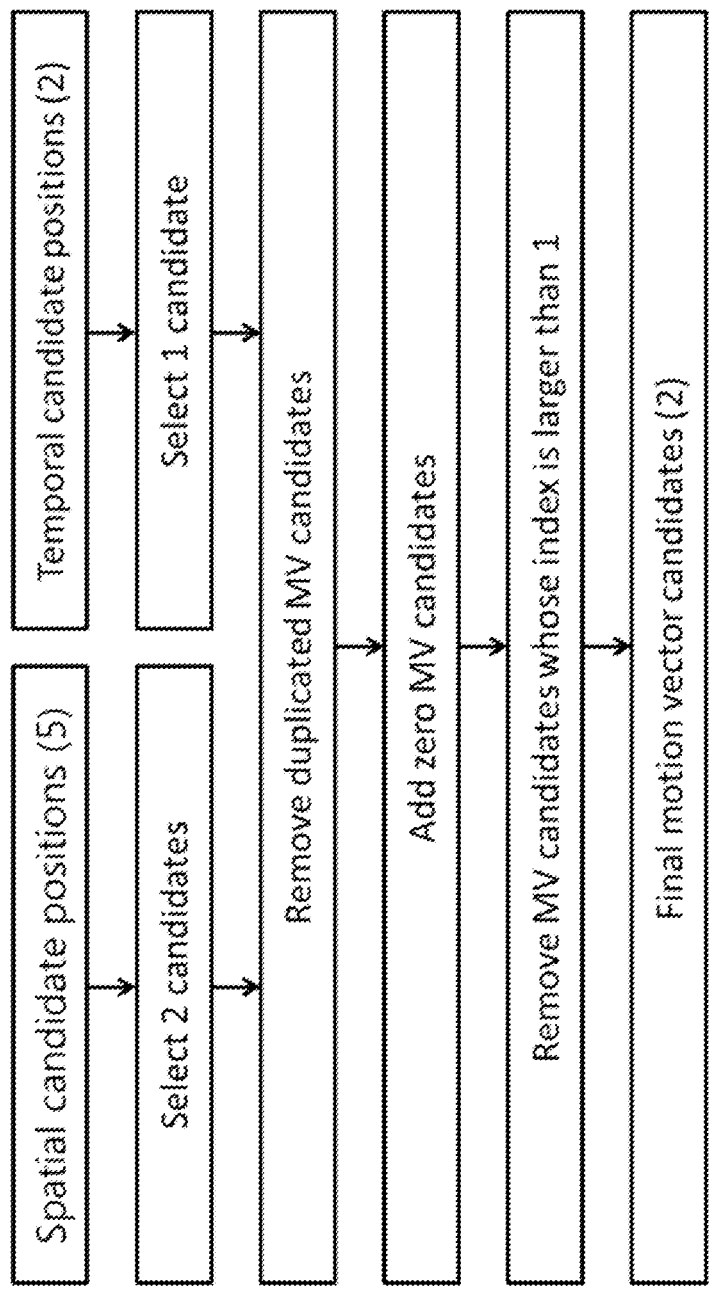
FIG. 8 shows an example of constructing motion vector prediction candidates.

FIG. 8 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No spatial scaling
(1) Same reference picture list, and same reference picture index (same POC)
(2) Different reference picture list, but same reference picture (same POC)

Spatial scaling
(3) Same reference picture list, but different reference picture (different POC)
(4) Different reference picture list, and different reference picture (different POC)

The no-spatial-scaling cases are checked first followed by the cases that allow spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
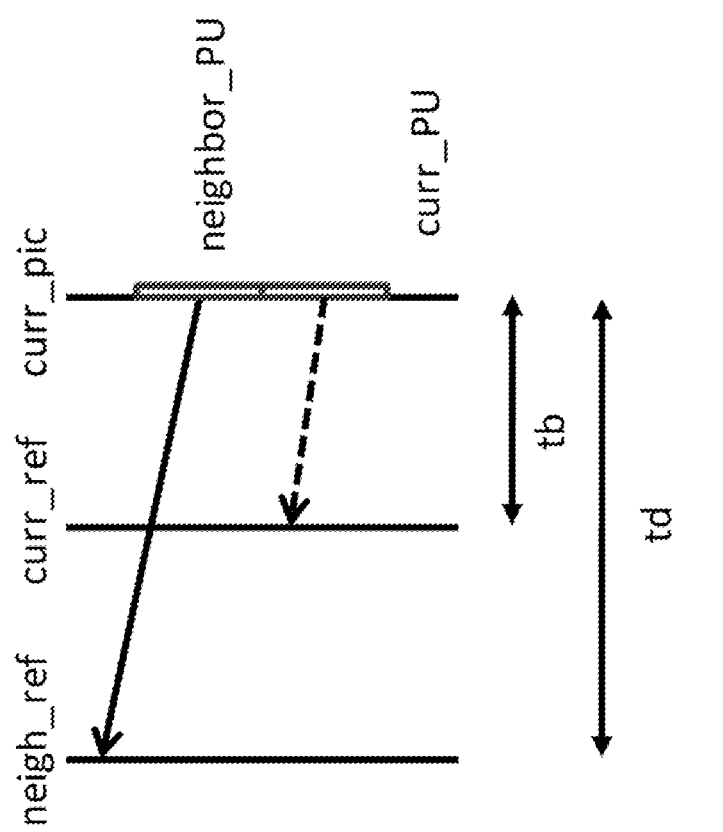
FIG. 9 shows an example of motion vector scaling for spatial motion vector candidates.

As shown in the example in FIG. 9, for the spatial scaling case, the motion vector of the neighbouring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2. EXAMPLE OF INTER PREDICTION METHODS IN JOINT EXPLORATION MODEL (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

2.1 Examples of Sub-CU Based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector. In some embodiments, and to preserve more accurate motion field for sub-CU motion prediction, the motion compression for the reference frames may be disabled.

2.1.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 10:
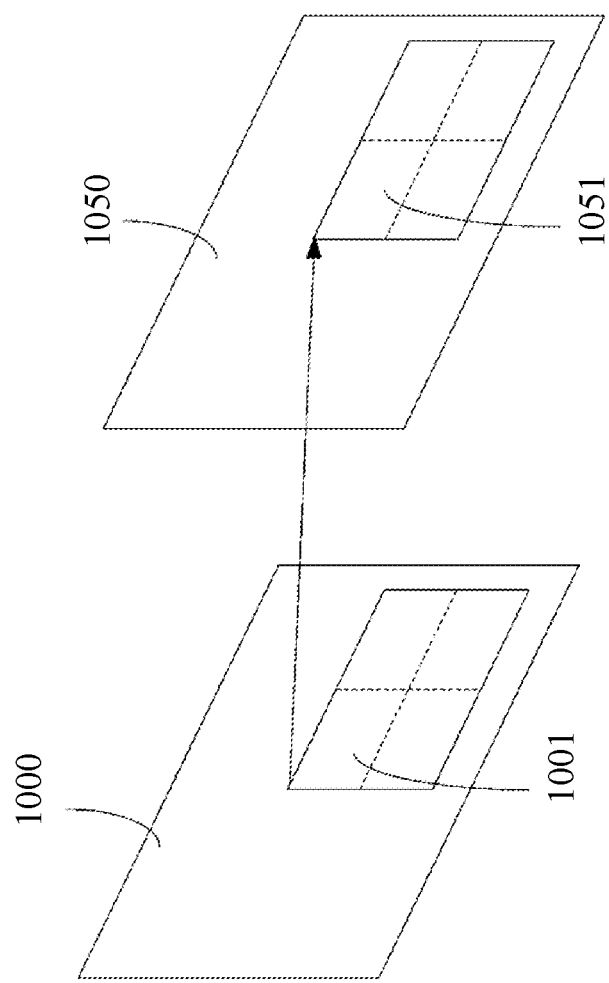
FIG. 10 shows an example of motion prediction using the alternative temporal motion vector prediction (ATMVP) algorithm for a coding unit (CU).

FIG. 10 shows an example of ATMVP motion prediction process for a CU 1000. The ATMVP method predicts the motion vectors of the sub-CUs 1001 within a CU 1000 in two steps. The first step is to identify the corresponding block 1051 in a reference picture 1050 with a temporal vector. The reference picture 1050 is also referred to as the motion source picture. The second step is to split the current CU 1000 into sub-CUs 1001 and obtain the motion vectors as well as the reference indices of each sub-CU from the block corresponding to each sub-CU.

In the first step, a reference picture 1050 and the corresponding block is determined by the motion information of the spatial neighboring blocks of the current CU 1000. To avoid the repetitive scanning process of neighboring blocks, the first merge candidate in the merge candidate list of the current CU 1000 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 1051 is identified by the temporal vector in the motion source picture 1050, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1−X) for each sub-CU.

2.1.2 Examples of Spatial-Temporal Motion Vector Prediction (STMVP)

Figure 11:
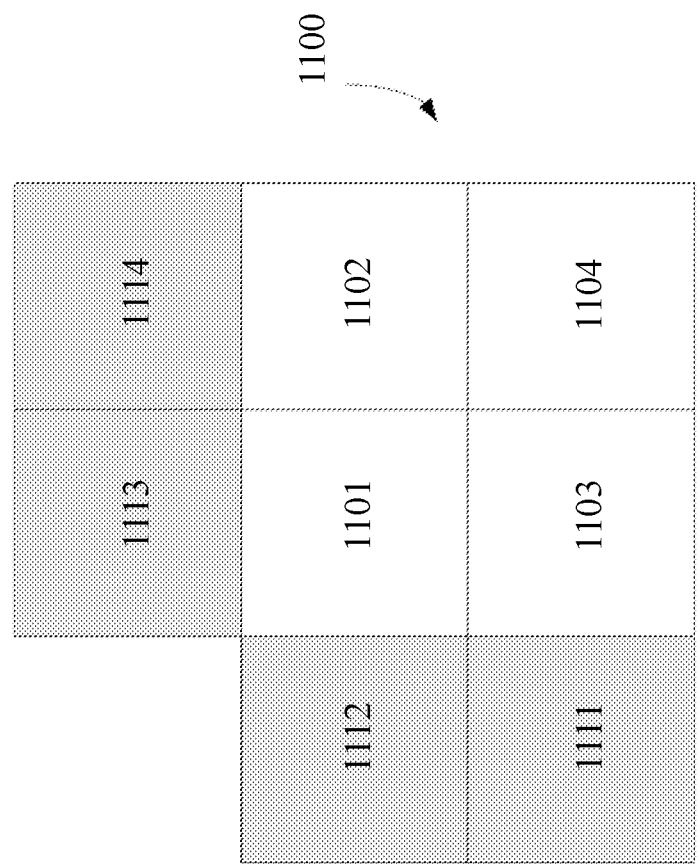
FIG. 11 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 11 shows an example of one CU with four sub-blocks and neighboring blocks. Consider an 8×8 CU 1100 that includes four 4×4 sub-CUs A (1101), B (1102), C (1103), and D (1104). The neighboring 4×4 blocks in the current frame are labelled as a (1111), b (1112), c (1113), and d (1114).

The motion derivation for sub-CU A starts by identifying its two spatial neighbors. The first neighbor is the N×N block above sub-CU A 1101 (block c 1113). If this block c (1113) is not available or is intra coded the other N×N blocks above sub-CU A (1101) are checked (from left to right, starting at block c 1113). The second neighbor is a block to the left of the sub-CU A 1101 (block b 1112). If block b (1112) is not available or is intra coded other blocks to the left of sub-CU A 1101 are checked (from top to bottom, staring at block b 1112). The motion information obtained from the neighboring blocks for each list is scaled to the first reference frame for a given list. Next, temporal motion vector predictor (TMVP) of sub-block A 1101 is derived by following the same procedure of TMVP derivation as specified in HEVC. The motion information of the collocated block at block D 1104 is fetched and scaled accordingly. Finally, after retrieving and scaling the motion information, all available motion vectors are averaged separately for each reference list. The averaged motion vector is assigned as the motion vector of the current sub-CU.

2.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more RD checks may be needed for the two additional merge candidates. In some embodiments, e.g., JEM, all bins of the merge index are context coded by CABAC (Context-based Adaptive Binary Arithmetic Coding). In other embodiments, e.g., HEVC, only the first bin is context coded and the remaining bins are context by-pass coded.

2.2 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM:

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

Figure 12:
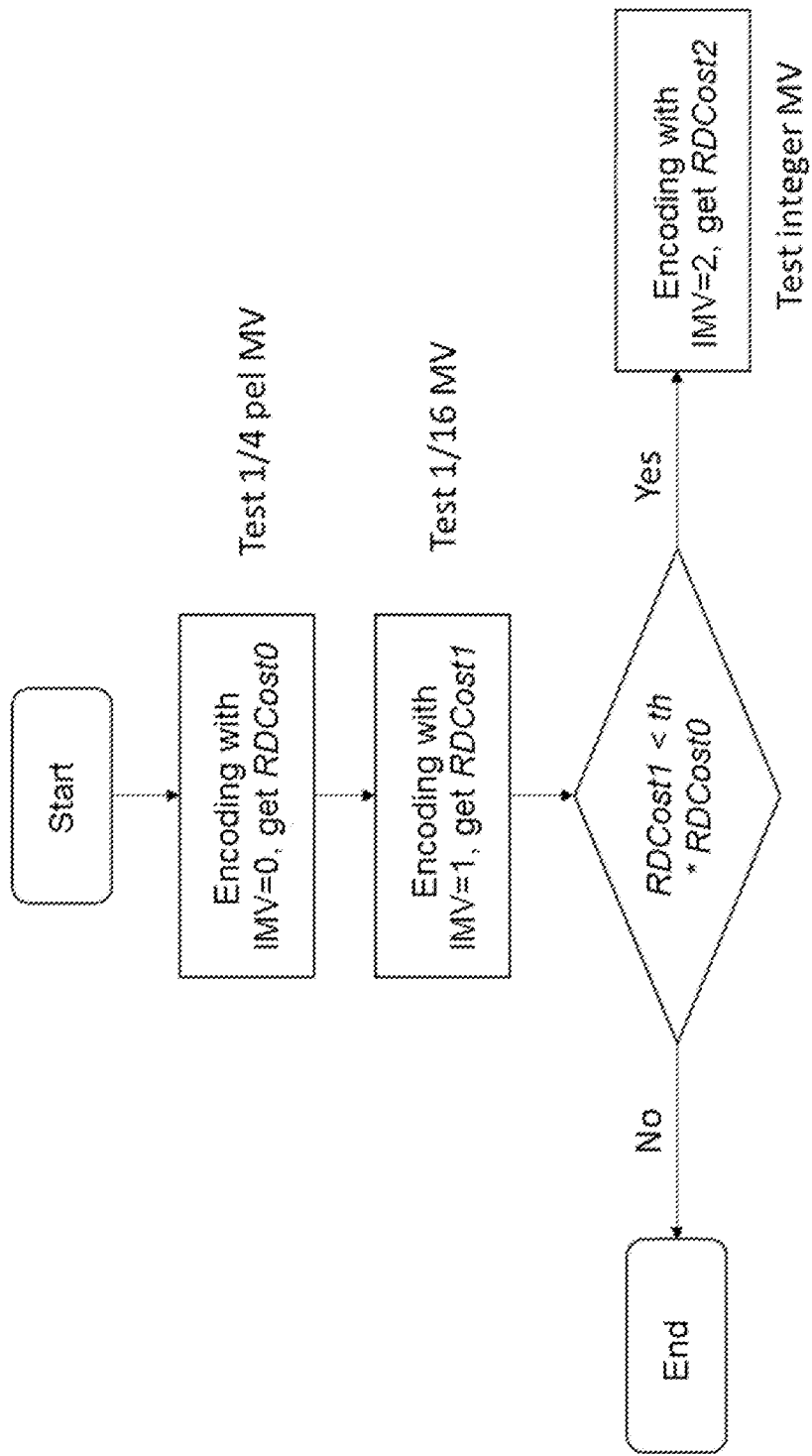
FIG. 12 shows an example flowchart for encoding with different MV precisions.

The encoding process is shown in FIG. 12. First, ¼ pel MV is tested and the RD cost is calculated and denoted as RDCost0, then integer MV is tested and the RD cost is denoted as RDCost1. If RDCost1<th*RDCost0 (wherein th is a positive valued threshold), then 4-pel MV is tested; otherwise, 4-pel MV is skipped. Basically, motion information and RD cost etc. are already known for ¼ pel MV when checking integer or 4-pel MV, which can be reused to speed up the encoding process of integer or 4-pel MV.

2.3 Examples of Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to 1/16 pel. The higher motion vector accuracy (1/16 pel) is used in motion compensation inter prediction for the CU coded with skip/merge mode. For the CU coded with normal AMVP mode, either the integer-pel or quarter-pel motion is used.

SHVC upsampling interpolation filters, which have same filter length and normalization factor as HEVC motion compensation interpolation filters, are used as motion compensation interpolation filters for the additional fractional pel positions. The chroma component motion vector accuracy is 1/32 sample in the JEM, the additional interpolation filters of 1/32 pel fractional positions are derived by using the average of the filters of the two neighbouring 1/16 pel fractional positions.

2.4 Examples of Overlapped Block Motion Compensation (OBMC)

In the JEM, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, an MC block corresponds to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as shown in FIGS. 13A and 13B.

Figure 13A:
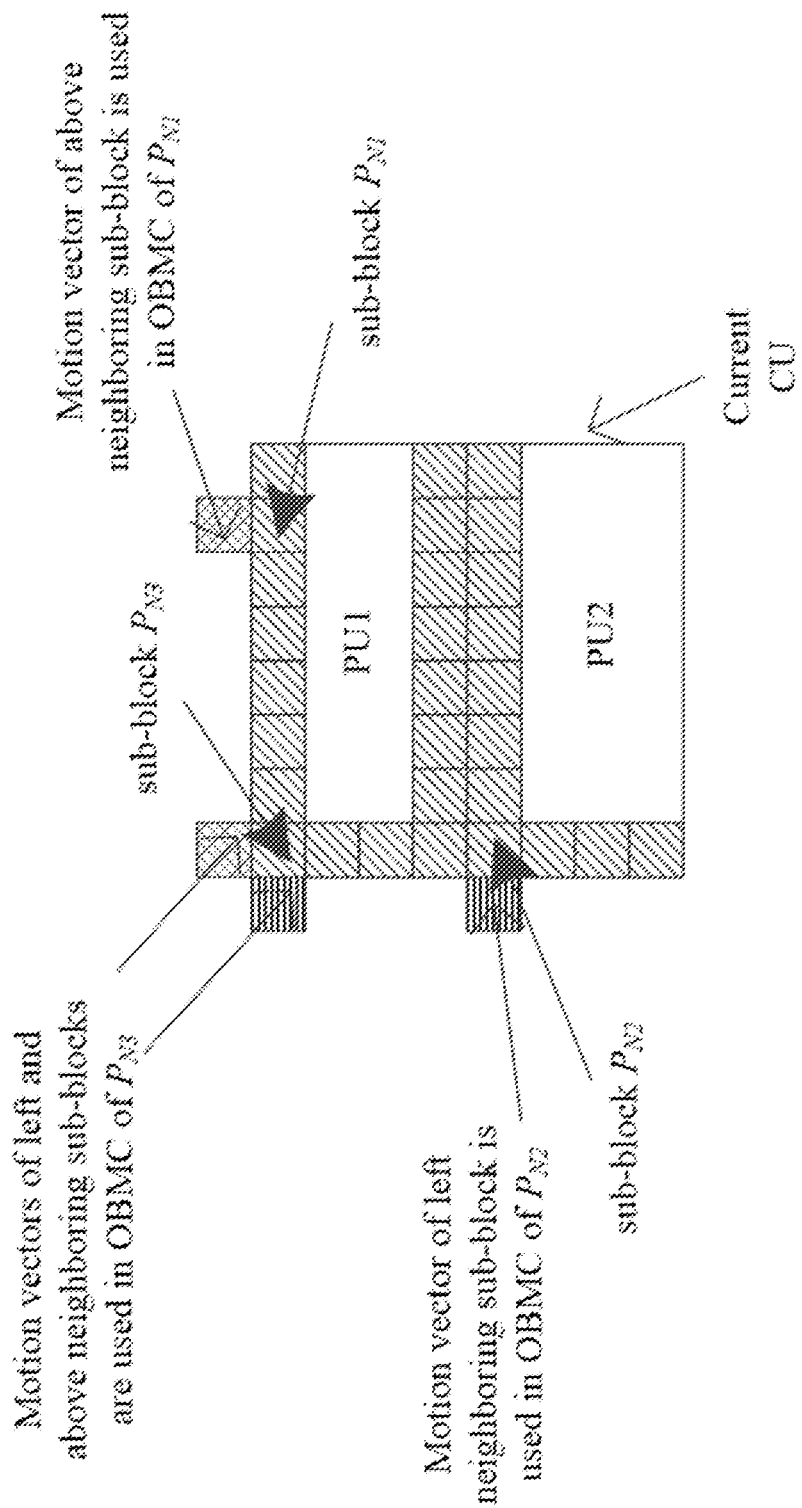
FIGS. 13A and 13B show example snapshots of sub-block when using the overlapped block motion compensation (OBMC) algorithm.
Figure 13B:
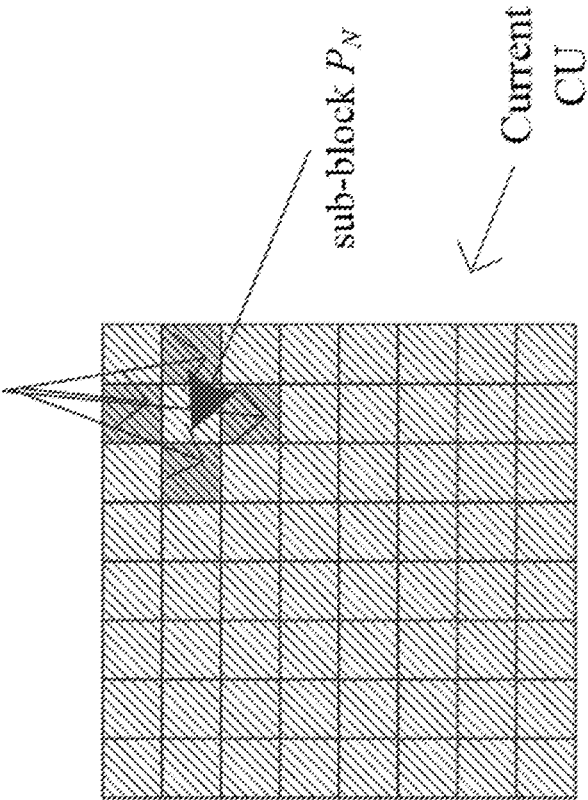

FIG. 13A shows sub-blocks at the CU/PU boundary, and the hatched sub-blocks are where OBMC applies. Similarly, FIG. 13B shows the sub-Pus in ATMVP mode.

When OBMC applies to the current sub-block, besides current motion vectors, motion vectors of four connected neighboring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighboring sub-block is denoted as PN, with N indicating an index for the neighboring above, below, left and right sub-blocks and prediction block based on motion vectors of the current sub-block is denoted as PC. When PN is based on the motion information of a neighboring sub-block that contains the same motion information to the current sub-block, the OBMC is not performed from PN. Otherwise, every sample of PN is added to the same sample in PC, i.e., four rows/columns of PN are added to PC. The weighting factors {¼, ⅛, 1/16, 1/32} are used for PN and the weighting factors {¾, ⅞, 15/16, 31/32} are used for PC. The exception are small MC blocks, (i.e., when height or width of the coding block is equal to 4 or a CU is coded with sub-CU mode), for which only two rows/columns of PN are added to PC. In this case weighting factors {¼, ⅛} are used for PN and weighting factors {¾, ⅞} are used for PC. For PN generated based on motion vectors of vertically (horizontally) neighboring sub-block, samples in the same row (column) of PN are added to PC with a same weighting factor.

In the JEM, for a CU with size less than or equal to 256 luma samples, a CU level flag is signaled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighboring block and the left neighboring block is used to compensate the top and left boundaries of the original signal of the current CU, and then the normal motion estimation process is applied.

2.5 Examples of Local Illumination Compensation (LIC)

LIC is based on a linear model for illumination changes, using a scaling factor a and an offset b. And it is enabled or disabled adaptively for each inter-mode coded coding unit (CU).

Figure 14:
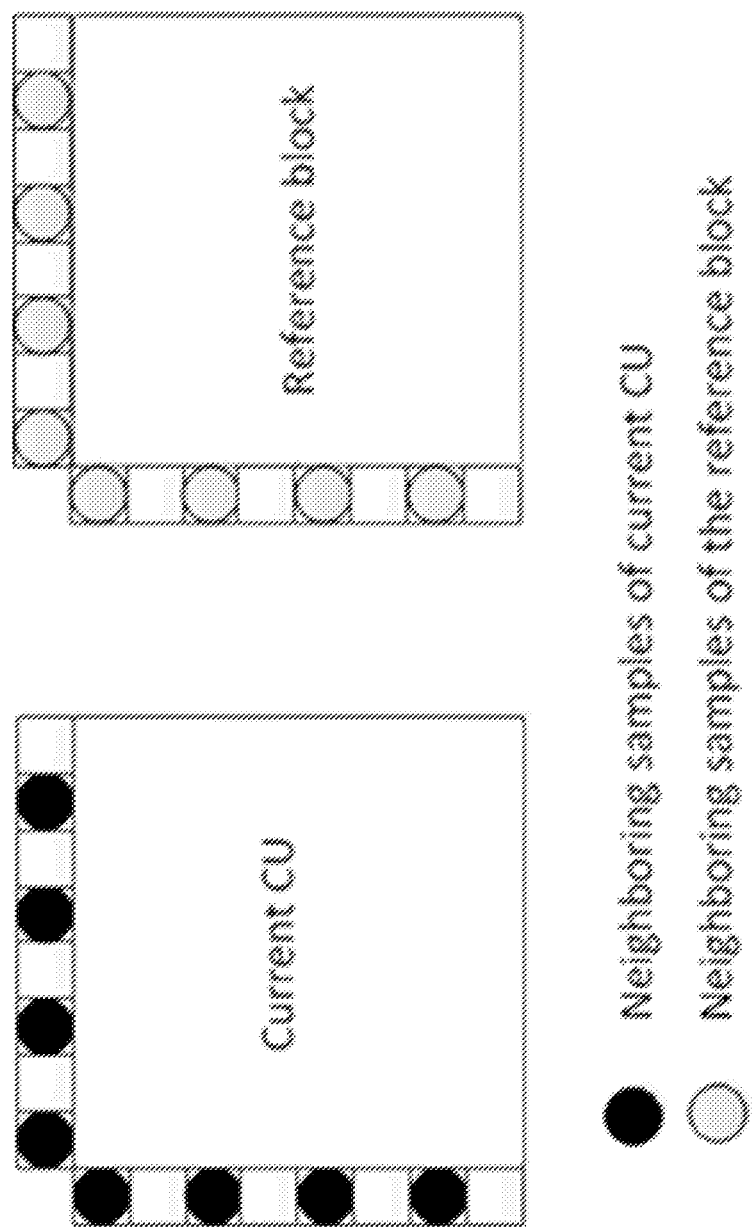
FIG. 14 shows an example of neighboring samples used to derive parameters for the local illumination compensation (LIC) algorithm.

When LIC applies for a CU, a least square error method is employed to derive the parameters a and b by using the neighbouring samples of the current CU and their corresponding reference samples. FIG. 14 shows an example of neighboring samples used to derive parameters of the IC algorithm. Specifically, and as shown in FIG. 14, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

When LIC is enabled for a picture, an additional CU level RD check is needed to determine whether LIC is applied or not for a CU. When LIC is enabled for a CU, the mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM:

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.6 Examples of Affine Motion Compensation Prediction

Figure 15:
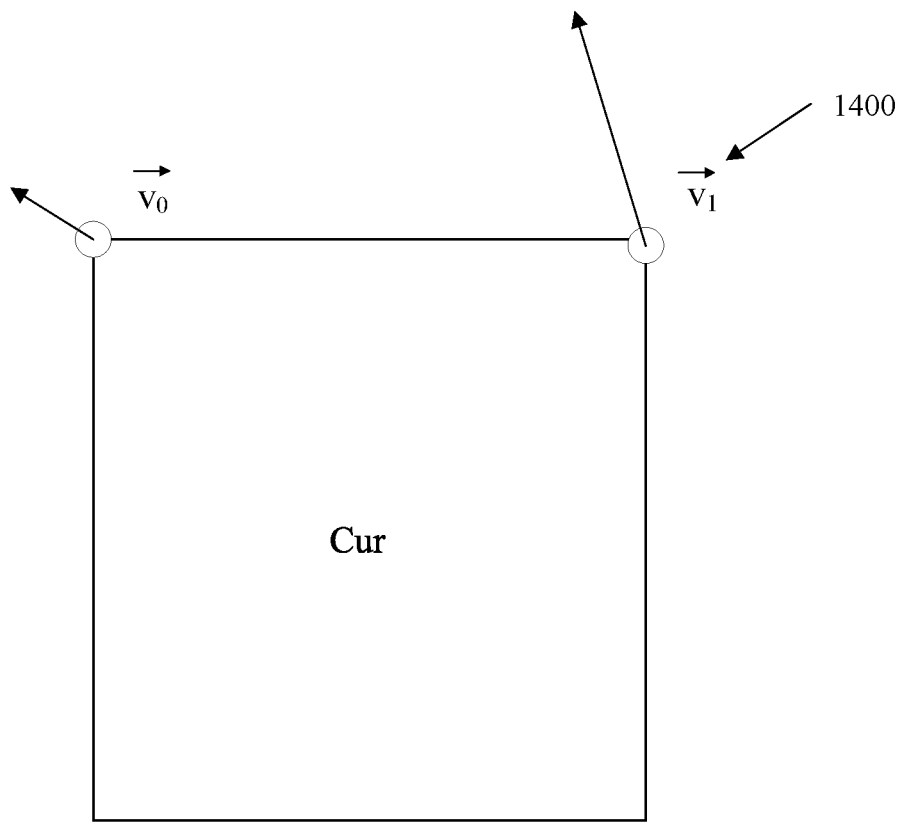
FIG. 15 shows an example of a simplified affine motion model.

In HEVC, only a translation motion model is applied for motion compensation prediction (MCP). However, the camera and objects may have many kinds of motion, e.g. zoom in/out, rotation, perspective motions, and/or other irregular motions. JEM, on the other hand, applies a simplified affine transform motion compensation prediction. FIG. 15 shows an example of an affine motion field of a block 1400 described by two control point motion vectors $V_0$ and $V_1$. The motion vector field (MVF) of the block 1400 can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Eq. (1)}$$

As shown in FIG. 15, $(v_{0x}, v_{0y})$ is motion vector of the top-left corner control point, and $(v_{1x}, v_{1y})$ is motion vector of the top-right corner control point. To simplify the motion compensation prediction, sub-block based affine transform prediction can be applied. The sub-block size M×N is derived as follows:

$$\begin{cases} M = \text{clip } 3\left(4, w, \frac{w \times MvPre}{\max(\text{abs}(v_{1x} - v_{0x}), \text{abs}(v_{1y} - v_{0y}))}\right) \\ N = \text{clip } 3\left(4, h, \frac{h \times MvPre}{\max(\text{abs}(v_{2x} - v_{0x}), \text{abs}(v_{2y} - v_{0y}))}\right) \end{cases} \quad \text{Eq. (2)}$$

Here, MvPre is the motion vector fraction accuracy (e.g., 1/16 in JEM). $(v_{2x}, v_{2y})$ is motion vector of the bottom-left control point, calculated according to Eq. (1). M and N can be adjusted downward if necessary to make it a divisor of w and h, respectively.

Figure 16:
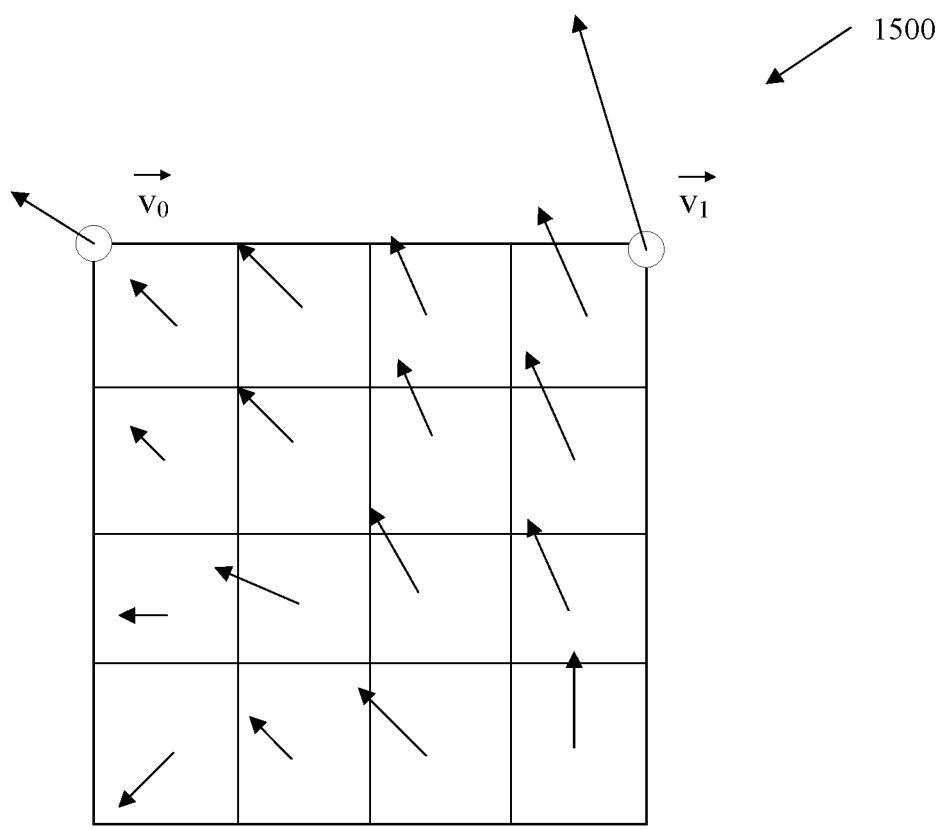
FIG. 16 shows an example of an affine motion vector field (MVF) per sub-block.

FIG. 16 shows an example of affine MVF per sub-block for a block 1500. To derive motion vector of each M×N sub-block, the motion vector of the center sample of each sub-block can be calculated according to Eq. (1), and rounded to the motion vector fraction accuracy (e.g., 1/16 in JEM). Then the motion compensation interpolation filters can be applied to generate the prediction of each sub-block with derived motion vector. After the MCP, the high accuracy motion vector of each sub-block is rounded and saved as the same accuracy as the normal motion vector.

2.6.1 Embodiments of the AF_INTER Mode

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In the AF_INTER mode, a candidate list with motion vector pair $\{(v_0, v_1)|v_0=\{v_A, v_B, v_C\}, v_1=\{v_D, v_E\}\}$ is constructed using the neighboring blocks.

Figure 17:
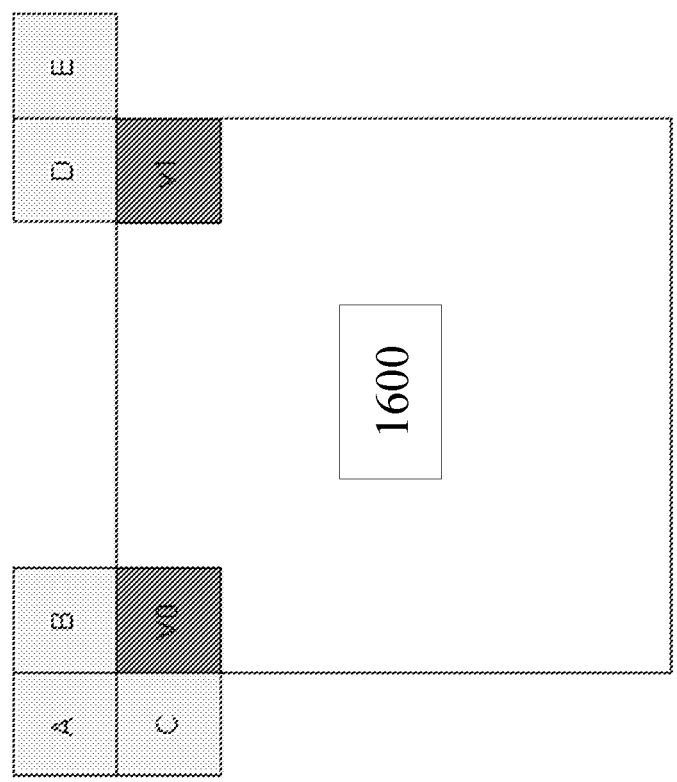
FIG. 17 shows an example of motion vector prediction (MVP) for the AF_INTER affine motion mode.

FIG. 17 shows an example of motion vector prediction (MVP) for a block 1600 in the AF_INTER mode. As shown in FIG. 17, $v_0$ is selected from the motion vectors of the sub-block A, B, or C. The motion vectors from the neighboring blocks can be scaled according to the reference list. The motion vectors can also be scaled according to the relationship among the Picture Order Count (POC) of the reference for the neighboring block, the POC of the reference for the current CU, and the POC of the current CU. The approach to select $v_1$ from the neighboring sub-block D and E is similar. If the number of candidate list is smaller than 2, the list is padded by the motion vector pair composed by duplicating each of the AMVP candidates. When the candidate list is larger than 2, the candidates can be firstly sorted according to the neighboring motion vectors (e.g., based on the similarity of the two motion vectors in a pair candidate). In some implementations, the first two candidates are kept. In some embodiments, a Rate Distortion (RD) cost check is used to determine which motion vector pair candidate is selected as the control point motion vector prediction (CPMVP) of the current CU. An index indicating the position of the CPMVP in the candidate list can be signaled in the bitstream. After the CPMVP of the current affine CU is determined, affine motion estimation is applied and the control point motion vector (CPMV) is found. Then the difference of the CPMV and the CPMVP is signaled in the bitstream.

Figure 18B:
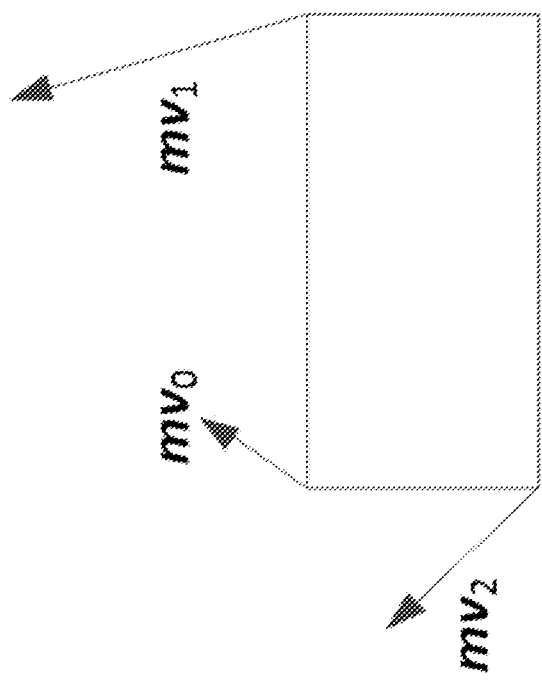
FIGS. 18A and 18B show examples of the 4-parameter and 6-parameter affine models, respectively.
Figure 18A:
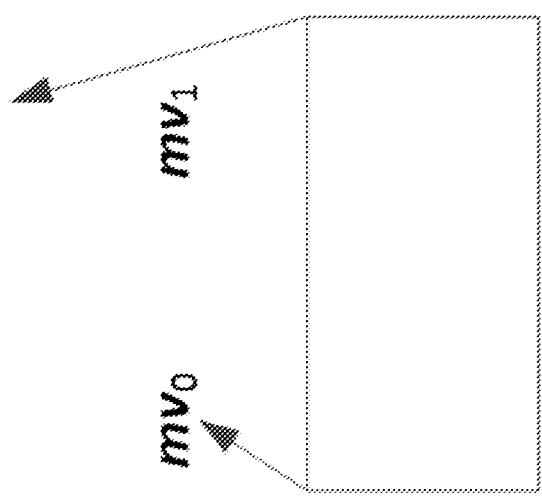

In AF_INTER mode, when 4/6 parameter affine mode is used, 2/3 control points are required, and therefore 2/3 MVD needs to be coded for these control points, as shown in FIGS. 18A and 18B. In an existing implementation, the MV may be derived as follows, e.g., it predicts $mvd_1$ and $mvd_2$ from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Herein, $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 18B. In some embodiments, the addition of two motion vectors (e.g., mvA(xA, yA) and mvB(xB, yB)) is equal to summation of two components separately. For example, newMV=mvA+mvB implies that the two components of newMV are set to (xA+xB) and (yA+yB), respectively.

2.6.2 Examples of Fast Affine ME Algorithms in AF_INTER Mode

In some embodiments of the affine mode, MV of 2 or 3 control points needs to be determined jointly. Directly searching the multiple MVs jointly is computationally complex. In an example, a fast affine ME algorithm is proposed and is adopted into VTM/BMS.

For example, the fast affine ME algorithm is described for the 4-parameter affine model, and the idea can be extended to 6-parameter affine model:

$$\begin{cases} x' = ax + by + c \\ y' = -bx + ay + d \end{cases} \quad \text{Eq. (3)}$$

$$\begin{cases} mv^h_{(x,y)} = x' - x = (a-1)x + by + c \\ mv^v_{(x,y)} = y' - y = -bx + (a-1)y + d \end{cases} \quad \text{Eq. (4)}$$

Replacing (a-1) with a' enables the motion vectors to be rewritten as:

$$\begin{cases} mv^h_{(x,y)} = x' - x = a'x + by + c \\ mv^v_{(x,y)} = y' - y = -bx + a'y + d \end{cases} \quad \text{Eq. (5)}$$

If it is assumed that the motion vectors of the two controls points (0, 0) and (0, w) are known, from Equation (5) the affine parameters may be derived as:

$$\begin{cases} c = mv^h_{(0,0)} \\ d = mv^v_{(0,0)} \end{cases} \quad \text{Eq. (6)}$$

The motion vectors can be rewritten in vector form as:

$$MV(p) = A(P) * MV_C^T. \quad \text{Eq. (7)}$$

Herein, P=(x,y) is the pixel position, $$A(P) = \begin{bmatrix} 1 & x & 0 & y \\ 0 & y & 1 & -x \end{bmatrix}, \text{ and} \quad \text{Eq. (8)}$$

$$MV_C = [mv^h_{(0,0)} \ a \ mv^v_{(0,0)} \ b]. \quad \text{Eq. (9)}$$

In some embodiments, and at the encoder, the MVD of AF_INTER may be derived iteratively. Denote $MV^i(P)$ as the MV derived in the ith iteration for position P and denote $dMV_C^i$ as the delta updated for $MV_C$ in the ith iteration. Then in the (i+1)th iteration, $$\begin{aligned} MV^{i+1}(P) &= A(P) * ((MV_C^i)^T + (dMV_C^i)^T) \\ &= A(P) * (MV_C^i)^T + A(P) * (dMV_C^i)^T \\ &= MV^i(P) + A(P) * (dMV_C^i)^T \end{aligned} \quad \text{Eq. (10)}$$

Denote $Pic_{ref}$ as the reference picture and denote $Pic_{cur}$ as the current picture and denote $Q=P+MV^i(P)$. If the MSE is used as the matching criterion, then the function that needs to be minimized may be written as:

$$\min \Sigma_P(Pic_{cur}(P) - Pic_{ref}(P + MV^{i+1}(P)))^2 = \min \\ \Sigma_P(Pic_{cur}(P) - Pic_{ref}(Q + A(P)*(dMV_C^i)^T))^2 \quad \text{Eq. (11)}$$

If it is assumed that $(dMV_C^i)^T$ is small enough, $Pic_{ref}(Q+A(P)*(dMV_C^i)^T)$ may be rewritten, as an approximation based on a 1-st order Taylor expansion, as:

$$Pic_{ref}(Q+A(P)*(dMV_C^i)^T) \approx Pic_{ref}(Q) + Pic_{ref}'(Q)*A(P)* \\ (dMV_C^i)^T. \quad \text{(12)}$$

Herein, $$Pic_{ref}'(Q) = \left[ \frac{dPic_{ref}(Q)}{dx} \ \frac{dPic_{ref}(Q)}{dy} \right].$$

If the notation $E^{i+1}(P) = Pic_{cur}(P) - Pic_{ref}(Q)$ is adopted, then:

$$\min \Sigma_P(Pic_{cur}(P) - Pic_{ref}(Q) - Pic_{ref}'(Q)*A(P)* \\ (dMV_C^i)^T)^2 = \min \Sigma_P(E^{i+1}(P) - Pic_{ref}'(Q)*A(P)* \\ (dMV_C^i)^T)^2 \quad \text{Eq. (13)}$$

The term $dMV_C^i$ may be derived by setting the derivative of the error function to zero, and then computing delta MV of the control points (0, 0) and (0, w) according to $A(P)*(dMV_C^i)^T$, as follows:

$$dMV_{(0,0)}^h = dMV_C^i[0] \quad \text{Eq. (14)}$$

$$dMV_{(0,w)}^h = dMV_C^i[1]*w + dMV_C^i[2] \quad \text{Eq. (15)}$$

$$dMV_{(0,0)}^v = dMV_C^i[2] \quad \text{Eq. (16)}$$

$$dMV_{(0,w)}^v = -dMV_C^i[3]*w + dMV_C^i[2] \quad \text{Eq. (17)}$$

In some embodiments, this MVD derivation process may be iterated n times, and the final MVD may be calculated as follows:

$$fdMV_{(0,0)}^h = \Sigma_{i=0}^{n-1} dMV_C^i[0] \quad \text{Eq. (18)}$$

$$fdMV_{(0,w)}^h = \Sigma_{i=0}^{n-1} dMV_C^i[1]*w + \Sigma_{i=0}^{n-1} dMV_C^i[0] \quad \text{Eq. (19)}$$

$$fdMV_{(0,0)}^v = \Sigma_{i=0}^{n-1} dMV_C^i[2] \quad \text{Eq. (20)}$$

$$fdMV_{(0,w)}^v = \Sigma_{i=0}^{n-1} dMV_C^i[3]*w + \Sigma_{i=0}^{n-1} dMV_C^i[2] \quad \text{Eq. (21)}$$

In the aforementioned implementation, predicting delta MV of control point (0, w), denoted by $mvd_1$ from delta MV of control point (0, 0), denoted by $mvd_0$, results in only $(\Sigma_{i=0}^{n-1} dMV_C^i[1]*w, -\Sigma_{i=0}^{n-1} dMV_C^i[3]*w)$ being encoded for $mvd_1$.

2.6.3 Embodiments of the AF_MERGE Mode

Figure 19A:
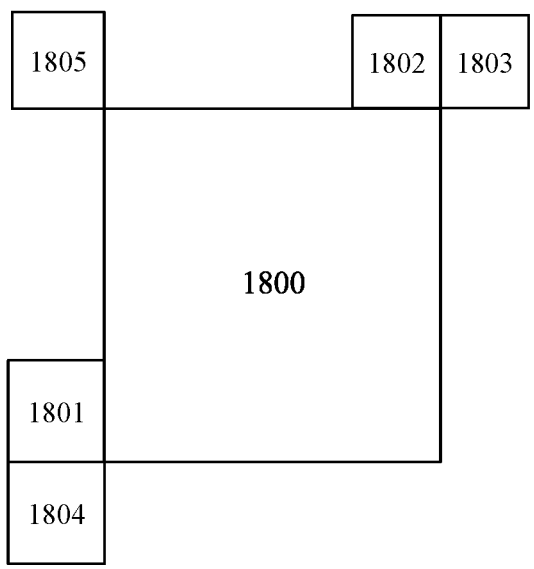
FIGS. 19A and 19B show example candidates for the AF_MERGE affine motion mode.
Figure 19B:
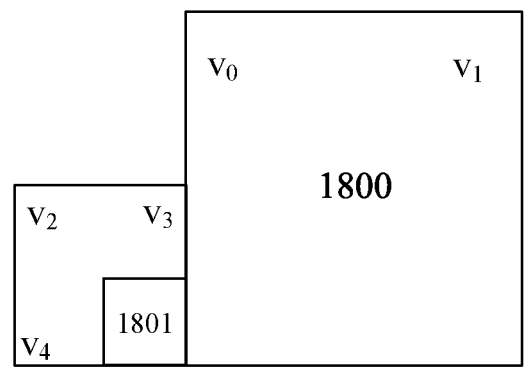

When a CU is applied in AF_MERGE mode, it gets the first block coded with an affine mode from the valid neighboring reconstructed blocks. FIG. 19A shows an example of the selection order of candidate blocks for a current CU 1800. As shown in FIG. 19A, the selection order can be from left (1801), above (1802), above right (1803), left bottom (1804) to above left (1805) of the current CU 1800. FIG. 19B shows another example of candidate blocks for a current CU 1800 in the AF_MERGE mode. If the neighboring left bottom block 1801 is coded in affine mode, as shown in FIG. 19B, the motion vectors $v_2$, $v_3$ and $v_4$ of the top left corner, above right corner, and left bottom corner of the CU containing the sub-block 1801 are derived. The motion vector $v_0$ of the top left corner on the current CU

1800 is calculated based on v2, v3 and v4. The motion vector v1 of the above right of the current CU can be calculated accordingly.

After the CPMV of the current CU v0 and v1 are computed according to the affine motion model in Eq. (1), the MVF of the current CU can be generated. In order to identify whether the current CU is coded with AF_MERGE mode, an affine flag can be signaled in the bitstream when there is at least one neighboring block is coded in affine mode.

2.7 Examples of Pattern Matched Motion Vector Derivation (PMMVD)

The PMMVD mode is a special merge mode based on the Frame-Rate Up Conversion (FRUC) method. With this mode, motion information of a block is not signaled but derived at decoder side.

A FRUC flag can be signaled for a CU when its merge flag is true. When the FRUC flag is false, a merge index can be signaled and the regular merge mode is used. When the FRUC flag is true, an additional FRUC mode flag can be signaled to indicate which method (e.g., bilateral matching or template matching) is to be used to derive motion information for the block.

At the encoder side, the decision on whether using FRUC merge mode for a CU is based on RD cost selection as done for normal merge candidate. For example, multiple matching modes (e.g., bilateral matching and template matching) are checked for a CU by using RD cost selection. The one leading to the minimal cost is further compared to other CU modes. If a FRUC matching mode is the most efficient one, FRUC flag is set to true for the CU and the related matching mode is used.

Typically, motion derivation process in FRUC merge mode has two steps: a CU-level motion search is first performed, then followed by a Sub-CU level motion refinement. At CU level, an initial motion vector is derived for the whole CU based on bilateral matching or template matching. First, a list of MV candidates is generated and the candidate that leads to the minimum matching cost is selected as the starting point for further CU level refinement. Then a local search based on bilateral matching or template matching around the starting point is performed. The MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in Eq. (3), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \quad \text{Eq. (3)}$$

Figure 20:
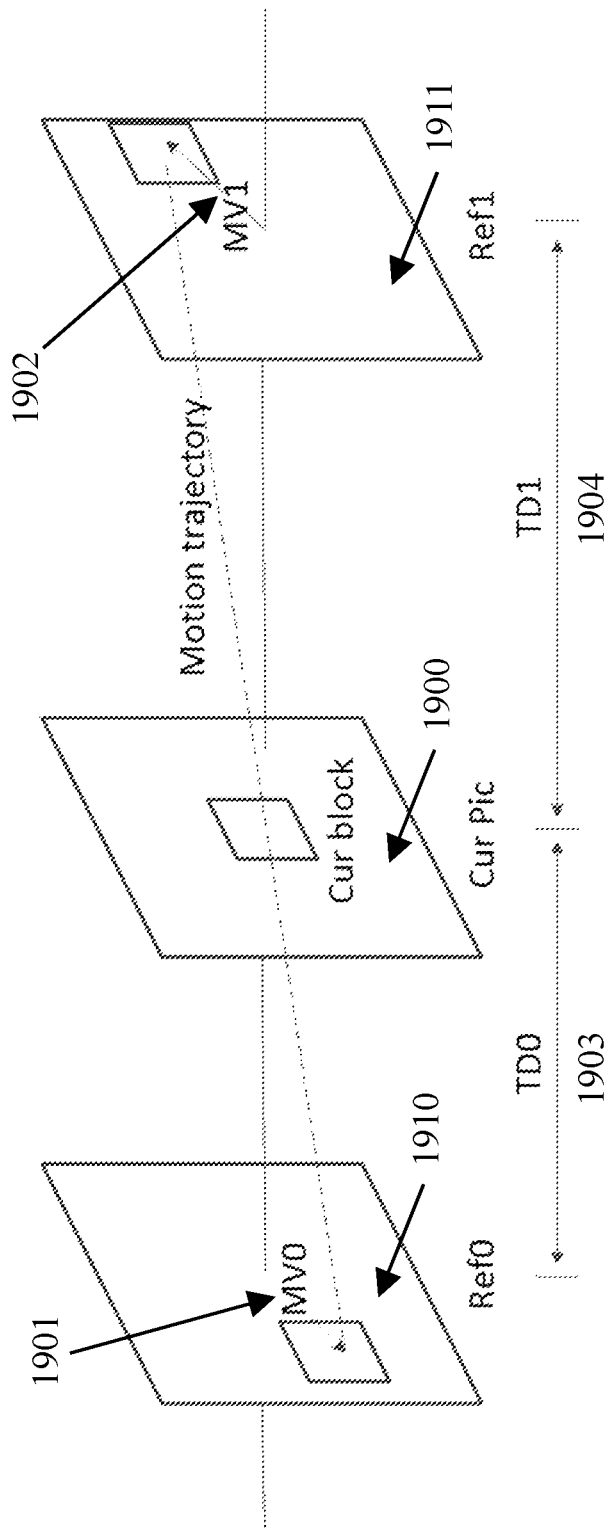
FIG. 20 shows an example of bilateral matching in pattern matched motion vector derivation (PMMVD) mode, which is a special merge mode based on the frame-rate up conversion (FRUC) algorithm.

FIG. 20 shows an example of bilateral matching used in the Frame-Rate Up Conversion (FRUC) method. The bilateral matching is used to derive motion information of the current CU by finding the closest match between two blocks along the motion trajectory of the current CU (1900) in two different reference pictures (1910, 1911). Under the assumption of continuous motion trajectory, the motion vectors MV0 (1901) and MV1 (1902) pointing to the two reference blocks are proportional to the temporal distances, e.g., TD0 (1903) and TD1 (1904), between the current picture and the two reference pictures. In some embodiments, when the current picture 1900 is temporally between the two reference pictures (1910, 1911) and the temporal distance from the current picture to the two reference pictures is the same, the bilateral matching becomes mirror based bi-directional MV.

Figure 21:
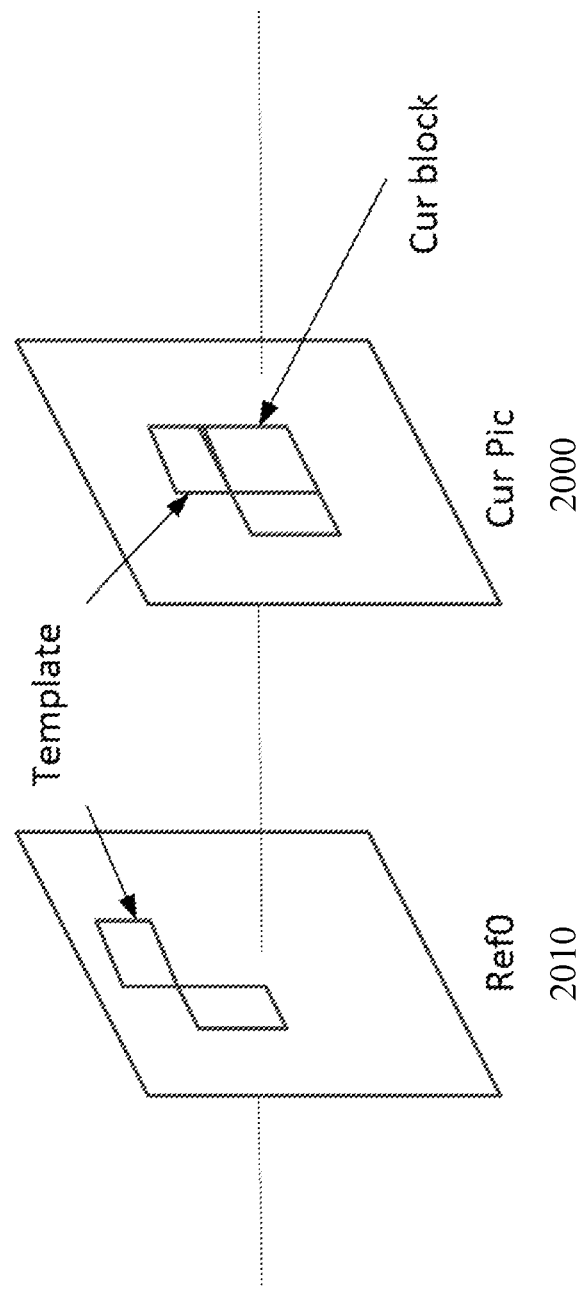
FIG. 21 shows an example of template matching in the FRUC algorithm.

FIG. 21 shows an example of template matching used in the Frame-Rate Up Conversion (FRUC) method. Template matching can be used to derive motion information of the current CU 2000 by finding the closest match between a template (e.g., top and/or left neighboring blocks of the current CU) in the current picture and a block (e.g., same size to the template) in a reference picture 2010. Except the aforementioned FRUC merge mode, the template matching can also be applied to AMVP mode. In both JEM and HEVC, AMVP has two candidates. With the template matching method, a new candidate can be derived. If the newly derived candidate by template matching is different to the first existing AMVP candidate, it is inserted at the very beginning of the AMVP candidate list and then the list size is set to two (e.g., by removing the second existing AMVP candidate). When applied to AMVP mode, only CU level search is applied.

The MV candidate set at CU level can include the following: (1) original AMVP candidates if the current CU is in AMVP mode, (2) all merge candidates, (3) several MVs in the interpolated MV field (described later), and top and left neighboring motion vectors.

When using bilateral matching, each valid MV of a merge candidate can be used as an input to generate a MV pair with the assumption of bilateral matching. For example, one valid MV of a merge candidate is (MVa, $\text{ref}_a$) at reference list A. Then the reference picture $\text{ref}_b$ of its paired bilateral MV is found in the other reference list B so that $\text{ref}_a$ and $\text{ref}_b$ are temporally at different sides of the current picture. If such a $\text{ref}_b$ is not available in reference list B, $\text{ref}_b$ is determined as a reference which is different from $\text{ref}_a$ and its temporal distance to the current picture is the minimal one in list B. After $\text{ref}_b$ is determined, MVb is derived by scaling MVa based on the temporal distance between the current picture and $\text{ref}_a$, $\text{ref}_b$.

In some implementations, four MVs from the interpolated MV field can also be added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. In some implementations, at the CU level, 15 MVs for AMVP CUs and 13 MVs for merge CUs can be added to the candidate list.

The MV candidate set at sub-CU level includes an MV determined from a CU-level search, (2) top, left, top-left and top-right neighboring MVs, (3) scaled versions of collocated MVs from reference pictures, (4) one or more ATMVP candidates (e.g., up to four), and (5) one or more STMVP candidates (e.g., up to four). The scaled MVs from reference pictures are derived as follows. The reference pictures in both lists are traversed. The MVs at a collocated position of the sub-CU in a reference picture are scaled to the reference of the starting CU-level MV. ATMVP and STMVP candidates can be the four first ones. At the sub-CU level, one or more MVs (e.g., up to 17) are added to the candidate list.

Generation of an interpolated MV field. Before coding a frame, interpolated motion field is generated for the whole picture based on unilateral ME. Then the motion field may be used later as CU level or sub-CU level MV candidates.

Figure 22:
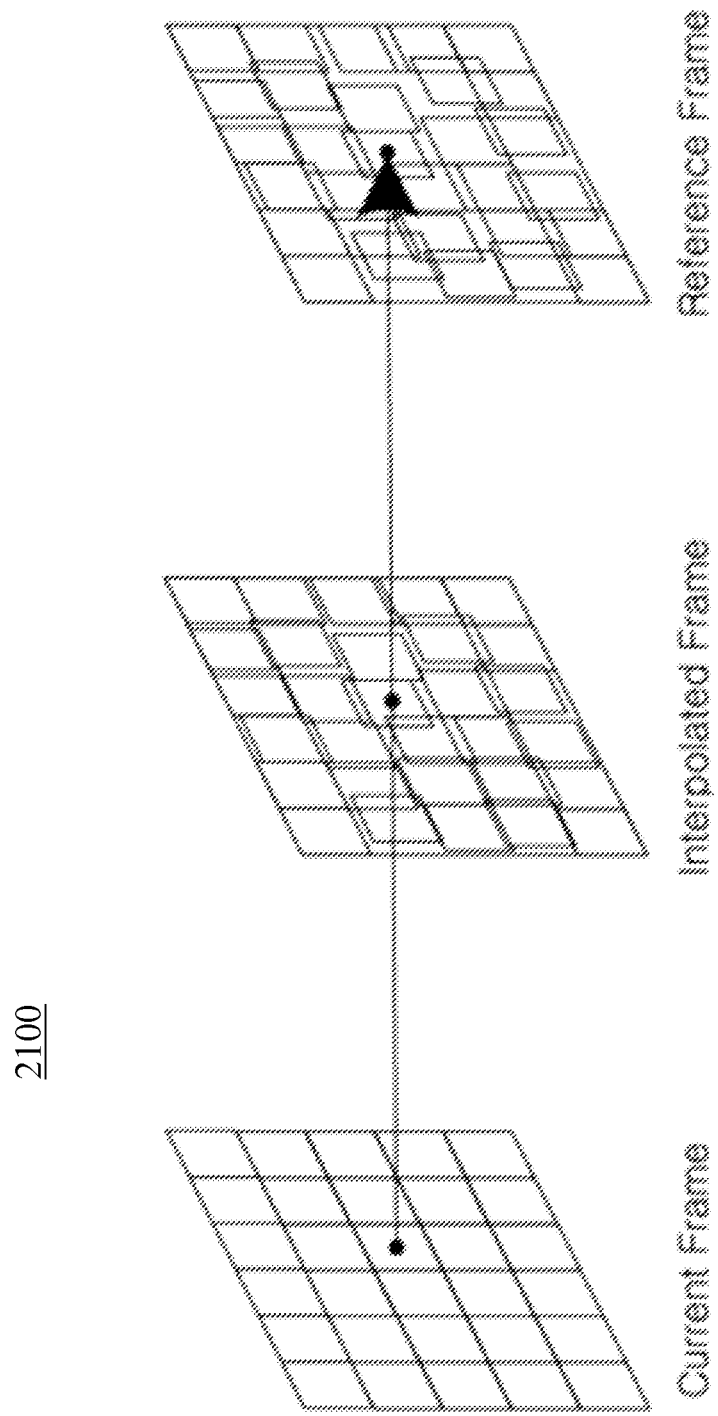
FIG. 22 shows an example of unilateral motion estimation in the FRUC algorithm.

In some embodiments, the motion field of each reference pictures in both reference lists is traversed at 4×4 block level. FIG. 22 shows an example of unilateral Motion Estimation (ME) 2100 in the FRUC method. For each 4×4 block, if the motion associated to the block passing through a 4×4 block in the current picture and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

Interpolation and matching cost. When a motion vector points to a fractional sample position, motion compensated interpolation is needed. To reduce complexity, bi-linear interpolation instead of regular 8-tap HEVC interpolation can be used for both bilateral matching and template matching.

The calculation of matching cost is a bit different at different steps. When selecting the candidate from the candidate set at the CU level, the matching cost can be the absolute sum difference (SAD) of bilateral matching or template matching. After the starting MV is determined, the matching cost C of bilateral matching at sub-CU level search is calculated as follows:

$$C=SAD+w\cdot(|MV_x-MV_x^s|+|MV_y-MV_y^s|) \qquad \text{Eq. (4)}$$

Here, w is a weighting factor. In some embodiments, w can be empirically set to 4. MV and $MV^s$ indicate the current MV and the starting MV, respectively. SAD may still be used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

In the bilateral matching merge mode, bi-prediction is applied because the motion information of a CU is derived based on the closest match between two blocks along the motion trajectory of the current CU in two different reference pictures. In the template matching merge mode, the encoder can choose among uni-prediction from list0, uni-prediction from list1, or bi-prediction for a CU. The selection ca be based on a template matching cost as follows:

If costBi<=factor*min (cost0, cost1)
  bi-prediction is used;
Otherwise, if cost0<=cost1
  uni-prediction from list0 is used;
Otherwise,
  uni-prediction from list1 is used;

Here, cost0 is the SAD of list0 template matching, cost1 is the SAD of list1 template matching and costBi is the SAD of bi-prediction template matching. For example, when the value of factor is equal to 1.25, it means that the selection process is biased toward bi-prediction. The inter prediction direction selection can be applied to the CU-level template matching process.

2.8 Examples of Bi-Directional Optical Flow (BIO)

The bi-directional optical flow (BIO) method is a sample-wise motion refinement performed on top of block-wise motion compensation for bi-prediction. In some implementations, the sample-level motion refinement does not use signaling.

Let $I^{(k)}$ be the luma value from reference k (k=0, 1) after block motion compensation, and denote $\partial I^{(k)}/\partial x$ and $\partial I^{(k)}/\partial y$ as the horizontal and vertical components of the $I^{(k)}$ gradient, respectively. Assuming the optical flow is valid, the motion vector field $(v_x, v_y)$ is given by:

$$\partial I^{(k)}/\partial t + v_x \partial I^{(k)}/\partial x + v_y \partial I^{(k)}/\partial y = 0. \qquad \text{Eq. (5)}$$

Combining this optical flow equation with Hermite interpolation for the motion trajectory of each sample results in a unique third-order polynomial that matches both the function values $I^{(k)}$ and derivatives $\partial I^{(k)}/\partial x$ and $\partial I^{(k)}/\partial y$ at the ends. The value of this polynomial at t=0 is the BIO prediction:

$$\text{pred}_{BIO}=\tfrac{1}{2}\cdot(I^{(0)}+I^{(1)}+v_x/2\cdot(\tau_1\partial I^{(1)}/\partial x-\tau_0\partial I^{(0)}/\partial x)+v_y/2\cdot(\tau_1\partial I^{(1)}/\partial y-\tau_0\partial I^{(0)}/\partial y)) \qquad \text{Eq. (6)}$$

Figure 23:
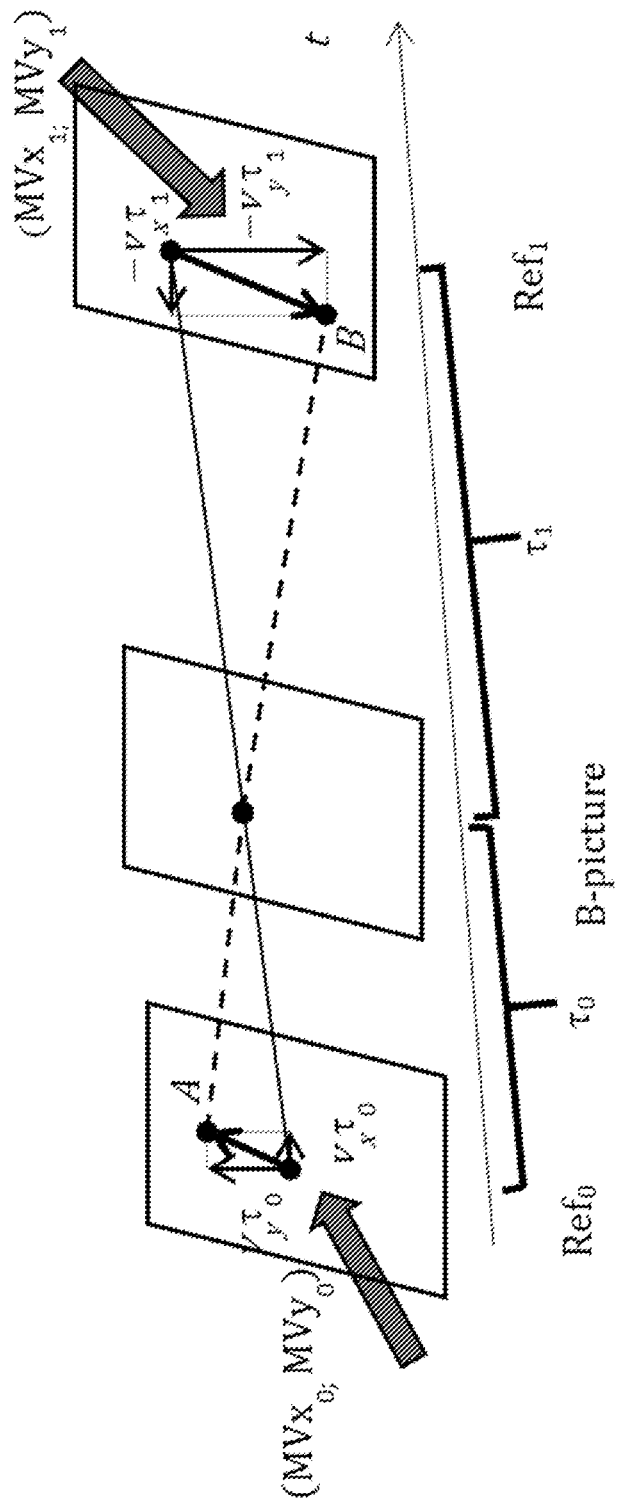
FIG. 23 shows an example of an optical flow trajectory used by the bi-directional optical flow (BIO) algorithm.

FIG. 23 shows an example optical flow trajectory in the Bi-directional Optical flow (BIO) method. Here, $\tau_0$ and $\tau_1$ denote the distances to the reference frames. Distances $\tau_0$ and $\tau_1$ are calculated based on POC for $\text{Ref}_0$ and $\text{Ref}_1$: $\tau_0=\text{POC(current)}-\text{POC}(\text{Ref}_0)$, $\tau_1=\text{POC}(\text{Ref}_1)-\text{POC(current)}$. If both predictions come from the same time direction (either both from the past or both from the future) then the signs are different (e.g., $\tau_0\cdot\tau_1<0$). In this case, BIO is applied if the prediction is not from the same time moment (e.g., $\tau_0\neq\tau_1$). Both referenced regions have non-zero motion (e.g., $MVx_0, MVy_0, MVx_1, MVy_1\neq 0$) and the block motion vectors are proportional to the time distance (e.g., $MVx_0/MVx_1=MVy_0/MVy_1=-\tau_0/\tau_1$).

The motion vector field $(v_x, v_y)$ is determined by minimizing the difference $\Delta$ between values in points A and B. FIGS. 9A-9B show an example of intersection of motion trajectory and reference frame planes. Model uses only first linear term of a local Taylor expansion for $\Delta$:

$$\Delta=(I^{(0)}-I^{(1)}{}_0+v_x(\tau_1\partial I^{(1)}/\partial x+\tau_0\partial I^{(0)}/\partial x)+v_y(\tau_1\partial I^{(1)}/\partial y+\tau_0\partial I^{(0)}/\partial y)) \qquad \text{Eq. (7)}$$

All values in the above equation depend on the sample location, denoted as (i', j'). Assuming the motion is consistent in the local surrounding area, $\Delta$ can be minimized inside the $(2M+1)\times(2M+1)$ square window $\Omega$ centered on the currently predicted point (i,j), where M is equal to 2:

$$(v_x, v_y) = \arg\min_{v_x,v_y} \sum_{[i',j']\in\Omega} \Delta^2[i', j'] \qquad \text{Eq. (8)}$$

For this optimization problem, the JEM uses a simplified approach making first a minimization in the vertical direction and then in the horizontal direction. This results in the following:

$$v_x = (s_1 + r) > m \,?\, \text{clip} 3\left(-thBIO, thBIO, -\frac{s_3}{(s_1 + r)}\right):0 \quad \text{Eq. (9)}$$

$$v_y = (s_5 + r) > m \,?\, \text{clip} 3\left(-thBIO, thBIO, -\frac{s_6 - v_x s_2/2}{(s_5 + r)}\right):0 \quad \text{Eq. (10)}$$

where, $$s_1 = \sum_{[i',j] \in \Omega} \left(\tau_1 \partial I^{(1)}/\partial x + \tau_0 \partial I^{(0)}/\partial x\right)^2; \quad \text{Eq. (11)}$$

$$s_3 = \sum_{[i',j] \in \Omega} \left(I^{(1)} - I^{(0)}\right)\left(\tau_1 \partial I^{(1)}/\partial x + \tau_0 \partial I^{(0)}/\partial x\right);$$

$$s_2 = \sum_{[i',j] \in \Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_5 = \sum_{[i',j] \in \Omega} \left(\tau_1 \partial I^{(1)}/\partial y + \tau_0 \partial I^{(0)}/\partial y\right)^2;$$

$$s_6 = \sum_{[i',j] \in \Omega} \left(I^{(1)} - I^{(0)}\right)\left(\tau_1 \partial I^{(1)}/\partial y + \tau_0 \partial I^{(0)}/\partial y\right)$$

In order to avoid division by zero or a very small value, regularization parameters r and m can be introduced in Eq. (9) and Eq. (10), where:

$$r = 500 \cdot 4^{d-8} \quad \text{Eq. (12)}$$

$$m = 700 \cdot 4^{d-8} \quad \text{Eq. (13)}$$

Here, d is bit depth of the video samples.

Figures 24A, 24B:
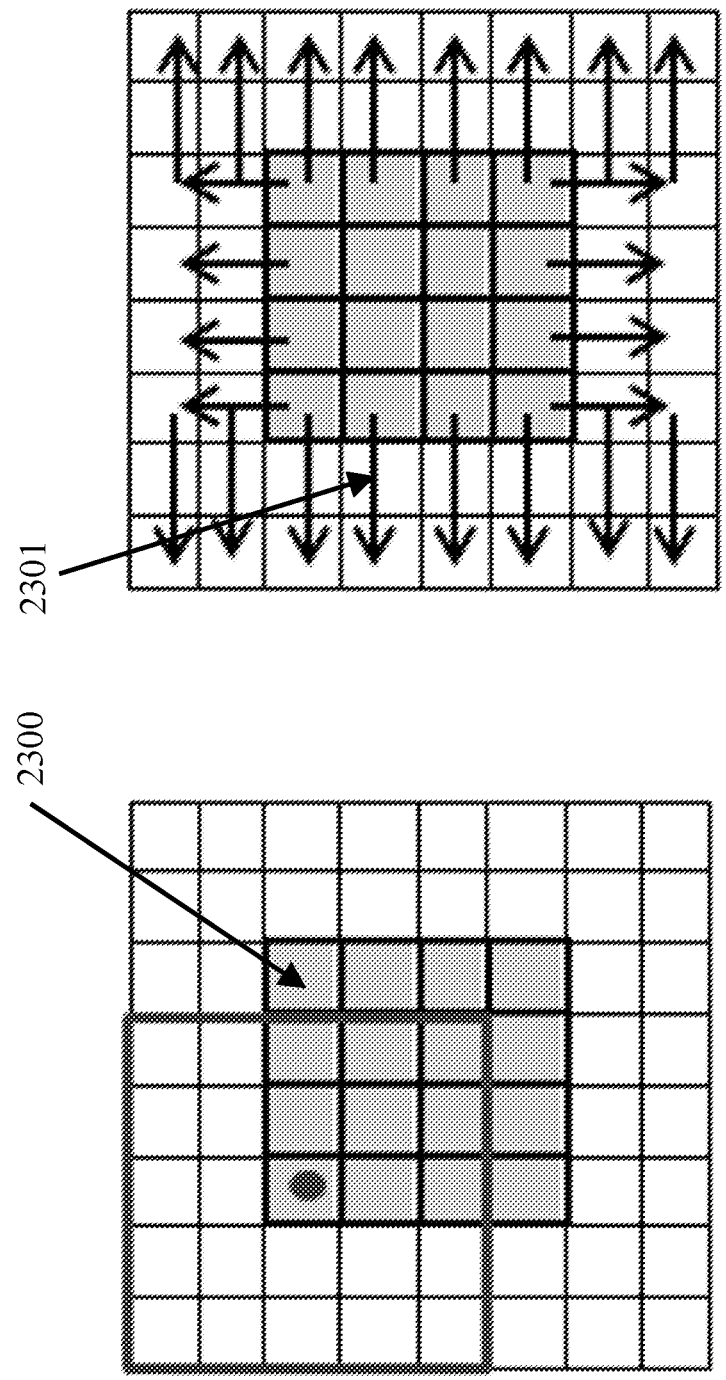
FIGS. 24A and 24B show example snapshots of using of the bi-directional optical flow (BIO) algorithm without block extensions.

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated for positions inside the current block. FIG. 24A shows an example of access positions outside of a block 2300. As shown in FIG. 24A, in Eq. (9), (2M+1)×(2M+1) square window Ω centered in currently predicted point on a boundary of predicted block needs to accesses positions outside of the block. In the JEM, values of $I^{(k)}$, $\partial I^{(k)}/\partial x$, $\partial I^{(k)}/\partial y$ outside of the block are set to be equal to the nearest available value inside the block. For example, this can be implemented as a padding area 2301, as shown in FIG. 24B.

With BIO, it is possible that the motion field can be refined for each sample. To reduce the computational complexity, a block-based design of BIO is used in the JEM. The motion refinement can be calculated based on a 4×4 block. In the block-based BIO, the values of $s_n$ in Eq. (9) of all samples in a 4×4 block can be aggregated, and then the aggregated values of $s_n$ in are used to derived BIO motion vectors offset for the 4×4 block. More specifically, the following formula can used for block-based BIO derivation:

$$s_{1,b_k} = \sum_{(x,y) \in b_k} \sum_{[i',j] \in \Omega(x,y)} \left(\tau_1 \partial I^{(1)}/\partial x + \tau_0 \partial I^{(0)}/\partial x\right)^2; \quad \text{Eq. (14)}$$

$$s_{3,b_k} = \sum_{(x,y) \in b_k} \sum_{[i',j] \in \Omega} \left(I^{(1)} - I^{(0)}\right)\left(\tau_1 \partial I^{(1)}/\partial x + \tau_0 \partial I^{(0)}/\partial x\right);$$

$$s_{2,b_k} = \sum_{(x,y) \in b_k} \sum_{[i',j] \in \Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_{5,b_k} = \sum_{(x,y) \in b_k} \sum_{[i',j] \in \Omega} \left(\tau_1 \partial I^{(1)}/\partial y + \tau_0 \partial I^{(0)}/\partial y\right)^2;$$

$$s_{6,b_k} = \sum_{(x,y) \in b_k} \sum_{[i',j] \in \Omega} \left(I^{(1)} - I^{(0)}\right)\left(\tau_1 \partial I^{(1)}/\partial y + \tau_0 \partial I^{(0)}/\partial y\right)$$

Here, $b_k$ denotes the set of samples belonging to the k-th 4×4 block of the predicted block. $s_n$ in Eq (9) and Eq (10) are replaced by $((s_{n,bk}) >> 4)$ to derive the associated motion vector offsets.

In some scenarios, MV regiment of BIO may be unreliable due to noise or irregular motion. Therefore, in BIO, the magnitude of MV regiment is clipped to a threshold value. The threshold value is determined based on whether the reference pictures of the current picture are all from one direction. For example, if all the reference pictures of the current picture are from one direction, the value of the threshold is set to $12 \times 2^{14-d}$; otherwise, it is set to $12 \times 2^{13-d}$.

Gradients for BIO can be calculated at the same time with motion compensation interpolation using operations consistent with HEVC motion compensation process (e.g., 2D separable Finite Impulse Response (FIR)). In some embodiments, the input for the 2D separable FIR is the same reference frame sample as for motion compensation process and fractional position (fracX, fracY) according to the fractional part of block motion vector. For horizontal gradient ∂I/∂x, a signal is first interpolated vertically using BIOfilterS corresponding to the fractional position fracY with de-scaling shift d−8. Gradient filter BIOfilterG is then applied in horizontal direction corresponding to the fractional position fracX with de-scaling shift by 18−d. For vertical gradient ∂I/∂y, a gradient filter is applied vertically using BIOfilterG corresponding to the fractional position fracY with de-scaling shift d−8. The signal displacement is then performed using BIOfilterS in horizontal direction corresponding to the fractional position fracX with de-scaling shift by 18−d. The length of interpolation filter for gradients calculation BIOfilterG and signal displacement BIOfilterF can be shorter (e.g., 6-tap) in order to maintain reasonable complexity. Table 1 shows example filters that can be used for gradients calculation of different fractional positions of block motion vector in BIO. Table 2 shows example interpolation filters that can be used for prediction signal generation in BIO.

TABLE 1

Exemplary filters for gradient calculations in BIO

| Fractional pel position | Interpolation filter for gradient(BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Exemplary interpolation filters for prediction signal generation in BIO

| Fractional pel position | Interpolation filter for prediction signal(BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |

TABLE 2-continued

Exemplary interpolation filters for
prediction signal generation in BIO

| Fractional pel position | Interpolation filter for prediction signal(BIOfilterS) |
|---|---|
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO can be applied to all bi-predicted blocks when the two predictions are from different reference pictures. When Local Illumination Compensation (LIC) is enabled for a CU, BIO can be disabled.

In some embodiments, OBMC is applied for a block after normal MC process. To reduce the computational complexity, BIO may not be applied during the OBMC process. This means that BIO is applied in the MC process for a block when using its own MV and is not applied in the MC process when the MV of a neighboring block is used during the OBMC process.

2.9 Examples of Decoder-Side Motion Vector Refinement (DMVR)

In a bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 25:
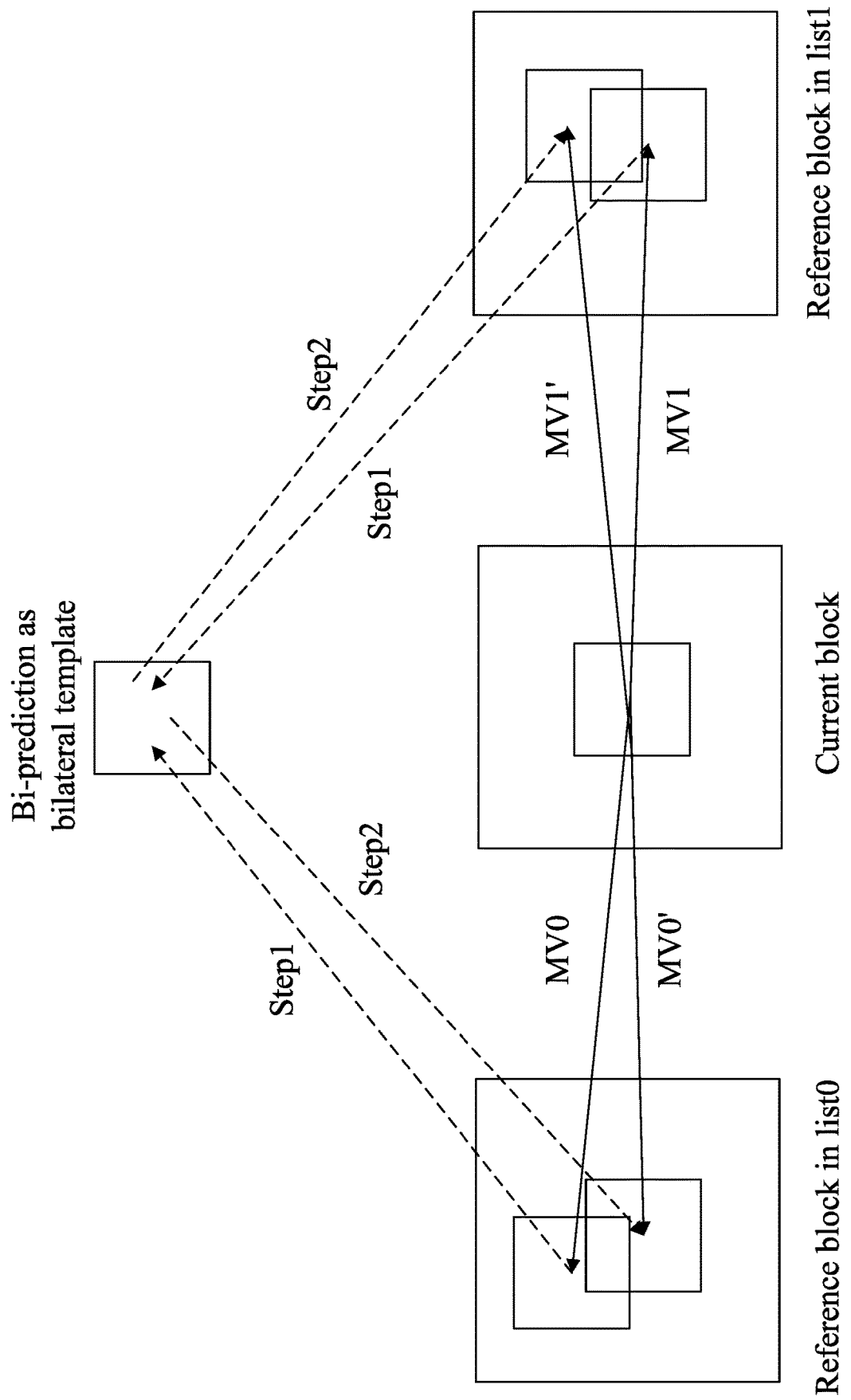
FIG. 25 shows an example of the decoder-side motion vector refinement (DMVR) algorithm based on bilateral template matching.

In DMVR, a bilateral template is generated as the weighted combination (i.e. average) of the two prediction blocks, from the initial MV0 of list0 and MV1 of list1, respectively, as shown in FIG. 25. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 25, are used for generating the final bi-prediction results. A sum of absolute differences (SAD) is used as the cost measure.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

2.2.9 Examples of Symmetric Motion Vector Difference

Symmetric motion vector difference (SMVD) is proposed to encode the MVD more efficiently.

Firstly, in slice level, variables BiDirPredFlag, RefIdxSymL0 and RefIdxSymL1 are derived as follows:

The forward reference picture in reference picture list 0 which is nearest to the current picture is searched. If found, RefIdxSymL0 is set equal to the reference index of the forward picture.

The backward reference picture in reference picture list 1 which is nearest to the current picture is searched. If found, RefIdxSymL1 is set equal to the reference index of the backward picture.

If both forward and backward picture are found, BiDirPredFlag is set equal to 1.

Otherwise, following applies:

The backward reference picture in reference picture list 0 which is nearest to the current one is searched. If found, RefIdxSymL0 is set equal to the reference index of the backward picture.

The forward reference picture in reference picture list 1 which is nearest to the current one is searched. If found, RefIdxSymL1 is set equal to the reference index of the forward picture.

If both backward and forward picture are found, BiDirPredFlag is set equal to 1. Otherwise, BiDirPredFlag is set equal to 0.

Secondly, in CU level, a symmetrical mode flag indicating whether symmetrical mode is used or not is explicitly signaled if the prediction direction for the CU is bi-prediction and BiDirPredFlag is equal to 1.

When the flag is true, only mvp_l0_flag, mvp_l1_flag and MVD0 are explicitly signaled. The reference indices are set equal to RefIdxSymL0, RefIdxSymL1 for list 0 and list 1, respectively. MVD1 is just set equal to −MVD0. The final motion vectors are shown in below formula.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases}$$

Figure 28:
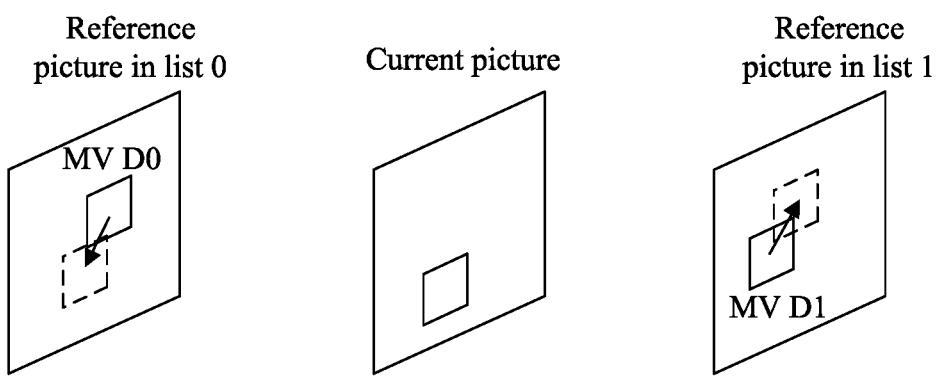
FIG. 28 shows an example of symmetrical mode.

FIG. 28 shows examples of symmetrical mode.

The modifications in coding unit syntax are shown in Table 3.

TABLE 3

| Modifications in coding unit syntax | Descriptor |
|---|---|
| coding_unit( x0, y0, cbWidth, cbHeight, treeType ) { <br> ... <br>     if( slice_type = = B ) <br>         inter_pred_idc[ x0 ][ y0 ] <br>     if( sps_affine_enabled_flag && cbWidth >= 16 && cbHeight >= 16 ) { | <br><br><br>ae(v)<br> |

TABLE 3-continued

Modifications in coding unit syntax

|  | Descriptor |
|---|---|
| inter_affine_flag[ x0 ][ y0 ] | ae(v) |
|   if( sps_affine_type_flag && inter_affine_flag[ x0 ][ y0 ] ) |  |
|     cu_affine_type_flag[ x0 ][ y0 ] | ae(v) |
| } |  |
| if( inter_pred_idc[ x0 ][ y0 ] == PRED_BI && |  |
|   BiDirPredFlag && inter_affine_flag[ x0 ][ y0 ] == 0 ) |  |
|   symmetric_mvd_flag[ x0 ][ y0 ] | ae(v) |
| if( inter_pred_idc[ x0 ][ y0 ] != PRED_L1 ) { |  |
|   if( num_ref_idx_l0_active_minus1 > 0 && !symmetric_mvd_flag[ x0 ][ y0 ] ) |  |
|     ref_idx_l0[ x0 ][ y0 ] | ae(v) |
|   mvd_coding( x0, y0, 0, 0 ) |  |
|   if( MotionModelIdc[ x0 ][ y0 ] > 0 ) |  |
|     mvd_coding( x0, y0, 0, 1 ) |  |
|   if(MotionModelIdc[ x0 ][ y0 ] > 1 ) |  |
|     mvd_coding( x0, y0, 0, 2 ) |  |
|   mvp_l0_flag[ x0 ][ y0 ] | ae(v) |
| } else { |  |
|   MvdL0[ x0 ][ y0 ][ 0 ] = 0 |  |
|   MvdL0[ x0 ][ y0 ][ 1 ] = 0 |  |
| } |  |
| if( inter_pred_idc[ x0 ][ y0 ] != PRED_L0 ) { |  |
|   if( num_ref_idx_l1_active_minus1 > 0 && !symmetric_mvd_flag[ x0 ][ y0 ] ) |  |
|     ref_idx_l1[ x0 ][ y0 ] | ae(v) |
|   if( mvd_l1_zero_flag && inter_pred_idc[ x0 ][ y0 ] == PRED_BI ) { |  |
|     ... |  |
|   } else { |  |
|     if( !symmetric_mvd_flag[ x0 ][ y0 ] ) { |  |
|       mvd_coding( x0, y0, 1, 0 ) |  |
|     if( MotionModelIdc[ x0 ][ y0 ] > 0 ) |  |
|       mvd_coding( x0, y0, 1, 1 ) |  |
|     if(MotionModelIdc[ x0 ][ y0 ] > 1 ) |  |
|       mvd_coding( x0, y0, 1, 2 ) |  |
|   } |  |
|   mvp_l1_flag[ x0 ][ y0 ] | ae(v) |
| } else { |  |
|   MvdL1[ x0 ][ y0 ][ 0 ] = 0 |  |
|   MvdL1[ x0 ][ y0 ][ 1 ] = 0 |  |
| } |  |
| ... |  |
| } |  |
| } |  |
| ... |  |
| } |  |

2.2.11 Symmetric MVD for Affine Bi-Prediction Coding

SMVD for affine mode is proposed in [9].

2.3 Context-Adaptive Binary Arithmetic Coding (CABAC)

2.3.1 CABAC Design in HEVC

2.3.1.1 Context Representation and Initialization Process in HEVC

In HEVC, for each context variable, the two variables pStateIdx and valMps are initialized.

From the 8 bit table entry initValue, the two 4 bit variables slopeIdx and offsetIdx are derived as follows:

$$slopeIdx = initValue >> 4$$

$$offsetIdx = initValue \: \& \: 15 \quad (34)$$

The variables m and n, used in the initialization of context variables, are derived from slopeIdx and offsetIdx as follows:

$$m = slopeIdx * 5 - 45$$

$$n = (offsetIdx << 3) - 16 \quad (35)$$

The two values assigned to pStateIdx and valMps for the initialization are derived from the luma's quantization parameter of slice denoted by SliceQpY. Given the variables m and n, the initialization is specified as follows:

$$preCtxState = Clip3(1, 126, ((m * Clip3(0, 51, SliceQpY)) >> 4) + n)$$

$$valMps = (preCtxState <= 63) ? 0 : 1 \quad (36)$$

$$pStateIdx = valMps ? (preCtxState - 64) : (63 - preCtxState)$$

2.3.1.2 State Transition Process in HEVC

Inputs to this process are the current pStateIdx, the decoded value binVal and valMps values of the context variable associated with ctxTable and ctxIdx.

Outputs of this process are the updated pStateIdx and valMps of the context variable associated with ctxIdx.

Depending on the decoded value binVal, the update of the two variables pStateIdx and valMps associated with ctxIdx is derived as follows in (37):

```
if( binVal = = valMps )
    pStateIdx = transIdxMps( pStateIdx )
else {                                    (37)
    if( pStateIdx = = 0 ) valMps = 1 - valMps
    pStateIdx = transIdxLps( pStateIdx )
}
```

2.3.2 CABAC Design in VVC

The context-adaptive binary arithmetic coder (BAC) in VVC has been changed in VVC which is different from that in HEVC in terms of both context updating process and arithmetic coder.

Here is the summary of recently adopted proposal (JVET-M0473, CE test 5.1.13).

TABLE 4

Summary of CABAC modifications in VVC

| | |
|---|---|
| State representation | 10 + 14 bit linear, reduced range |
| rLPS computation | 5 × 4 bit multiplier |
| Initialization | 128 × 16 bit to map HEVC-like state to linear representation, retrained initialization values |
| Rate estimation | 256 × 2 × 19 bit table |
| Window size (controlling probability updating speed) | Variable, defined per context a = 2 . . . 5 b = a + 3 . . . 6 That is, each context has two variables for recording the associated probabilities, and each probability is updated with its own speed (faster speed based on the variable a and lower speed based on the variable b) |
| Other | rMPS >= 128 is guaranteed |

2.3.2.1 Context Initialization Process in VVC n VVC, two values assigned to pStateIdx0 and pStateIdx1 for the initialization are derived from SliceQpY. Given the variables m and n, the initialization is specified as follows:

preCtxState=Clip3(0,127,((m*Clip3(0,51,SliceQpY))>>4)+n)

pStateIdx0=initStateIdxToState[preCtxState]>>4 pStateIdx1=initStateIdxToState[preCtxState]    (38)

2.3.2.2 State Transition Process in VVC

Inputs to this process are the current pStateIdx0 and pStateIdx1, and the decoded value binVal.

Outputs of this process are the updated pStateIdx0 and pStateIdx1 of the context variable associated with ctxIdx.

The variables shift0 (corresponding to variable a in Summary of CABAC modifications in VVCTable 4) and shift1 (corresponding to variable b in Summary of CABAC modifications in VVC Table 4e) are derived from the shiftIdx value associated with ctxTable and ctxInc.

shift0=(shiftIdx>>2)+2 shift1=(shiftIdx & 3)+3+shift0    (39)

Depending on the decoded value binVal, the update of the two variables pStateIdx0 and pStateIdx1 associated with ctxIdx is derived as follows:

pStateIdx0=pStateIdx0−(pStateIdx0>>shift0)+(1023*binVal>>shift0)

pStateIdx1=pStateIdx1−(pStateIdx1>>shift1)+(16383*binVal>>shift1)    (40)

3. DRAWBACKS OF EXISTING IMPLEMENTATIONS

In some existing implementations, when MV/MV difference (MVD) could be selected from a set of multiple MV/MVD precisions for affine coded blocks, it remains uncertain how more accurate motion vectors may be obtained.

In other existing implementations, the MV/MVD precision information also plays an important role in determination of the overall coding gain of AMVR applied to affine mode, but achieving this goal remains uncertain.

4. EXAMPLE METHODS FOR MV PREDICTORS FOR AFFINE MODE WITH AMVR

Embodiments of the presently disclosed technology overcome the drawbacks of existing implementations, thereby providing video coding with higher coding efficiencies. The derivation and signaling of motion vector predictors for affine mode with adaptive motion vector resolution (AMVR), based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

In some embodiments, the following examples may be applied to affine mode or normal mode when AMVR is applied. These examples assume that a precision Prec (i.e., MV is with $1/(2^{\wedge}Prec)$ precision) is used for encoding MVD in AF_INTER mode or for encoding MVD in normal inter mode. A motion vector predictor (e.g., inherited from a neighboring block MV) and its precision are denoted by MVPred($MVPred_X$, $MVPred_Y$) and PredPrec, respectively.

Improvement of Affine Mode with AMVR Supported

1. The set of allowed MVD precisions may be different from picture to picture, from slice to slice, or from block to block.
   a. In one example, the set of allowed MVD precisions may depend on coded information, such as block size, block shape. etc. al.

b. A set of allowed MV precisions may be pre-defined, such as {1/16, 1/4, 1}.
c. Indications of allowed MV precisions may be signaled in SPS/PPS/VPS/sequence header/picture header/slice header/group of CTUs, etc. al.
d. The signaling of selected MV precision from a set of allowed MV precisions further depend on number of allowed MV precisions for a block.

2. A syntax element is signaled to the decoder to indicate the used MVD precision in affine inter mode.
   a. In one example, only one single syntax element is used to indicate the MVD precisions applied to the affine mode and the AMVR mode.
      i. In one example, same semantics are used, that is, the same value of syntax element is mapped to the same MVD precision for the AMVR and affine mode.
      ii. Alternatively, the semantics of the single syntax element is different for the AMVR mode and the affine mode. That is, the same value of syntax element could be mapped to different MVD precision for the AMVR and affine mode.
   b. In one example, when affine mode uses same set of MVD precisions with AMVR (e.g., MVD precision set is {1, 1/4, 4}-pel), the MVD precision syntax element in AMVR is reused in affine mode, i.e., only one single syntax element is used.
      i. Alternatively, furthermore, when encoding/decoding this syntax element in CABAC encoder/decoder, same or different context models may be used for AMVR and affine mode.
      ii. Alternatively, furthermore, this syntax element may have different semantics in AMVR and affine mode. For example, the syntax element equal to 0, 1 and 2 indicates 1/4-pel, 1-pel and 4-pel MV precision respectively in AMVR, while in affine mode, the syntax element equal to 0, 1 and 2 indicates 1/4-pel, 1/16-pel and 1-pel MV precision respectively.
   c. In one example, when affine mode uses same number of MVD precisions with AMVR but different sets of MVD precisions (e.g., MVD precision set for AMVR is {1, 1/4, 4}-pel while for affine, it is {1/16, 1/4, 1}-pel), the MVD precision syntax element in AMVR is reused in affine mode, i.e., only one single syntax element is used.
      i. Alternatively, furthermore, when encoding/decoding this syntax element in CABAC encoder/decoder, same or different context models may be used for AMVR and affine mode.
      ii. Alternatively, furthermore, this syntax element may have different semantics in AMVR and affine mode.
   d. In one example, affine mode uses less MVD precisions than AMVR, the MVD precision syntax element in AMVR is reused in affine mode. However, only a subset of the syntax element values is valid for affine mode.
      i. Alternatively, furthermore, when encoding/decoding this syntax element in CABAC encoder/decoder, same or different context models may be used for AMVR and affine mode.
      ii. Alternatively, furthermore, this syntax element may have different semantics in AMVR and affine mode.
   e. In one example, affine mode uses more MVD precisions than AMVR, the MVD precision syntax element in AMVR is reused in affine mode. However, such syntax element is extended to allow more values in affine mode.
      i. Alternatively, furthermore, when encoding/decoding this syntax element in CABAC encoder/decoder, same or different context models may be used for AMVR and affine mode.
      ii. Alternatively, furthermore, this syntax element may have different semantics in AMVR and affine mode.
   f. In one example, a new syntax element is used for coding the MVD precision of affine mode, i.e., two different syntax elements are used for coding the MVD precision of AMVR and affine mode.
   g. The syntax for indication of MVD precisions for the affine mode may be signaled under one or all of the following conditions are true:
      i. MVDs for all control points are non-zero.
      ii. MVDs for at least one control point is non-zero.
      iii. MVD of one control point (e.g., the first CPMV) are non-zero
   In this case, when either one of the above conditions or all of them fail, there is no need to signal the MVD precisions.
   h. The syntax element for indication of MVD precisions for either affine mode or the AMVR mode may be coded with contexts and the contexts are dependent on coded information.
      i. In one example, when there is only one single syntax element, the contexts may depend on whether current block is coded with affine mode or not.
   i. In one example, the context may depend on the block size/block shape/MVD precisions of neighboring blocks/temporal layer index/prediction directions, etc. al.
   j. Whether to enable or disable the usage of multiple MVD precisions for the affine mode may be signaled in SPS/PPS/VPS/sequence header/picture header/slice header/group of CTUs, etc. al.
      i. In one example, whether to signal the information of enable or disable the usage of multiple MVD precisions for the affine mode may depend on other syntax elements. For example, the information of enable or disable the usage of multiple MV and/or MVP and/or MVD precisions for the affine mode is signaled when affine mode is enabled; and is not signaled and inferred to be 0 when affine mode is disabled.
   k. Alternatively, multiple syntax elements may be signaled to indicate the used MV and/or MVP and/or MVD precision (in the following discussion, they are all referred to as "MVD precision") in affine inter mode.
      i. In one example, the syntax elements used to indicate the used MVD precision in affine inter mode and normal inter mode may be different.
         1. The number of syntax elements to indicate the used MVD precision in affine inter mode and normal inter mode may be different.
         2. The semantics of the syntax elements to indicate the used MVD precision in affine inter mode and normal inter mode may be different.
         3. The context models in arithmetic coding to code one syntax elements to indicate the used MVD precision in affine inter mode and normal inter mode may be different.
         4. The methods to derive context models in arithmetic coding to code one syntax element to indicate the used MVD precision in affine inter mode and normal inter mode may be different.
      ii. In one example, a first syntax element (e.g. amvr_flag) may be signaled to indicate whether to apply AMVR in an affine-coded block.

1. The first syntax element is conditionally signaled.
   a. In one example, signalling of the first syntax element (amvr_flag) is skipped when current block is coded with certain mode (e.g., CPR/IBC mode).
   b. In one example, signalling of the first syntax element (amvr_flag) is skipped when all CPMVs' MVDs (including both horizontal and vertical components) are all zero.
   c. In one example, signalling of the first syntax element (amvr_flag) is skipped when one selected CPMVs' MVDs (including both horizontal and vertical components) are all zero.
      i. In one example, the selected CPMV's MVD is the first CPMV's MVD to be coded/decoded.
   d. In one example, signalling of the first syntax element (amvr_flag) is skipped when the usage of enabling multiple MVD precisions for affine-coded block is false.
   e. In one example, the first syntax element may be signaled under the following conditions:
      i. Usage of enabling multiple MVD precisions for affine-coded block is true and current block is coded with affine mode;
      ii. Alternatively, usage of enabling multiple MVD precisions for affine-coded block is true, current block is coded with affine mode, and at least one component of a CPMV's MVD is unequal to 0.
      iii. Alternatively, usage of enabling multiple MVD precisions for affine-coded block is true, current block is coded with affine mode, and at least one component of a selected CPMV's MVD is unequal to 0.
         1. In one example, the selected CPMV's MVD is the first CPMV's MVD to be coded/decoded.
2. When AMVR is not applied to an affine-coded block or the first syntax element is not present, a default MV and/or MVD precision is utilized.
   a. In one example, the default precision is ¼-pel.
   b. Alternatively, the default precision is set to that used in motion compensation for affine coded blocks.
3. For example, the MVD precision of affine mode is ¼-pel if amvr_flag is equal to 0; otherwise the MVD precision of affine mode may be other values.
   a. Alternatively, furthermore, the additional MVD precisions may be further signaled via a second syntax element.
iii. In one example, a second syntax element (such as amvr_coarse_precision_flag) may be signaled to indicate the MVD precision of affine mode.
   1. In one example, whether the second syntax element is signaled may depend on the first syntax element. For example, the second syntax element is only signaled when the first syntax element is 1.
   2. In one example, the MVD precision of affine mode is 1-pel if the second syntax element is 0; otherwise, the MVD precision of affine mode is 1/16-pel.
   3. In one example, the MVD precision of affine mode is 1/16-pel if the second syntax element is 0; otherwise, the MVD precision of affine mode is full-pixel.
iv. In one example, a syntax element used to indicate the used MVD precision in affine inter mode share the same context models as the syntax element with the same name but used to indicate the used MVD precision in normal inter mode.
   1. Alternatively, a syntax element used to indicate the used MVD precision in affine inter mode use different context models as the syntax element with the same name but used to indicate the used MVD precision in normal inter mode.
3. Whether to apply or how to apply AMVR on an affine coded block may depend on the reference picture of the current block.
   i. In one example, AMVR is not applied if the reference picture is the current picture, i.e., Intra block copying is applied in the current block.

Fast Algorithm of AVMR in Affine Mode for Encoder

Denote RD cost (real RD cost, or SATD/SSE/SAD cost plus rough bits cost) of affine mode and AMVP mode as affineCosti and amvpCosti for IMV=i, where in i=0, 1 or 2. Here, IMV=0 means ¼ pel MV, and IMV=1 means integer MV for AMVP mode and 1/16 pel MV for affine mode, and IMV=2 means 4 pel MV for AMVP mode and integer MV for affine mode. Denote RD cost of merge mode as mergeCost.

4. It is proposed that AMVR is disabled for affine mode of current CU if the best mode of its parent CU is not AF_INTER mode or AF_MERGE mode.
   a. Alternatively, AMVR is disabled for affine mode of current CU if the best mode of its parent CU is not AF_INTER mode
5. It is proposed that AMVR is disabled for affine mode if affineCost0>th1*amvpCost0, wherein th1 is a positive threshold.
   a. Alternatively, in addition, AMVR is disabled for affine mode if min(affineCost0, amvpCost0)>th2*mergeCost, wherein th2 is a positive threshold.
   b. Alternatively, in addition, integer MV is disabled for affine mode if affineCost0>th3*affineCost1, wherein th3 is a positive threshold.
6. It is proposed that AMVR is disabled for AMVP mode if amvpCost0>th4*affineCost0, wherein th4 is a positive threshold.
   a. Alternatively, AMVR is disabled for AMVP mode if min(affineCost0, amvpCost0)>th5*mergeCost, wherein th5 is a positive threshold.
7. It is proposed that 4/6 parameter affine models obtained in one MV precision may be used as a candidate start search point for other MV precisions.
   a. In one example, 4/6 parameter affine models obtained in 1/16 MV may be used as a candidate start search point for other MV precisions.
   b. In one example, 4/6 parameter affine models obtained in ¼ MV may be used as a candidate start search point for other MV precisions.
8. AMVR for affine mode is not checked at encoder for the current block if its parent block does not choose the affine mode.
9. Statistics of usage of different MV precisions for affine-coded blocks in previously coded frames/slices/tiles/CTU rows may be utilized to early terminate the rate-distortion calculations of MV precisions for affine-coded blocks in current slice/tile/CTU row.
   a. In one example, the percentage of affine-coded blocks with a certain MV precision is recorded. If the percentage is too low, then the checking of the corresponding MV precision is skipped.

b. In one example, previously coded frames with the same temporal layer are utilized to decide whether to skip a certain MV precision.

10. The above proposed method may be applied under certain conditions, such as block sizes, slice/picture/tile types, or motion information.

a. In one example, when a block size contains smaller than M*H samples, e.g., 16 or 32 or 64 luma samples, proposed method is not allowed.

b. Alternatively, when minimum size of a block's width or/and height is smaller than or no larger than X, proposed method is not allowed. In one example, X is set to 8.

c. Alternatively, when minimum size of a block's width or/and height is no smaller than X, proposed method is not allowed. In one example, X is set to 8.

d. Alternatively, when a block's width>th1 or >=th1 and/or a block's height>th2 or >=th2, proposed method is not allowed. In one example, th1 and/or th2 is set to 8.

e. Alternatively, when a block's width<th1 or <=th1 and/or a block's height <th2 or <a=th2, proposed method is not allowed. In one example, th1 and/or th2 is set to 8.

f. Alternatively, whether to enable or disable the above methods and/or which method to be applied may be dependent on block dimension, video processing data unit (VPDU), picture type, low delay check flag, coded information of current block (such as reference pictures, uni or bi-prediction) or previously coded blocks.

11. The AMVR methods for affine mode may be performed in different ways when intra block copy (IBC, a.k.a. current picture reference (CPR)) is applied or not.

a. In one example, AMVR for affine mode cannot be used if a block is coded by IBC.

b. In one example, AMVR for affine mode may be used if a block is coded by IBC, but the candidate MV/MVD/MVP precisions may be different to those used for non-IBC coded affine-coded block.

12. All the term "slice" in the document may be replaced by "tile group" or "tile".

13. In VPS/SPS/PPS/slice header/tile group header, a syntax element (e.g. no_amvr_constraint_flag) equal to 1 specifies that it is a requirement of bitstream conformance that both the syntax element to indicate whether AMVR is enabled (e.g. sps_amvr_enabled_flag) and the syntax element to indicate whether affine AMVR is enabled (e.g. sps_affine_avmr_enabled_flag) shall be equal to 0. The syntax element (e.g. no_amvr_constraint_flag) equal to 0 does not impose a constraint.

14. In VPS/SPS/PPS/slice header/tile group header or other video data units, a syntax element (e.g. no_affine_amvr_constraint_flag) may be signalled.

a. In one example, no_affine_amvr_constraint_flag equal to 1 specifies that it is a requirement of bitstream conformance that the syntax element to indicate whether affine AMVR is enabled (e.g. sps_affine_avmr_enabled_flag) shall be equal to 0. The syntax element (e.g. no_affine_amvr_constraint_flag) equal to 0 does not impose a constraint

5. EMBODIMENTS

5.1 Embodiment 1: Indication of Usage of Affine AMVR Mode

It may be signaled in SPS/PPS/VPS/APS/sequence header/picture header/tile group header, etc. al. This section presents the signalling in SPS.

5.1.1. SPS Syntax Table

| | Descriptor |
|---|---|
| seq_parameter_set_rbsp( ) { | |
|   sps_seq_parameter_set_id | ue(v) |
|   ... | |
|   sps_amvr_enabled_flag | u(1) |
|   sps_bdof_enabled_flag | u(1) |
|   sps_affine_amvr_enabled_flag | u(1) |
|   sps_cclm_enabled_flag | u(1) |
|   sps_mts_intra_enabled_flag | u(1) |
|   sps_mts_inter_enabled_flag | u(1) |
|   sps_affine_enabled_flag | u(1) |
|   if( sps_affine_enabled_flag ) | |
|     sps_affine_type_flag | u(1) |
|   sps_gbi_enabled_flag | u(1) |
|   sps_cpr_enabled_flag | u(1) |
|   ... | |
|   rbsp_trailing_bits( ) | |
| } | |

An alternative SPS syntax table is given as follows:

| | Descriptor |
|---|---|
| seq_parameter_set_rbsp( ) { | |
|   sps_seq_parameter_set_id | ue(v) |
|   sps_amvr_enabled_flag | u(1) |
|   sps_bdof_enabled_flag | u(1) |
|   sps_cclm_enabled_flag | u(1) |
|   sps_mts_intra_enabled_flag | u(1) |
|   sps_mts_inter_enabled_flag | u(1) |
|   sps_affine_enabled_flag | u(1) |
|   if( sps_affine_enabled_flag ){ | |
|     sps_affine_type_flag | u(1) |
|     sps_affine_amvr_enabled_flag | u(1) |
|   } | |
|   sps_gbi_enabled_flag | u(1) |
|   sps_cpr_enabled_flag | u(1) |
|   sps_ciip_enabled_flag | u(1) |
|   sps_triangle_enabled_flag | u(1) |
|   sps_ladf_enabled_flag | u(1) |
|   ... | |
|   rbsp_trailing_bits( ) | |
| } | |

Semantics sps_affine_amvr_enabled_flag equal to 1 specifies that adaptive motion vector difference resolution is used in motion vector coding of affine inter mode. amvr_enabled_flag equal to 0 specifies that adaptive motion vector difference resolution is not used in motion vector coding of affine inter mode.

5.2 Parsing Process of Affine AMVR Mode Information

Syntax of the affine AMVR mode information may reuse that for the AMVR mode information (applied to normal inter mode). Alternatively, different syntax elements may be utilized. Affine AMVR mode information may be conditionally signaled. Different embodiments below show some examples of the conditions.

5.2.1. Embodiment #1: CU Syntax Table

| | Descriptor |
|---|---|
| coding_unit( x0, y0, cbWidth, cbHeight, treeType ) { | |
|   if( tile_group_type != I ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|   ... | |
|   } | |
|   } else if( treeType != DUAL_TREE_CHROMA ) { /* MODE_INTER */ | |
|     if( cu_skip_flag[ x0 ][ y0 ] = = 0 ) | |
|       merge_flag[ x0 ][ y0 ] | ae(v) |
|     if( merge_flag[ x0 ][ y0 ] ) { | |
|       merge_data( x0, y0, cbWidth, cbHeight ) | |
|     } else { | |
|       if( tile_group_type = = B ) | |
|         inter_pred_idc[ x0 ][ y0 ] | ae(v) |
|       if( sps_affine_enabled_flag && cbWidth >= 16 && cbHeight >= 16 ) { | |
|         inter_affine_flag[ x0 ][ y0 ] | ae(v) |
|         if( sps_affine_type_flag && inter_affine_flag[ x0 ][ y0 ] ) | |
|           cu_affine_type_flag[ x0 ][ y0 ] | ae(v) |
|       } | |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0, 0 ) | |
|         if( MotionModelIdc[ x0 ][ y0 ] > 0 ) | |
|           mvd_coding( x0, y0, 0, 1 ) | |
|         if(MotionModelIdc[ x0 ][ y0 ] > 1 ) | |
|           mvd_coding( x0, y0, 0, 2 ) | |
|         mvp_l0_flag[ x0 ][ y0 ] | ae(v) |
|       } else { | |
|         MvdL0[ x0 ][ y0 ][ 0 ] = 0 | |
|         MvdL0[ x0 ][ y0 ][ 1 ] = 0 | |
|       } | |
|       if( inter_pred_idc[ x0 ][ y0 ] != PRED_L0 ) { | |
|         if( num_ref_idx_l1_active_minus1 > 0 ) | |
|           ref_idx_l1[ x0 ][ y0 ] | ae(v) |
|         if( mvd_l1_zero_flag && inter_pred_idc[ x0 ][ y0 ] = = PRED_BI ) { | |
|           MvdL1[ x0 ][ y0 ][ 0 ] = 0 | |
|           MvdL1[ x0 ][ y0 ][ 1 ] = 0 | |
|           MvdCpL1[ x0 ][ y0 ][ 0 ][ 0 ] = 0 | |
|           MvdCpL1[ x0 ][ y0 ][ 0 ][ 1 ] = 0 | |
|           MvdCpL1[ x0 ][ y0 ][ 1 ][ 0 ] = 0 | |
|           MvdCpL1[ x0 ][ y0 ][ 1 ][ 1 ] = 0 | |
|           MvdCpL1[ x0 ][ y0 ][ 2 ][ 0 ] = 0 | |
|           MvdCpL1[ x0 ][ y0 ][ 2 ][ 1 ] = 0 | |
|         } else { | |
|           mvd_coding( x0, y0, 1, 0 ) | |
|           if( MotionModelIdc[ x0 ][ y0 ] > 0 ) | |
|             mvd_coding( x0, y0, 1, 1 ) | |
|           if(MotionModelIdc[ x0 ][ y0 ] > 1 ) | |
|             mvd_coding( x0, y0, 1, 2 ) | |
|           mvp_l1_flag[ x0 ][ y0 ] | ae(v) |
|         } else { | |
|           MvdL1[ x0 ][ y0 ][ 0 ] = 0 | |
|           MvdL1[ x0 ][ y0 ][ 1 ] = 0 | |
|         } | |
|       if( ( sps_amvr_enabled_flag && inter_affine_flag = = 0 && | |
|         ( MvdL0[ x0 ][ y0 ][ 0 ] != 0 \|\| MvdL0[ x0 ][ y0 ][ 1 ] != 0 \|\| | |
|           MvdL1[ x0 ][ y0 ][ 0 ] != 0 \|\| MvdL1[ x0 ][ y0 ][ 1 ] != 0 ) ) \|\| | |
|         ( sps_affine_amvr_enabled_flag && inter_affine_flag = = 1 && | |
|           ( MvdCpL0[ x0 ][ y0 ][ 0 ][ 0 ] != 0 \|\| | |
| MvdCpL0[ x0 ][ y0 ][ 0 ][ 1 ] != 0 \|\| | |
|           MvdCpL1[ x0 ][ y0 ][ 0 ][ 0 ] != 0 \|\| | |
| MvdCpL1[ x0 ][ y0 ][ 0 ][ 1 ] != 0 \|\| | |
|           MvdCpL0[ x0 ][ y0 ][ 1 ][ 0 ] != 0 \|\| | |
| MvdCpL0[ x0 ][ y0 ][ 1 ][ 1 ] != 0 \|\| | |

|  | Descriptor |
|---|---|
|         MvdCpL1[ x0 ][ y0 ][ 1 ][ 0 ] != 0 \|\|<br>MvdCpL1[ x0 ][ y0 ][ 1 ][ 1 ] != 0 \|\|<br>        MvdCpL0[ x0 ][ y0 ][ 2 ][ 0 ] != 0 \|\|<br>MvdCpL0[ x0 ][ y0 ][ 2 ][ 1 ] != 0 \|\|<br>        MvdCpL1[ x0 ][ y0 ][ 2 ][ 0 ] != 0 \|\|<br>MvdCpL1[ x0 ][ y0 ][ 2 ][ 1 ] != 0 ) ) ) {<br>        if( !sps_cpr_enabled_flag \|\| !(<br>inter_pred_idc[ x0 ][ y0 ] == PRED_L0 &&<br>  ref_idx_l0[ x0 ][ y0 ] == num_ref_idx_l0_active_minus1 ) )<br>          amvr_flag[ x0 ][ y0 ] | ae(v) |
|         if( amvr_flag[ x0 ][ y0 ] )<br>          amvr_coarse_precisoin_flag[ x0 ][ y0 ] | ae(v) |
|         }<br>        if( sps_gbi_enabled_flag && inter_pred_idc[ x0 ][ y0 ] ==<br>PRED_BI &&<br>        cbWidth * cbHeight >= 256 )<br>          gbi_idx[ x0 ][ y0 ] | ae(v) |
|     }<br>  }<br>  if( !pcm_flag[ x0 ][ y0 ] ) {<br>    if( CuPredMode[ x0 ][ y0 ] != MODE_INTRA &&<br>cu_skip_flag[ x0 ][ y0 ] == 0 )<br>      cu_cbf | ae(v) |
|     if( cu_cbf )<br>      transform_tree( x0, y0, cbWidth, cbHeight, treeType )<br>  }<br>} | |

5.2.2. Embodiment 2: An Alternative CU Syntax Table Design

|  | Descriptor |
|---|---|
| coding_unit( x0, y0, cbWidth, cbHeight, treeType ) {<br>  if( tile_group_type != I ) {<br>    if( treeType != DUAL_TREE_CHROMA )<br>      cu_skip_flag[ x0 ][ y0 ] | ae(v) |
|     if( cu_skip_flag[ x0 ][ y0 ] == 0 )<br>      pred_mode_flag | ae(v) |
|   }<br>  if( CuPredMode[ x0 ][ y0 ] == MODE_INTRA ) {<br>...<br>  }<br>  } else if( treeType != DUAL_TREE_CHROMA ) { /* MODE_INTER */<br>    if( cu_skip_flag[ x0 ][ y0 ] == 0 )<br>      merge_flag[ x0 ][ y0 ] | ae(v) |
|     if( merge_flag[ x0 ][ y0 ] ) {<br>      merge_data( x0, y0, cbWidth, cbHeight )<br>    } else {<br>      if( tile_group_type == B )<br>        inter_pred_idc[ x0 ][ y0 ] | ae(v) |
|       if( sps_affine_enabled_flag && cbWidth >=16 &&<br>cbHeight >= 16 ) {<br>        inter_affine_flag[ x0 ][ y0 ] | ae(v) |
|         if( sps_affine_type_flag &&<br>inter_affine_flag[ x0 ][ y0 ] )<br>          cu_affine_type_flag[ x0 ][ y0 ] | ae(v) |
|       }<br>      if( inter_pred_idc[ x0 ][ y0 ] != PRED_L1 ) {<br>        if( num_ref_idx_l0_active_minus1 > 0 )<br>          ref_idx_l0[ x0 ][ y0 ] | ae(v) |
|         mvd_coding( x0, y0, 0, 0 )<br>        if( MotionModelIdc[ x0 ][ y0 ] > 0 )<br>          mvd_coding( x0, y0, 0, 1 )<br>        if(MotionModelIdc[ x0 ][ y0 ] > 1 )<br>          mvd_coding( x0, y0, 0, 2 )<br>        mvp_l0_flag[ x0 ][ y0 ] | ae(v) |
|       } else {<br>        MvdL0[ x0 ][ y0 ][ 0 ] = 0<br>        MvdL0[ x0 ][ y0 ][ 1 ] = 0<br>      }<br>      if( inter_pred_idc[ x0 ][ y0 ] != PRED_L0 ) {<br>        if( num_ref_idx_l1_active_minus1 > 0 ) | |

-continued

| | Descriptor |
|---|---|
| ref_idx_l1[ x0 ][ y0 ] | ae(v) |
| if( mvd_l1_zero_flag && inter_pred_idc[ x0 ][ y0 ] = = PRED_BI ) { | |
|     MvdL1[ x0 ][ y0 ][ 0 ] = 0 | |
|     MvdL1[ x0 ][ y0 ][ 1 ] = 0 | |
|     MvdCpL1[ x0 ][ y0 ][ 0 ][ 0 ] = 0 | |
|     MvdCpL1[ x0 ][ y0 ][ 0 ][ 1 ] = 0 | |
|     MvdCpL1[ x0 ][ y0 ][ 1 ][ 0 ] = 0 | |
|     MvdCpL1[ x0 ][ y0 ][ 1 ][ 1 ] = 0 | |
|     MvdCpL1[ x0 ][ y0 ][ 2 ][ 0 ] = 0 | |
|     MvdCpL1[ x0 ][ y0 ][ 2 ][ 1 ] = 0 | |
| } else { | |
|     mvd_coding( x0, y0, 1, 0 ) | |
|     if( MotionModelIdc[ x0 ][ y0 ] > 0 ) | |
|         mvd_coding( x0, y0, 1, 1 ) | |
|     if(MotionModelIdc[ x0 ][ y0 ] > 1 ) | |
|         mvd_coding( x0, y0, 1, 2 ) | |
|     mvp_l1_flag[ x0 ][ y0 ] | ae(v) |
| } else { | |
|     MvdL1[ x0 ][ y0 ][ 0 ] = 0 | |
|     MvdL1[ x0 ][ y0 ][ 1 ] = 0 | |
| } | |
| if( ( sps_amvr_enabled_flag && inter_affine_flag = = 0 && | |
|     ( MvdL0[ x0 ][ y0 ][ 0 ] != 0 \|\| MvdL0[ x0 ][ y0 ][ 1 ] != 0 \|\| | |
|       MvdL1[ x0 ][ y0 ][ 0 ] != 0 \|\| MvdL1[ x0 ][ y0 ][ 1 ] != 0 ) ) \|\| | |
|     ( sps_affine_amvr_enabled_flag && inter_affine_flag = = 1 && | |
|       ( MvdCpL0[ x0 ][ y0 ][ 0 ][ 0 ] != 0 \|\| MvdCpL0[ x0 ][ y0 ][ 0 ][ 1 ] != 0 \|\| | |
|         MvdCpL1[ x0 ][ y0 ][ 0 ][ 0 ] != 0 \|\| MvdCpL1[ x0 ][ y0 ][ 0 ][ 1 ] != 0 ) ) ) { | |
|     if( !sps_cpr_enabled_flag \|\| !( inter_pred_idc[ x0 ][ y0 ] = = PRED_L0 && | |
|       ref_idx_l0[ x0 ][ y0 ] = = num_ref_idx_l0_active_minus1 ) ) | |
|       amvr_flag[ x0 ][ y0 ] | ae(v) |
|     if( amvr_flag[ x0 ][ y0 ] ) | |
|       amvr_coarse_precisoin_flag[ x0 ][ y0 ] | ae(v) |
| } | |
| if( sps_gbi_enabled_flag && inter_pred_idc[ x0 ][ y0 ] = = PRED_BI && | |
|     cbWidth * cbHeight >= 256 ) | |
|     gbi_idx[ x0 ][ y0 ] | ae(v) |
| } | |
| } | |
| if( !pcm_flag[ x0 ][ y0 ] ) { | |
|   if( CuPredMode[ x0 ][ y0 ] != MODE_INTRA && cu_skip_flag[ x0 ][ y0 ] = = 0 ) | |
|     cu_cbf | ae(v) |
|   if( cu_cbf ) | |
|     transform_tree( x0, y0, cbWidth, cbHeight, treeType ) | |
| } | |
| } | |

5.2.3. Embodiment 3: A ThirdCU Syntax Table Design

| | Descriptor |
|---|---|
| coding_unit( x0, y0, cbWidth, cbHeight, treeType ) { | |
|   if( tile_group_type != I ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|     ... | |
|   } | |
|   } else if( treeType != DUAL_TREE_CHROMA ) { /* MODE_INTER */ | |
|     if( cu_skip_flag[ x0 ][ y0 ] = = 0 ) | |

|  | Descriptor |
|---|---|
|     merge_flag[ x0 ][ y0 ] | ae(v) |
|     if( merge_flag[ x0 ][ y0 ] ) { | |
|       merge_data( x0, y0, cbWidth, cbHeight ) | |
|     } else { | |
|       if( tile_group_type = = B ) | |
|         inter_pred_idc[ x0 ][ y0 ] | ae(v) |
|       if( sps_affine_enabled_flag && cbWidth >= 16 && cbHeight >= 16 ) { | |
|         inter_affine_flag[ x0 ][ y0 ] | ae(v) |
|         if( sps_affine_type_flag && inter_affine_flag[ x0 ][ y0 ] ) | |
|           cu_affine_type_flag[ x0 ][ y0 ] | ae(v) |
|       } | |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0, 0 ) | |
|         if( MotionModelIdc[ x0 ][ y0 ] > 0 ) | |
|           mvd_coding( x0, y0, 0, 1 ) | |
|         if(MotionModelIdc[ x0 ][ y0 ] > 1 ) | |
|           mvd_coding( x0, y0, 0, 2 ) | |
|         mvp_l0_flag[ x0 ][ y0 ] | ae(v) |
|       } else { | |
|         MvdL0[ x0 ][ y0 ][ 0 ] = 0 | |
|         MvdL0[ x0 ][ y0 ][ 1 ] = 0 | |
|       } | |
|       if( inter_pred_idc[ x0 ][ y0 ] != PRED_L0 ) { | |
|         if( num_ref_idx_l1_active_minus1 > 0 ) | |
|           ref_idx_l1[ x0 ][ y0 ] | ae(v) |
|         if( mvd_l1_zero_flag && inter_pred_idc[ x0 ][ y0 ] = = PRED_BI ) { | |
|           MvdL1[ x0 ][ y0 ][ 0 ] = 0 | |
|           MvdL1[ x0 ][ y0 ][ 1 ] = 0 | |
|           MvdCpL1[ x0 ][ y0 ][ 0 ][ 0 ] = 0 | |
|           MvdCpL1[ x0 ][ y0 ][ 0 ][ 1 ] = 0 | |
|           MvdCpL1[ x0 ][ y0 ][ 1 ][ 0 ] = 0 | |
|           MvdCpL1[ x0 ][ y0 ][ 1 ][ 1 ] = 0 | |
|           MvdCpL1[ x0 ][ y0 ][ 2 ][ 0 ] = 0 | |
|           MvdCpL1[ x0 ][ y0 ][ 2 ][ 1 ] = 0 | |
|         } else { | |
|           mvd_coding( x0, y0, 1, 0 ) | |
|           if( MotionModelIdc[ x0 ][ y0 ] > 0 ) | |
|             mvd_coding( x0, y0, 1, 1 ) | |
|           if(MotionModelIdc[ x0 ][ y0 ] > 1 ) | |
|             mvd_coding( x0, y0, 1, 2 ) | |
|           mvp_l1_flag[ x0 ][ y0 ] | ae(v) |
|         } else { | |
|           MvdL1[ x0 ][ y0 ][ 0 ] = 0 | |
|           MvdL1[ x0 ][ y0 ][ 1 ] = 0 | |
|         } | |
|       if( ( sps_amvr_enabled_flag && inter_affine_flag = = 0 && | |
|         ( MvdL0[ x0 ][ y0 ][ 0 ] != 0 \|\| MvdL0[ x0 ][ y0 ][ 1 ] != 0 \|\| | |
|           MvdL1[ x0 ][ y0 ][ 0 ] != 0 \|\| MvdL1[ x0 ][ y0 ][ 1 ] != 0 ) ) \|\| | |
|         ( sps_affine_amvr_enabled_flag && inter_affine_flag = = 1 ) ) { | |
|         if( !sps_cpr_enabled_flag \|\| !( inter_pred_idc[ x0 ][ y0 ] = = PRED_L0 && | |
|           ref_idx_l0[ x0 ][ y0 ] = = num_ref_idx_l0_active_minus1 ) ) | |
|           amvr_flag[ x0 ][ y0 ] | ae(v) |
|         if( amvr_flag[ x0 ][ y0 ] ) | |
|           amvr_coarse_precisoin_flag[ x0 ][ y0 ] | ae(v) |
|       } | |
|       if( sps_gbi_enabled_flag && inter_pred_idc[ x0 ][ y0 ] = = PRED_BI && | |
|         cbWidth * cbHeight >= 256 ) | |
|         gbi_idx[ x0 ][ y0 ] | ae(v) |
|     } | |
|   } | |
|   if( !pcm_flag[ x0 ][ y0 ] ) { | |
|     if( CuPredMode[ x0 ][ y0 ] != MODE_INTRA && cu_skip_flag[ x0 ][ y0 ] = = 0 ) | |

|  | Descriptor |
|---|---|
|     cu_cbf<br>   if( cu_cbf )<br>    transform_tree( x0, y0, cbWidth, cbHeight, treeType )<br>  }<br>} | ae(v) |

5.2.4. Embodiment 4: Syntax Table Design with Different Syntax for AMVR and Affine AMVR Mode

```
coding_unit( x0, y0, cbWidth, cbHeight, treeType ) {
  if( tile_group_type != I ) {
    if( treeType != DUAL_TREE_CHROMA )
      cu_skip_flag[ x0 ][ y0 ]
    if( cu_skip_flag[ x0 ][ y0 ] = = 0 )
      pred_mode_flag
  }
  if( CuPredMode[ x0 ][ y0 ] = = MODE_INTRA ) {
...
  }
  } else if( treeType != DUAL_TREE_CHROMA ) { /* MODE_INTER */
    if( cu_skip_flag[ x0 ][ y0 ] = = 0 )
      merge_flag[ x0 ][ y0 ]
    if( merge_flag[ x0 ][ y0 ] ) {
      merge_data( x0, y0, cbWidth, cbHeight )
    } else {
      if( tile_group_type = = B )
        inter_pred_idc[ x0 ][ y0 ]
      if( sps_affine_enabled_flag && cbWidth >= 16 && cbHeight >= 16 ) {
        inter_affine_flag[ x0 ][ y0 ]
        if( sps_affine_type_flag && inter_affine_flag[ x0 ][ y0 ] )
          cu_affine_type_flag[ x0 ][ y0 ]
      }
      if( inter_pred_idc[ x0 ][ y0 ] != PRED_L1 ) {
        if( num_ref_idx_l0_active_minus1 > 0 )
          ref_idx_l0[ x0 ][ y0 ]
        mvd_coding( x0, y0, 0, 0 )
        if( MotionModelIdc[ x0 ][ y0 ] > 0 )
          mvd_coding( x0, y0, 0, 1 )
        if(MotionModelIdc[ x0 ][ y0 ] > 1 )
          mvd_coding( x0, y0, 0, 2 )
        mvp_l0_flag[ x0 ][ y0 ]
      } else {
        MvdL0[ x0 ][ y0 ][ 0 ] = 0
        MvdL0[ x0 ][ y0 ][ 1 ] = 0
      }
      if( inter_pred_idc[ x0 ][ y0 ] != PRED_L0 ) {
        if( num_ref_idx_l1_active_minus1 > 0 )
          ref_idx_l1[ x0 ][ y0 ]
        if( mvd_l1_zero_flag && inter_pred_idc[ x0 ][ y0 ] = = PRED_BI ) {
          MvdL1[ x0 ][ y0 ][ 0 ] = 0
          MvdL1[ x0 ][ y0 ][ 1 ] = 0
          MvdCpL1[ x0 ][ y0 ][ 0 ][ 0 ] = 0
          MvdCpL1[ x0 ][ y0 ][ 0 ][ 1 ] = 0
          MvdCpL1[ x0 ][ y0 ][ 1 ][ 0 ] = 0
          MvdCpL1[ x0 ][ y0 ][ 1 ][ 1 ] = 0
          MvdCpL1[ x0 ][ y0 ][ 2 ][ 0 ] = 0
          MvdCpL1[ x0 ][ y0 ][ 2 ][ 1 ] = 0
        } else {
          mvd_coding( x0, y0, 1, 0 )
          if( MotionModelIdc[ x0 ][ y0 ] > 0 )
            mvd_coding( x0, y0, 1, 1 )
          if(MotionModelIdc[ x0 ][ y0 ] > 1 )
            mvd_coding( x0, y0, 1, 2 )
          mvp_l1_flag[ x0 ][ y0 ]
```

```
      } else {
        MvdL1[ x0 ][ y0 ][ 0 ] = 0
        MvdL1[ x0 ][ y0 ][ 1 ] = 0
      }
      if(sps_amvr_enabled_flag && inter_affine_flag = = 0 &&
        ( MvdL0[ x0 ][ y0 ][ 0 ] != 0 ||
MvdL0[ x0 ][ y0 ][ 1 ] != 0 ||
          MvdL1[ x0 ][ y0 ][ 0 ] != 0 ||
MvdL1[ x0 ][ y0 ][ 1 ] != 0 )) {
          if( !sps_cpr_enabled_flag || !(
inter_pred_idc[ x0 ][ y0 ] = = PRED_L0 &&
  ref_idx_l0[ x0 ][ y0 ] = = num_ref_idx_l0_active_minus1 ) )
            amvr_flag[ x0 ][ y0 ]
          if( amvr_flag[ x0 ][ y0 ] )
            amvr_coarse_precisoin_flag[ x0 ][ y0 ]
      } else if (conditionsA) {
        if(conditionsB)
          affine_amvr_flag[ x0 ][ y0 ]
        if( amvr_flag[ x0 ][ y0 ] )
          affine_amvr_coarse_precisoin_flag[ x0 ][ y0 ]
      }
      if( sps_gbi_enabled_flag && inter_pred_idc[ x0 ][ y0 ] = =
PRED_BI &&
          cbWidth * cbHeight >= 256 )
        gbi_idx[ x0 ][ y0 ]
    }
  }
  if( !pcm_flag[ x0 ][ y0 ] ) {
    if( CuPredMode[ x0 ][ y0 ] != MODE_INTRA &&
cu_skip_flag[ x0 ][ y0 ] = = 0 )
      cu_cbf
    if( cu_cbf )
      transform_tree( x0, y0, cbWidth, cbHeight, treeType )
  }
}
```

In one example, conditionsA is defined as follows:

(sps_affine_amvr_enabled_flag && inter_affine_f-
  lag==1 && (MvdCpL0[x0][y0][0][0]!=0||
  MvdCpL0[x0][y0][0][1]!=0|| MvdCpL1[x0][y0]
  [0][0]!=0|| MvdCpL1[x0][y0][0][1]!=0||
  MvdCpL0[x0][y0][1][0]!=0|| MvdCpL0[x0][y0]
  [1][1]!=0|| MvdCpL1[x0][y0][1][0]!=0||
  MvdCpL1[x0][y0][1][1]!=0|| MvdCpL0[x0][y0]
  [2][0]!=0|| MvdCpL0[x0][y0][2][1]!=0||
  MvdCpL1[x0][y0][2][0]!=0|| MvdCpL1[x0][y0]
  [2][1]!=0))

Alternatively, conditionsA is defined as follows:

(sps_affine_amvr_enabled_flag && inter_affine_f-
  lag==1 && (MvdCpL0[x0][y0][0][0]!=0||
  MvdCpL0[x0][y0][0][1]!=0|| MvdCpL1[x0][y0]
  [0][0]!=0|| MvdCpL1[x0][y0][0][1]!=0|)

Alternatively, conditionsA is defined as follows:

(sps_affine_amvr_enabled_flag && inter_affine_f-
  lag==1 && (MvdCpLX[x0][y0][0][0]!=0||
  MvdCpLX[x0][y0][0][1]!=0|)

wherein X is being 0 or 1.

Alternatively, conditionsA is defined as follows:

(sps_affine_amvr_enabled_flag && inter_affine_f-
  lag==1)

In one example, conditionsB is defined as follows:

!sps_cpr_enabled_flag||!(inter_pred_idc[x0]
  [y0]==PRED_L0 && ref_idx_l0[x0]
  [y0]==num_ref_idx_l0_active_minus1)

Alternatively, conditionsB is defined as follows:

!sps_cpr_enabled_flag||!(pred_mode[x0][y0]==CPR).

Alternatively, conditionsB is defined as follows:

!sps_ibc_enabled_flag||!(pred_mode[x0][y0]==IBC).

When different syntax elements are utilized to code AMVR or Affine AMVR, the context modeling and/or contexts used for the embodiments in 5.5 which are applied to Affine AMVR may be applied accordingly.

5.2.5. Semantics amvr_flag[x0][y0] specifies the resolution of motion vector difference. The array indices x0, y0 specify the location (x0, y0) of the top-left luma sample of the considered coding block relative to the top-left luma sample of the picture. amvr_flag[x0][y0] equal to 0 specifies that the resolution of the motion vector difference is ¼ of a luma sample. amvr_flag[x0][y0] equal to 1 specifies that the resolution of the motion vector difference is further specified by amvr_coarse_precisoin_flag[x0][y0].

When amvr_flag[x0][y0] is not present, it is inferred as follows:

If sps_cpr_enabled_flag is equal to 1, amvr_flag[x0][y0] is inferred to be equal to 1.

Otherwise (sps_cpr_enabled_flag is equal to 0), amvr_flag[x0][y0] is inferred to be equal to 0.

amvr_coarse_precisoin_flag[x0][y0] equal to 1 specifies that the resolution of the motion vector difference is four luma samples when inter_affine_flag is equal to 0, and 1 luma samples when inter_affine_flag is equal to 1. The array indices x0, y0 specify the location (x0, y0) of the top-left luma sample of the considered coding block relative to the top-left luma sample of the picture.

When amvr_coarse_precisoin_flag[x0][y0] is not present, it is inferred to be equal to 0.

If inter_affine_flag[x0][y0] is equal to 0, the variable MvShift is set equal to (amvr_flag[x0][y0]+amvr_coarse_precisoin_flag[x0][y0])<<1 and the variables MvdL0[x0]

[y0][0], MvdL0[x0][y0][1], MvdL1[x0][y0][0], MvdL1[x0][y0][1] are modified as follows:

$$MvdL0[x0][y0][0]=MvdL0[x0][y0][0]<<(MvShift+2) \quad (7\text{-}70)$$

$$MvdL0[x0][y0][1]=MvdL0[x0][y0][1]<<(MvShift+2) \quad (7\text{-}71)$$

$$MvdL1[x0][y0][0]=MvdL1[x0][y0][0]<<(MvShift+2) \quad (7\text{-}72)$$

$$MvdL1[x0][y0][1]=MvdL1[x0][y0][1]<<(MvShift+2) \quad (7\text{-}73)$$

If inter_affine_flag[x0][y0] is equal to 1, the variable MvShift is set equal to (amvr_coarse_precisoin_flag?(amvr_coarse_precisoin_flag<<1):(-(amvr_flag<<1))) and the variables MvdCpL0[x0][y0][0][0], MvdCpL0[x0][y0][0][1], MvdCpL0[x0][y0][1][0], MvdCpL0[x0][y0][1][1], MvdCpL0[x0][y0][2][0], MvdCpL0[x0][y0][2][1] are modified as follows:

$$MvdCpL0[x0][y0][0][0]=MvdCpL0[x0][y0][0][0]<<(MvShift+2) \quad (7\text{-}73)$$

$$MvdCpL1[x0][y0][0][1]=MvdCpL1[x0][y0][0][1]<<(MvShift+2) \quad (7\text{-}67)$$

$$MvdCpL0[x0][y0][1][0]=MvdCpL0[x0][y0][1][0]<<(MvShift+2) \quad (7\text{-}66)$$

$$MvdCpL1[x0][y0][1][1]=MvdCpL1[x0][y0][1][1]<<(MvShift+2) \quad (7\text{-}67)$$

$$MvdCpL0[x0][y0][2][0]=MvdCpL0[x0][y0][2][0]<<(MvShift+2) \quad (7\text{-}66)$$

$$MvdCpL1[x0][y0][2][1]=MvdCpL1[x0][y0][2][1]<<(MvShift+2) \quad (767)$$

Alternativley, if inter_affine_flag[x0][y0] is equal to 1, the variable MvShift is set equal to (affine_amvr_coarse_precisoin_flag?(affine_amvr_coarse_precisoin_flag<<1):(-(affine_amvr_flag<<1))).

5.3. Rounding Process for Motion Vectors

The rounding process is modified that when the given rightShift value is equal to 0 (which happens for 1/16-pel precision), the rounding offset is set to 0 instead of (1<<(rightShift−1)).

For example, the sub-clause of rounding process for MVs is modified as follows:
Inputs to this process are:
the motion vector mvX,
the right shift parameter rightShift for rounding,
the left shift parameter leftShift for resolution increase.
Output of this process is the rounded motion vector mvX.
For the rounding of mvX, the following applies:

$$\text{offset}=(\text{rightShift}==0)?0:(1<<(\text{rightShift}-1)) \quad (8\text{-}371)$$

$$mvX[0]=(mvX[0]>=0?(mvX[0]+\text{offset})>>\text{rightShift}:-((-mvX[0]+\text{offset})>>\text{rightShift}))<<\text{leftShift} \quad (8\text{-}372)$$

$$mvX[1]=(mvX[1]>=0?(mvX[1]+\text{offset})>>\text{rightShift}:-((-mvX[0]+\text{offset})>>\text{rightShift}))<<\text{leftShift} \quad (8\text{-}373)$$

5.4. Decoding Process

The rounding process invoked in the affine motion vector derivation process are performed with the input of (MvShift+2) instead of being fixed to be 2.

Derivation Process for Luma Affine Control Point Motion Vector Predictors

Inputs to this process are:
a luma location (xCb, yCb) of the top-left sample of the current luma coding block relative to the top-left luma sample of the current picture,
two variables cbWidth and cbHeight specifying the width and the height of the current luma coding block,
the reference index of the current coding unit refIdxLX, with X being 0 or 1,
the number of control point motion vectors numCpMv.
Output of this process are the luma affine control point motion vector predictors mvpCpLX[cpIdx] with X being 0 or 1, and cpIdx=0 . . . numCpMv−1.
For the derivation of the control point motion vectors predictor candidate list, cpMvpListLX with X being 0 or 1, the following ordered steps apply:
The number of control point motion vector predictor candidates in the list numCpMvpCandLX is set equal to 0.
The variables availableFlagA and availableFlagB are both set equal to FALSE.
The rounding process for motion vectors as specified in clause 8.4.2.14 is invoked with mvX set equal to cpMvpLX[cpIdx], rightShift set equal to (MvShift+2), and leftShift set equal to (MvShift+2) as inputs and the rounded cpMvpLX[cpIdx] with cpIdx=0 . . . numCpMv−1 as output.
The variable availableFlagA is set equal to TRUE
The derivation process for luma affine control point motion vectors from a neighbouring block as specified in clause 8.4.4.5 is invoked with the luma coding block location (xCb, yCb), the luma coding block width and height (cbWidth, cbHeight), the neighbouring luma coding block location (xNb, yNb), the neighbouring luma coding block width and height (nbW, nbH), and the number of control point motion vectors numCpMv as input, the control point motion vector predictor candidates cpMvpLY[cpIdx] with cpIdx=0 . . . numCpMv−1 as output.
The rounding process for motion vectors as specified in clause 8.4.2.14 is invoked with mvX set equal to cpMvpLY[cpIdx], rightShift set equal to (MvShift+2), and leftShift set equal to (MvShift+2) as inputs and the rounded cpMvpLY[cpIdx] with cpIdx=0 . . . numCpMv−1 as output.
The derivation process for luma affine control point motion vectors from a neighbouring block as specified in clause 8.4.4.5 is invoked with the luma coding block location (xCb, yCb), the luma coding block width and height (cbWidth, cbHeight), the neighbouring luma coding block location (xNb, yNb), the neighbouring luma coding block width and height (nbW, nbH), and the number of control point motion vectors numCpMv as input, the control point motion vector predictor candidates cpMvpLX[cpIdx] with cpIdx=0 . . . numCpMv−1 as output.
The rounding process for motion vectors as specified in clause 8.4.2.14 is invoked with mvX set equal to cpMvpLX[cpIdx], rightShift set equal to (MvShift+2), and leftShift set equal to (MvShift+2) as inputs and the rounded cpMvpLX[cpIdx] with cpIdx=0 . . . numCpMv−1 as output.
The following assignments are made:

$$cpMvpListLX[numCpMvpCandLX][0]=cpMvpLX[0] \quad (8\text{-}618)$$

$$cpMvpListLX[numCpMvpCandLX][1]=cpMvpLX[1] \quad (8\text{-}619)$$

$$cpMvpListLX[numCpMvpCandLX][2]=cpMvpLX[2] \quad (8\text{-}620)$$

$$numCpMvpCandLX=numCpMvpCandLX+1 \quad (8\text{-}621)$$

Otherwise if PredFlagLY[xNbBk][yNbBk] (with Y=!X) is equal to 1 and DiffPicOrderCnt(RefPicListY[RefIdxLY[xNbBk][yNbBk]], RefPicListX[refIdxLX]) is equal to 0, the following applies:

The variable availableFlagB is set equal to TRUE

The derivation process for luma affine control point motion vectors from a neighbouring block as specified in clause 8.4.4.5 is invoked with the luma coding block location (xCb, yCb), the luma coding block width and height (cbWidth, cbHeight), the neighbouring luma coding block location (xNb, yNb), the neighbouring luma coding block width and height (nbW, nbH), and the number of control point motion vectors numCpMv as input, the control point motion vector predictor candidates cpMvpLY[cpIdx] with cpIdx=0 . . . numCpMv−1 as output.

The rounding process for motion vectors as specified in clause 8.4.2.14 is invoked with mvX set equal to cpMvpLY[cpIdx], rightShift set equal to (MvShift+2), and leftShift set equal to (MvShift+2) as inputs and the rounded cpMvpLY[cpIdx] with cpIdx=0 . . . numCpMv−1 as output.

The following assignments are made:

cpMvpListLX[numCpMvpCandLX][0]=cpMvpLY[0]     (8-622)

cpMvpListLX[numCpMvpCandLX][1]=cpMvpLY[1]     (8-623)

cpMvpListLX[numCpMvpCandLX][2]=cpMvpLY[2]     (8-624)

numCpMvpCandLX=numCpMvpCandLX+1     (8-625)

When numCpMvpCandLX is less than 2, the following applies

The derivation process for constructed affine control point motion vector prediction candidate as specified in clause 8.4.4.8 is invoked with the luma coding block location (xCb, yCb), the luma coding block width cbWidth, the luma coding block height cbHeight, and the reference index of the current coding unit refIdxLX as inputs, and the availability flag availableConsFlagLX, the availability flags availableFlagLX[cpIdx] and cpMvpLX[cpIdx] with cpIdx=0 . . . numCpMv−1 as outputs.

When availableConsFlagLX is equal to 1, and numCpMvpCandLX is equal to 0, the following assignments are made:

cpMvpListLX[numCpMvpCandLX][0]=cpMvpLX[0]     (8-626)

cpMvpListLX[numCpMvpCandLX][1]=cpMvpLX[1]     (8-627)

cpMvpListLX[numCpMvpCandLX][2]=cpMvpLX[2]     (8-628)

numCpMvpCandLX=numCpMvpCandLX+1     (8-629)

The following applies for cpIdx=0 . . . numCpMv−1:

When numCpMvpCandLX is less than 2 and availableFlagLX[cpIdx] is equal to 1, the following assignments are made:

cpMvpListLX[numCpMvpCandLX][0]=cpMvpLX[cpIdx]     (8-630)

cpMvpListLX[numCpMvpCandLX][1]=cpMvpLX[cpIdx]     (8-631)

cpMvpListLX[numCpMvpCandLX][2]=cpMvpLX[cpIdx]     (8-632)

numCpMvpCandLX=numCpMvpCandLX+1     (8-633)

When numCpMvpCandLX is less than 2, the following applies:

The derivation process for temporal luma motion vector prediction as specified in clause 8.4.2.11 is with the luma coding block location (xCb, yCb), the luma coding block width cbWidth, the luma coding block height cbHeight and refIdxLX as inputs, and with the output being the availability flag availableFlagLXCol and the temporal motion vector predictor mvLXCol.

When availableFlagLXCol is equal to 1, the following applies:

The rounding process for motion vectors as specified in clause 8.4.2.14 is invoked the with mvX set equal to mvLXCol, rightShift set equal to (MvShift+2), and leftShift set equal to (MvShift+2) as inputs and the rounded mvLXCol as output.

The following assignments are made:

cpMvpListLX[numCpMvpCandLX][0]=mvLXCol     (8-634)

cpMvpListLX[numCpMvpCandLX][1]=mvLXCol     (8-635)

cpMvpListLX[numCpMvpCandLX][2]=mvLXCol     (8-636)

numCpMvpCandLX=numCpMvpCandLX+1     (8-637)

When numCpMvpCandLX is less than 2, the following is repeated until numCpMvpCandLX is equal to 2, with mvZero[0] and mvZero[1] both being equal to 0:

cpMvpListLX[numCpMvpCandLX][0]=mvZero     (8-638)

cpMvpListLX[numCpMvpCandLX][1]=mvZero     (8-639)

cpMvpListLX[numCpMvpCandLX][2]=mvZero     (8-640)

numCpMvpCandLX=numCpMvpCandLX+1     (8-641)

The affine control point motion vector predictor cpMvpLX with X being 0 or 1 is derived as follows:

cpMvpLX=cpMvpListLX[mvp_1X_flag[xCb][yCb]]     (8-642)

Derivation Process for Constructed Affine Control Point Motion Vector Prediction Candidates Inputs to this process are:
a luma location (xCb, yCb) specifying the top-left sample of the current luma coding block relative to the top-left luma sample of the current picture,
two variables cbWidth and cbHeight specifying the width and the height of the current luma coding block,
the reference index of the current prediction unit partition refIdxLX, with X being 0 or 1, Output of this process are:
the availability flag of the constructed affine control point motion vector prediction candidiates availableConsFlagLX with X being 0 or 1,
the availability flags availableFlagLX[cpIdx] with cpIdx=0 . . . 2 and X being 0 or 1,
the constructed affine control point motion vector prediction candidiates cpMvLX[cpIdx] with cpIdx=0 . . . numCpMv−1 and X being 0 or 1.

The first (top-left) control point motion vector cpMvLX[0] and the availability flag availableFlagLX[0] are derived in the following ordered steps:

The sample locations (xNbB2, yNbB2), (xNbB3, yNbB3) and (xNbA2, yNbA2) are set equal to (xCb−1, yCb−1), (xCb, yCb−1) and (xCb−1, yCb), respectively.

The availability flag availableFlagLX[0] is set equal to 0 and both components of cpMvLX[0] are set equal to 0.

The following applies for (xNbTL, yNbTL) withTL being replaced by B2, B3, and A2:

The availability derivation process for a coding block as specified in clause is invoked with the luma coding block location (xCb, yCb), the luma coding block width cbWidth, the luma coding block height cbHeight, the luma location (xNbY, yNbY) set equal to (xNbTL, yNbTL) as inputs, and the output is assigned to the coding block availability flag availableTL.

When availableTL is equal to TRUE and availableFlagLX[0] is equal to 0, the following applies:

If PredFlagLX[xNbTL][yNbTL] is equal to 1, and DiffPicOrderCnt(RefPicListX[RefIdxLX[xNbTL][yNbTL]], RefPicListX[refIdxLX]) is equal to 0, and the reference picture corresponding to RefIdxLX[xNbTL][yNbTL] is not the current picture, availableFlagLX[0] is set equal to 1 and the following assignments are made:

cpMvLX[0]=MvLX[xNbTL][yNbTL]                (8-643)

Otherwise, when PredFlagLY[xNbTL][yNbTL] (with Y=!X) is equal to 1 and DiffPicOrderCnt(RefPicListY[RefIdxLY[xNbTL][yNbTL]], RefPicListX[refIdxLX]) is equal to 0, and the reference picture corresponding to RefIdxLY[xNbTL][yNbTL] is not the current picture, availableFlagLX[0] is set equal to 1 and the following assignments are made:

cpMvLX[0]=MvLY[xNbTL][yNbTL]                (8-644)

When availableFlagLX[0] is equal to 1, the rounding process for motion vectors as specified in clause 8.4.2.14 is invoked with mvX set equal to cpMvLX[0], rightShift set equal to (MvShift+2), and leftShift set equal to (MvShift+2) as inputs and the rounded cpMvLX[0] as output.

The second (top-right) control point motion vector cpMvLX[1] and the availability flag availableFlagLX[1] are derived in the following ordered steps:

The sample locations (xNbB1, yNbB1) and (xNbB0, yNbB0) are set equal to (xCb+cbWidth−1, yCb−1) and (xCb+cbWidth, yCb−1), respectively.

The availability flag availableFlagLX[1] is set equal to 0 and both components of cpMvLX[1] are set equal to 0.

The following applies for (xNbTR, yNbTR) withTR being replaced by B1 and B0:

The availability derivation process for a coding block as specified in clause 6.4.X is invoked with the luma coding block location (xCb, yCb), the luma coding block width cbWidth, the luma coding block height cbHeight, the luma location (xNbY, yNbY) set equal to (xNbTR, yNbTR) as inputs, and the output is assigned to the coding block availability flag availableTR.

When availableTR is equal to TRUE and availableFlagLX[1] is equal to 0, the following applies:

If PredFlagLX[xNbTR][yNbTR] is equal to 1, and DiffPicOrderCnt(RefPicListX[RefIdxLX[xNbTR][yNbTR]], RefPicListX[refIdxLX]) is equal to 0, and the reference picture corresponding to RefIdxLX[xNbTR][yNbTR] is not the current picture, availableFlagLX[1] is set equal to 1 and the following assignments are made:

cpMvLX[1]=MvLX[xNbTR][yNbTR]                (8-645)

Otherwise, when PredFlagLY[xNbTR][yNbTR] (with Y=!X) is equal to 1 and DiffPicOrderCnt(RefPicListY[RefIdxLY[xNbTR][yNbTR]], RefPicListX[refIdxLX]) is equal to 0, and the reference picture corresponding to RefIdxLY[xNbTR][yNbTR] is not the current picture, availableFlagLX[1] is set equal to 1 and the following assignments are made:

cpMvLX[1]=MvLY[xNbTR][yNbTR]                (8-646)

When availableFlagLX[1] is equal to 1, the rounding process for motion vectors as specified in clause 8.4.2.14 is invoked with mvX set equal to cpMvLX[1], rightShift set equal to (MvShift+2), and leftShift set equal to (MvShift+2) as inputs and the rounded cpMvLX[1] as output.

The third (bottom-left) control point motion vector cpMvLX[2] and the availability flag availableFlagLX[2] are derived in the following ordered steps:

The sample locations (xNbA1, yNbA 1) and (xNbA0, yNbA0) are set equal to (xCb−1, yCb+cbHeight−1) and (xCb−1, yCb+cbHeight), respectively.

The availability flag availableFlagLX[2] is set equal to 0 and both components of cpMvLX[2] are set equal to 0.

The following applies for (xNbBL, yNbBL) with BL being replaced by A1 and A0:

The availability derivation process for a coding block as specified in clause 6.4.X invoked with the luma coding block location (xCb, yCb), the luma coding block width cbWidth, the luma coding block height cbHeight, the luma location (xNbY, yNbY) set equal to (xNbBL, yNbBL) as inputs, and the output is assigned to the coding block availability flag availableBL.

When availableBL is equal to TRUE and availableFlagLX[2] is equal to 0, the following applies:

If PredFlagLX[xNbBL][yNbBL] is equal to 1, and DiffPicOrderCnt(RefPicListX[RefIdxLX[xNbBL][yNbBL]], RefPicListX[refIdxLX]) is equal to 0, and the reference picture corresponding to RefIdxLY[xNbBL][yNbBL] is not the current picture, availableFlagLX[2] is set equal to 1 and the following assignments are made:

cpMvLX[2]=MvLX[xNbBL][yNbBL]                (8-647)

Otherwise, when PredFlagLY[xNbBL][yNbBL] (with Y=!X) is equal to 1 and DiffPicOrderCnt(RefPicListY[RefIdxLY[xNbBL][yNbBL]], RefPicListX[refIdxLX]) is equal to 0, and the reference picture corresponding to RefIdxLY[xNbBL][yNbBL] is not the current picture, availableFlagLX[2] is set equal to 1 and the following assignments are made:

cpMvLX[2]=MvLY[xNbBL][yNbBL]                (8-648)

When availableFlagLX[2] is equal to 1, the rounding process for motion vectors as specified in clause 8.4.2.14 is invoked with mvX set equal to cpMvLX[2], rightShift set equal to (MvShift+2), and leftShift set equal to (MvShift+2) as inputs and the rounded cpMvLX[2] as output.

5.5. Context Modeling

Assignment of ctxInc to syntax elements with context coded bins:

| | binIdx | | | | | |
|---|---|---|---|---|---|---|
| Syntax element | 0 | 1 | 2 | 3 | 4 | >=5 |
| amvr_flag[ ][ ] | 0, 1, 2 (clause 9.5.4.2.2, when inter_affine_flag[ ][ ] is equal to 0) | na | na | na | na | na |

-continued

| | binIdx | | | | | |
|---|---|---|---|---|---|---|
| Syntax element | 0 | 1 | 2 | 3 | 4 | >=5 |
| amvr_coarse_precisoin_flag[ ][ ] | 0 | na | na | na | na | na |

Specification of ctxInc using left and above syntax elements:

In one example, context increasement offset ctxInc= (condL && availableL)+(condA && availableA)+ctx-SetIdx*3.

Alternatively, ctxInc=((condL && availableL)||(condA && availableA))+ctxSetIdx*3.

ctxInc=(condL && availableL)+M*(condA && availableA)+ctxSetIdx*3. (e.g., M=2)

ctxInc=M*(condL && availableL)+(condA && availableA)+ctxSetIdx*3. (e.g., M=2)

| Syntax element | condL | condA | ctxSetIdx |
|---|---|---|---|
| e | cu_skip_flag[ xNbL ][ yNbL ] | cu_skip_flag[ xNbA ][ yNbA ] | 0 |
| e | !inter_affine_flag[ x0 ][ y0 ] && amvr_flag[ xNbL ][ yNbL ] | !inter_affine_flag[ x0 ][ y0 ] && amvr_flag[ xNbA ][ yNbA ] | 0 |

Values of initValue for ctxIdx of amvr_flag:
Different contexts are used when current block is affine or non-affine.

| Initialization variable | ctxIdx of amvr_flag when inter_affine_flag is equal to 0 | | | ctxIdx of amvr_flag when inter_affine_flag is equal to 1 |
|---|---|---|---|---|
| | 0 | 1 | 2 | 3 |
| initValue | xx | xx | xx | xx |

Values of initValue for ctxIdx of amvr_coarse_precisoin_flag:
Different contexts are used when current block is affine or non-affine.

| Initialization variable | ctxIdx of amvr_coarse_precisoin_flag when inter_affine_flag is equal to 0 | ctxIdx of amvr_coarse_precisoin_flag when inter_affine_flag is equal to 1 |
|---|---|---|
| | 0 | 0 |
| initValue | xxx | xx |

The examples described above may be incorporated in the context of the method described below, e.g., methods 2610 to 2680, which may be implemented at a video decoder or a video encoder.

Figure 26A:
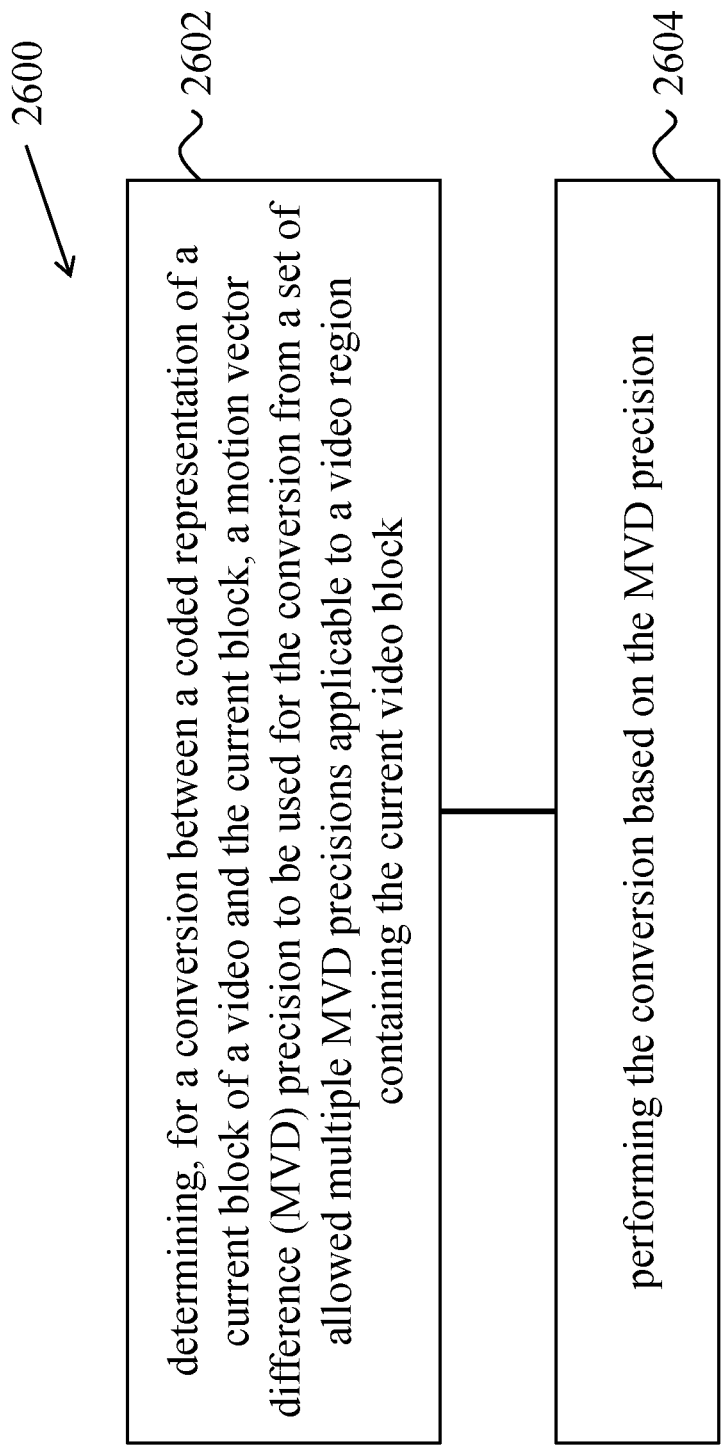
FIGS. 26A-26I show flowcharts of example methods for video processing based on some implementations of the disclosed technology.

FIG. 26A shows a flowchart of an exemplary method for video processing. The method 2610 includes, at step 2610, determining, for a conversion between a coded representation of a current block of a video and the current block, a motion vector difference (MVD) precision to be used for the conversion from a set of allowed multiple MVD precisions applicable to a video region containing the current video block. The method 2610 includes, at step 2614, performing the conversion based on the MVD precision.

Figure 26B:
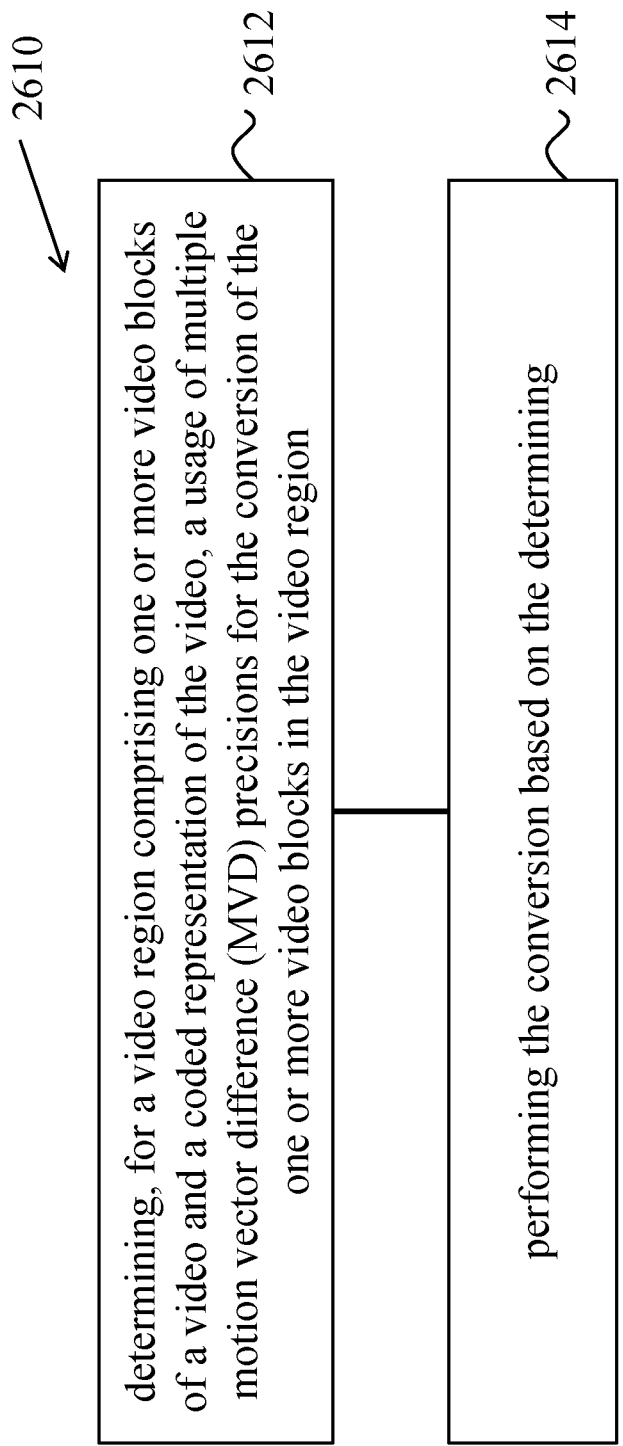

FIG. 26B shows a flowchart of an exemplary method for video processing. The method 2610 as shown in FIG. 26B includes, at step 2612, determining, for a video region comprising one or more video blocks of a video and a coded representation of the video, a usage of multiple motion vector difference (MVD) precisions for the conversion of the one or more video blocks in the video region. The method 2610 includes, at step 2614, performing the conversion based on the determination.

Figure 26C:
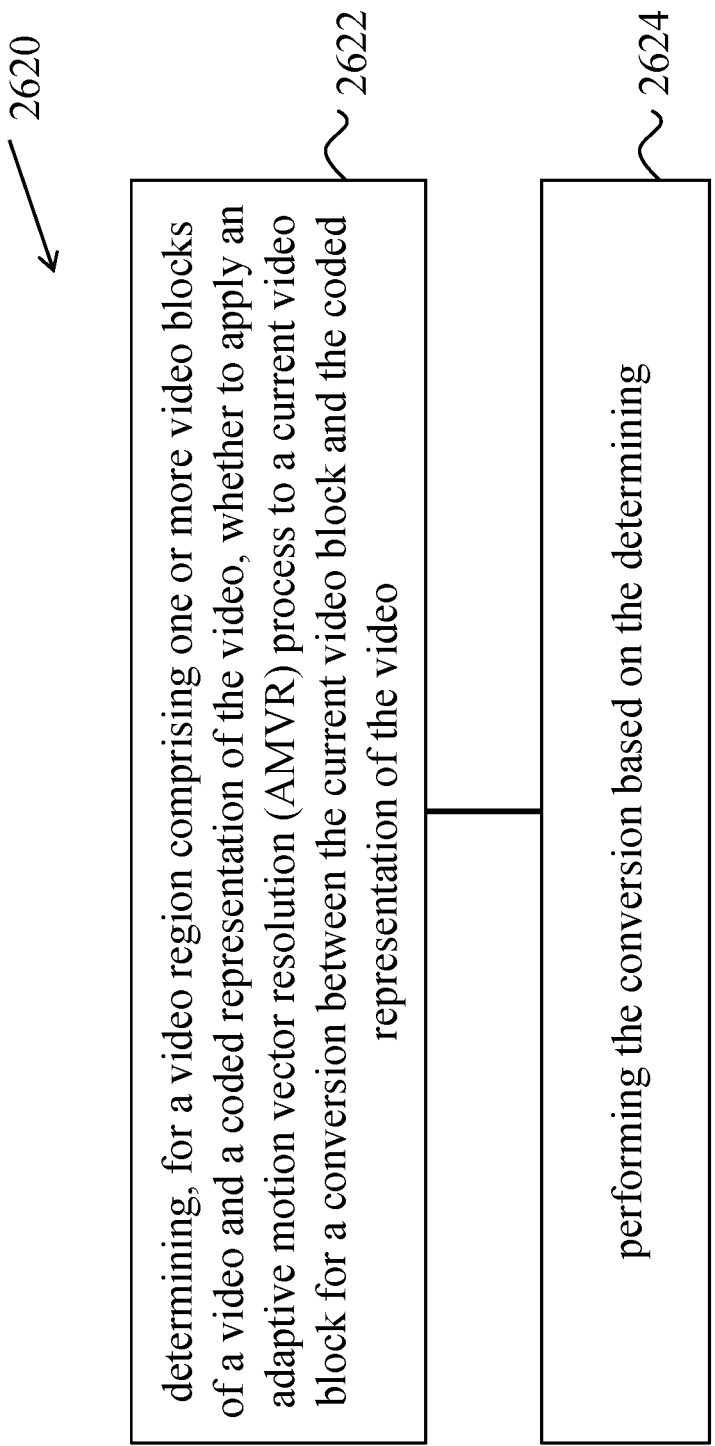

FIG. 26C shows a flowchart of an exemplary method for video processing. The method 2620 as shown in FIG. 26C includes, at step 2622, determining, for a video region comprising one or more video blocks of a video and a coded representation of the video, whether to apply an adaptive motion vector resolution (AMVR) process to a current video block for a conversion between the current video block and the coded representation of the video. The method 2620 includes, at step 2624, performing the conversion based on the determining.

Figure 26D:
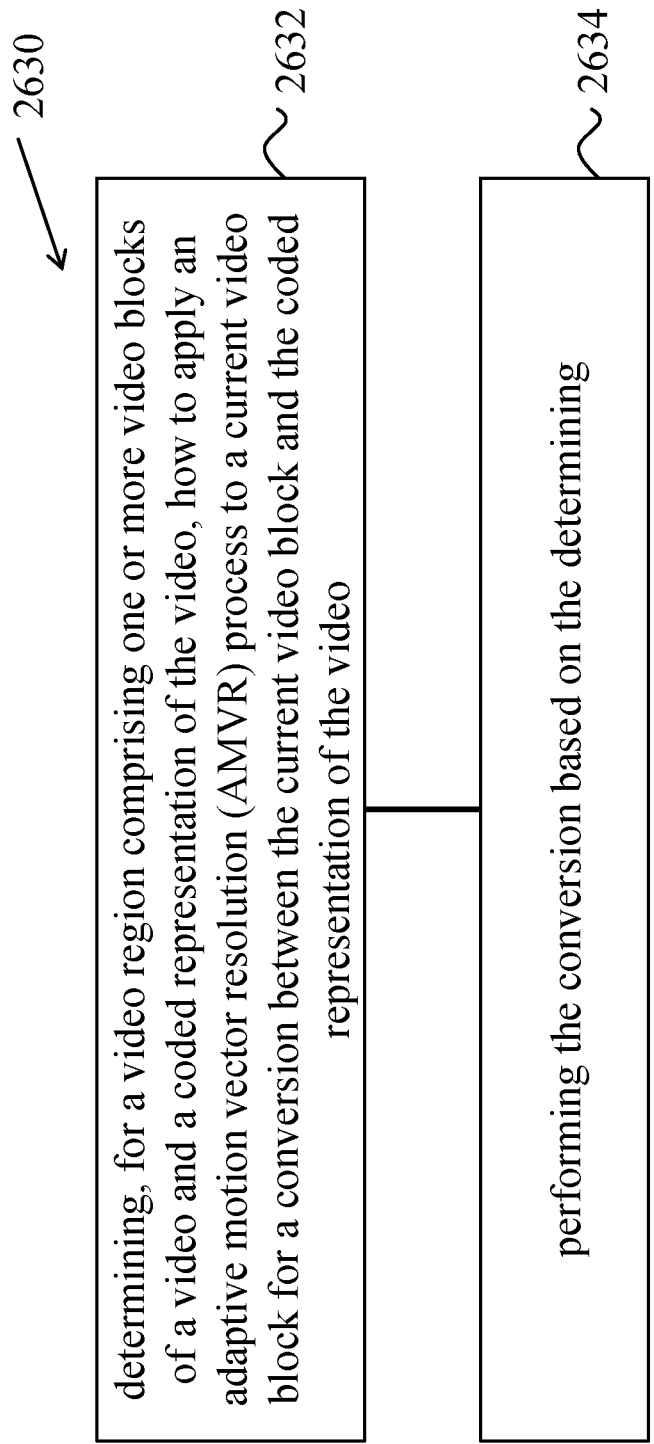

FIG. 26D shows a flowchart of an exemplary method for video processing. The method 2630 as shown in FIG. 26D includes, at step 2632, determining, for a video region comprising one or more video blocks of a video and a coded representation of the video, how to apply an adaptive motion vector resolution (AMVR) process to a current video block for a conversion between the current video block and the coded representation of the video. The method 2630 includes, at step 2634, performing the conversion based on the determining.

Figure 26E:
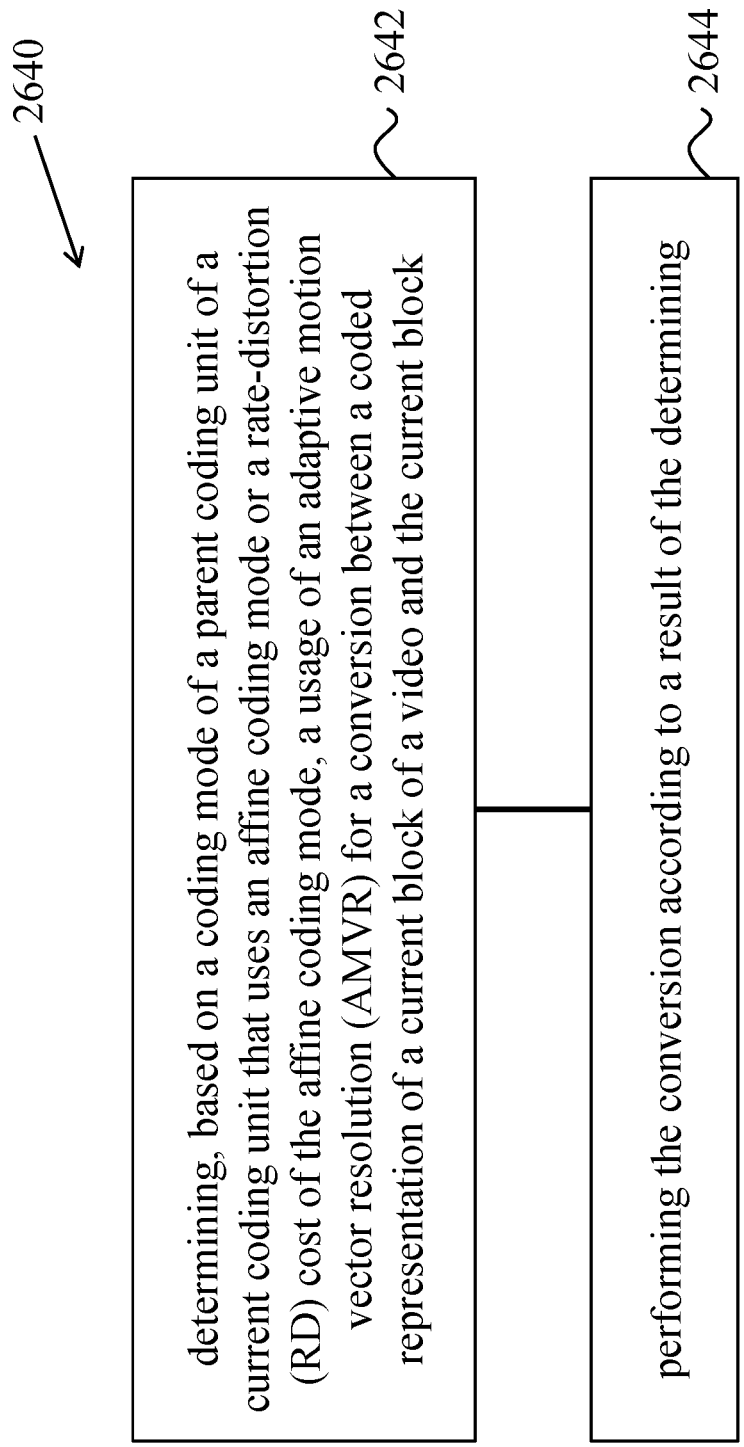

FIG. 26E shows a flowchart of an exemplary method for video processing. The method 2640 as shown in FIG. 26E includes, at step 2642, determining, based on a coding mode of a parent coding unit of a current coding unit that uses an affine coding mode or a rate-distortion (RD) cost of the affine coding mode, a usage of an adaptive motion vector resolution (AMVR) for a conversion between a coded representation of a current block of a video and the current block. The method 2640 includes, at step 2644, performing, the conversion according to a result of the determining.

Figure 26F:
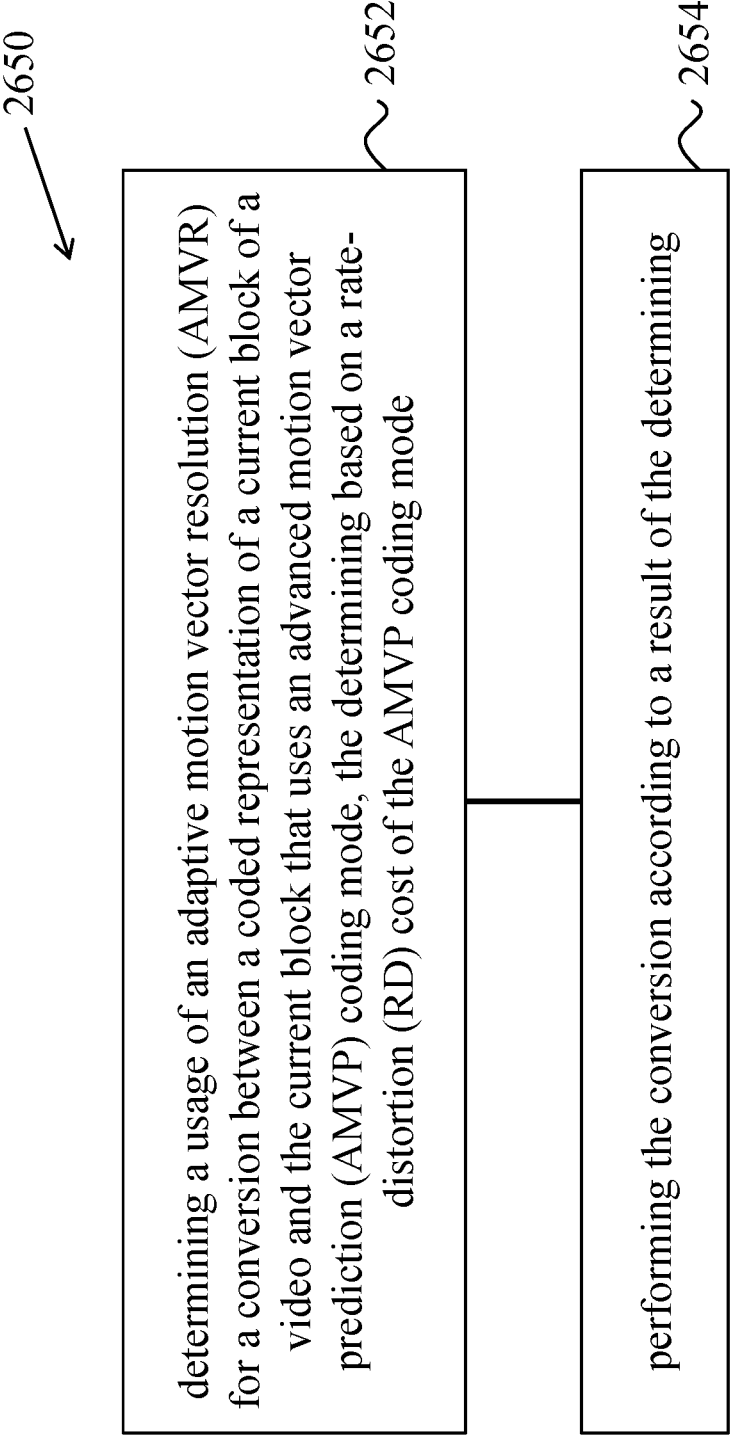

FIG. 26F shows a flowchart of an exemplary method for video processing. The method 2650 as shown in FIG. 26F includes, at step 2652, determining a usage of an adaptive motion vector resolution (AMVR) for a conversion between a coded representation of a current block of a video and the current block that uses an advanced motion vector prediction (AMVP) coding mode, the determining based on a rate-distortion (RD) cost of the AMVP coding mode. The method 2650 includes, at step 2654, performing, the conversion according to a result of the determining.

Figure 26G:
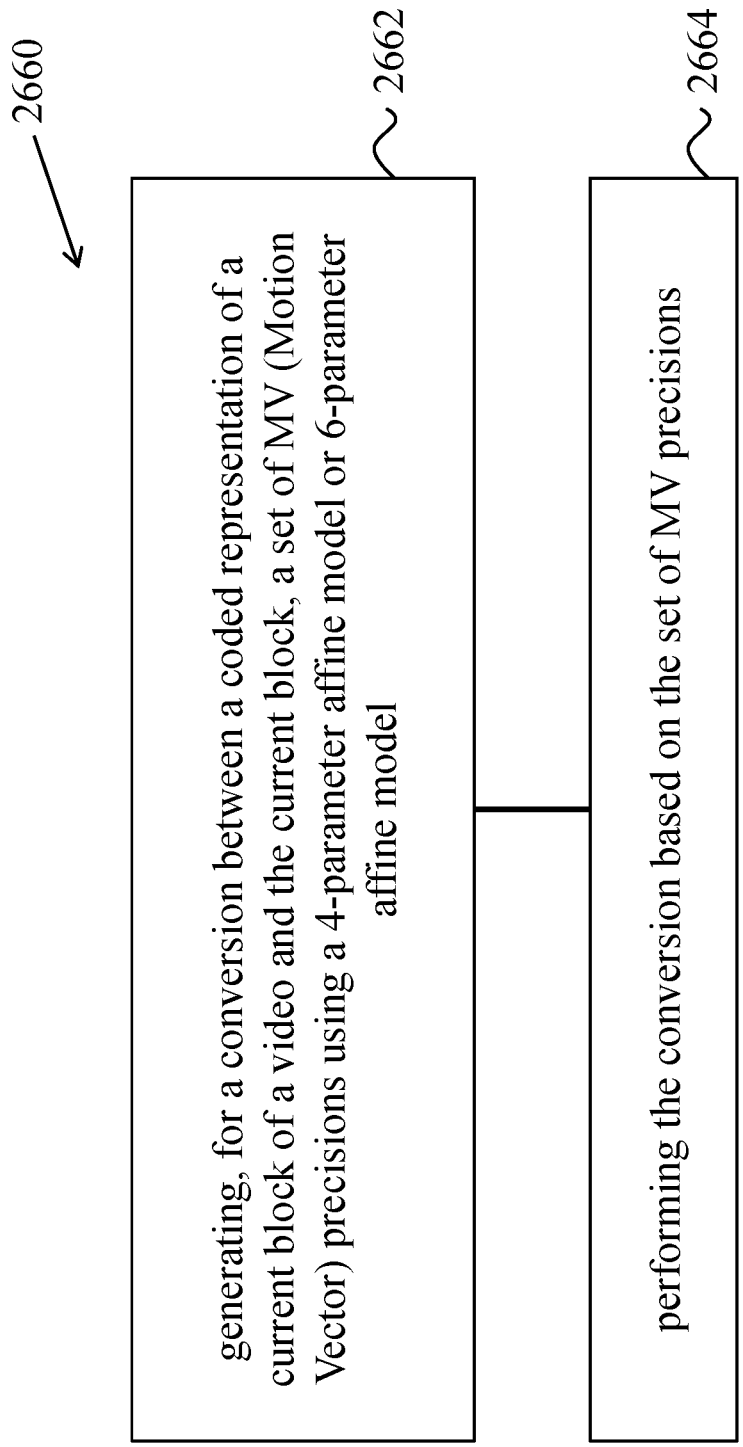

FIG. 26G shows a flowchart of an exemplary method for video processing. The method 2660 as shown in FIG. 26G includes, at step 2662, generating, for a conversion between a coded representation of a current block of a video and the current block, a set of MV (Motion Vector) precisions using a 4-parameter affine model or 6-parameter affine model. The method 2660 includes, at step 2664, performing, the conversion based on the set of MV precisions.

Figure 26H:
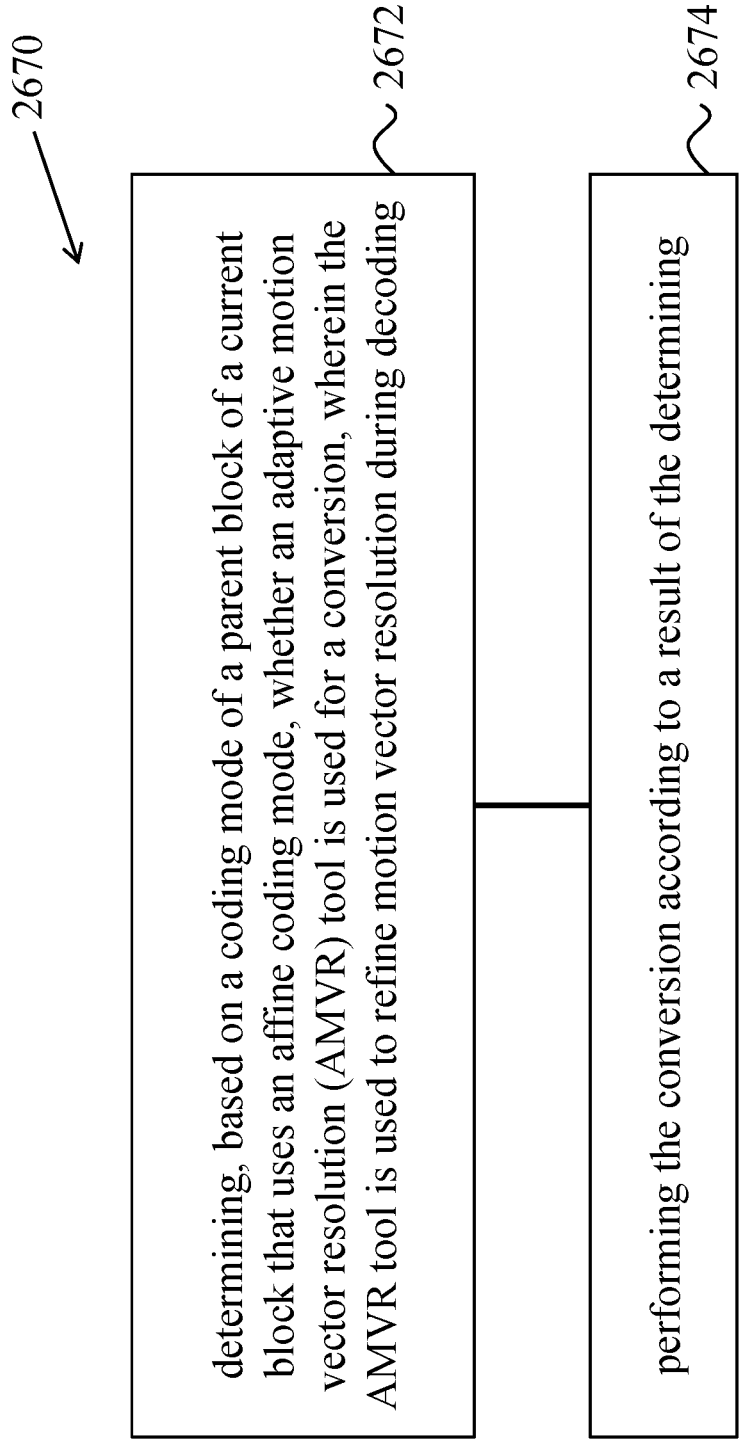

FIG. 26H shows a flowchart of an exemplary method for video processing. The method 2670 as shown in FIG. 26H includes, at step 2672, determining, based on a coding mode of a parent block of a current block that uses an affine coding mode, whether an adaptive motion vector resolution (AMVR) tool is used for a conversion, wherein the AMVR tool is used to refine motion vector resolution during decoding. The method 2670 includes, at step 2674, performing the conversion according to a result of the determining.

Figure 26I:
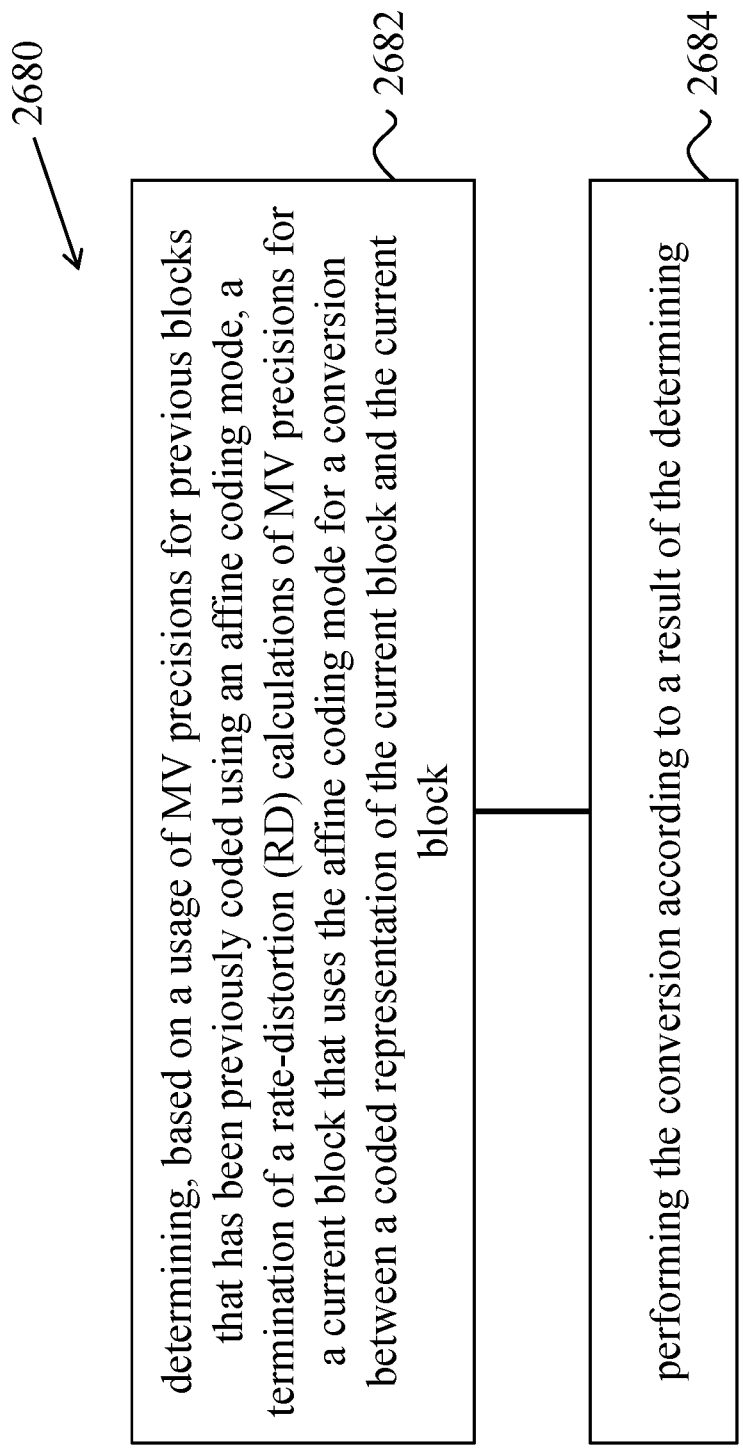

FIG. 26I shows a flowchart of an exemplary method for video processing. The method 2680 as shown in FIG. 26I includes, at step 2682, determining, based on a usage of MV precisions for previous blocks that has been previously coded using an affine coding mode, a termination of a rate-distortion (RD) calculations of MV precisions for a current block that uses the affine coding mode for a conversion between a coded representation of the current block and the current block. The method 2680 includes, at step 2684, performing the conversion according to a result of the determining.

5. EXAMPLE IMPLEMENTATIONS OF THE DISCLOSED TECHNOLOGY

FIG. 27 is an example of a block diagram of a video processing apparatus 2700. The apparatus 2700 may be used to implement one or more of the methods described herein. The apparatus 2700 may be embodied in a smartphone, tablet, computer, Internet of Things (IoT) receiver, and so on. The apparatus 2700 may include one or more processors 2702, one or more memories 2704 and video processing hardware 2706. The processor(s) 2702 may be configured to implement one or more methods (including, but not limited to, methods 2610 to 2680) described in the present document. The memory (memories) 2704 may be used for storing data and code used for implementing the methods and techniques described herein. The video processing hardware 2706 may be used to implement, in hardware circuitry, some techniques described in the present document.

Figure 29:
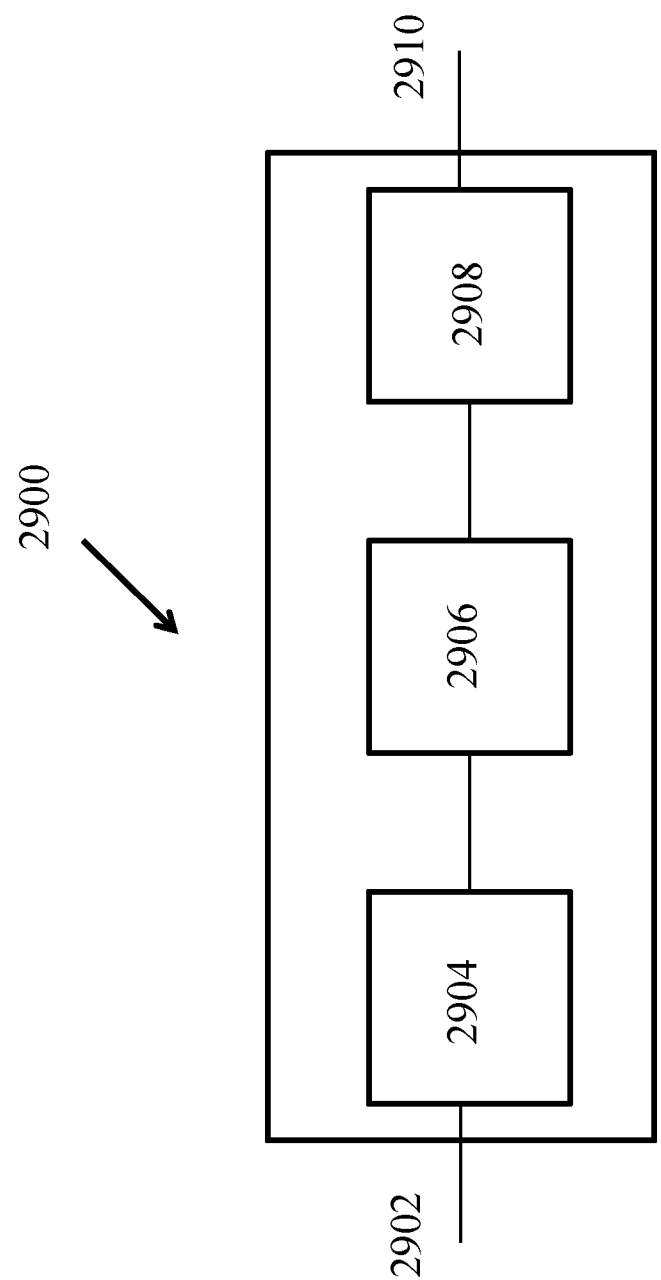
FIG. 29 shows another block diagram of an example of a hardware platform for implementing a video processing system described in the present document.

FIG. 29 is another example of a block diagram of a video processing system in which disclosed techniques may be implemented. FIG. 29 is a block diagram showing an example video processing system 2900 in which various techniques disclosed herein may be implemented. Various implementations may include some or all of the components of the system 2900. The system 2900 may include input 2902 for receiving video content. The video content may be received in a raw or uncompressed format, e.g., 8 or 10 bit multi-component pixel values, or may be in a compressed or encoded format. The input 2902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2900 may include a coding component 2904 that may implement the various coding or encoding methods described in the present document. The coding component 2904 may reduce the average bitrate of video from the input 2902 to the output of the coding component 2904 to produce a coded representation of the video. The coding techniques are therefore sometimes called video compression or video transcoding techniques. The output of the coding component 2904 may be either stored, or transmitted via a communication connected, as represented by the component 2906. The stored or communicated bitstream (or coded) representation of the video received at the input 2902 may be used by the component 2908 for generating pixel values or displayable video that is sent to a display interface 2910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In some embodiments, the video processing methods may be implemented using an apparatus that is implemented on a hardware platform as described with respect to FIG. 27 or 29.

Various techniques and embodiments may be described using the following clause-based format. These clauses may be implemented as preferred features of some embodiments.

The first set of clauses use some of the techniques described in the previous section, including, for example, items 1, 2, and 13-15 in the previous section.

1. A method of video processing, comprising: determining, for a conversion between a coded representation of a current block of a video and the current block, a motion vector difference (MVD) precision to be used for the conversion from a set of allowed multiple MVD precisions applicable to a video region containing the current video block; and performing the conversion based on the MVD precision.

2. The method of clause 1, wherein the set of allowed multiple MVD precisions depends on a picture, a slice, or a block of the video data.

3. The method of clause 1, wherein the set of allowed multiple MVD precisions depends on coded information of the current block.

4. The method of clause 1, wherein the set of allowed multiple MVD precisions is pre-defined.

5. The method of clause 1, wherein the set of allowed multiple MVD precisions is signaled in a Sequence Parameter Set (SPS), a Picture Parameter Set (PPS), a Video Parameter Set (VPS), a sequence header, a picture header, a slice header, a group of coding tree unit s (CTUs).

6. The method of clause 1, further comprising signaling a determined MVD precision from the set of allowed multiple MVD precision based on a number of allowed MV precisions for the current block.

7. The method of clause 1, wherein the determining of the MVD precision is based on one or more syntax elements, and wherein the current block is coded using an affine mode.

8. The method of clause 3 or 7, wherein same syntax elements are used to indicate the determined MVD precision from the set of allowed multiple MVD precisions applied to both the affine mode and a non-affine mode.

9. The method of clause 3, 7, or 8, wherein when the affine mode and the non-affine mode use a same set of the allowed multiple MVD precisions.

10. The method of clause 3, 7, or 8, wherein the affine coded blocks use a different set of the allowed multiple MVD precisions from that used in a non-affine mode.

11. The method of clause 10, wherein the different set having a same number of the allowed multiple MVD precisions as that used in the non-affine mode, the syntax elements used in the non-affine mode are reused in the affine mode.

12. The method of clause 10, wherein the different set has at least one MVD precision that is different from that used in the non-affine mode.

13. The method of clause 3, 7, or 8, wherein semantics of syntax elements used in the non-affine mode and the affine mode are different and the syntax elements have a same decoded value interpreted to different MVD precisions.

14. The method of clause 3, 7, or 8, wherein a number of the allowed multiple MVD precisions used in the affine mode is less than that used in a non-affine mode.

15. The method of clause 8, wherein one or more subsets of the syntax values for the non-affine mode are not valid in the affine mode.

16. The method of claim 8 or 14, wherein semantics of syntax elements used in the non-affine mode and the affine mode are different and the syntax elements with same value is interpreted to different MVD precisions.

17. The method of clause 3 or 7, wherein a number of the allowed multiple MVD precisions used in the affine mode is more than that used in a non-affine mode 18. The method of clause 17, wherein one or more syntax elements in the non-affine mode are extended to allow more values for the affine mode.

19. The method of clause 7, wherein an additional syntax element is used for processing the MVD precision of the affine mode, the additional syntax element being different from that used for processing the MVD precision of a non-affine mode.

20. The method of clause 7, wherein indication of the MVD precision for the affine mode is selectively signaled.

21. The method of clause 20, wherein indication of the MVD precision for the affine mode is signaled when MVDs for all control point motion vectors (CPMVs) are non-zero.

22. The method of clause 20, wherein indication of the MVD precision for the affine mode is signaled when MVDs for at least one CPMV is non-zero.

23. The method of clause 20, wherein indication of the MVD precision for the affine mode is signaled when MVD of one selected CPMV is non-zero.

24. The method of clause 20, wherein indication of the MVD precision for the affine mode is signaled when MVD of a first CPMV is non-zero.

25. The method of clause 20, wherein indication of the MVD precision for the affine mode is not signaled when one or more predetermined conditions are not satisfied.

26. The method of clause 7, wherein a syntax element for MVD precision indications associated with either the affine mode or a non-affine mode is coded with contexts that are dependent on coded information of the current block.

27. The method of clause 7, wherein a context selection of the syntax element for MVD precision indications associated with either the affine mode or a non-affine mode is dependent on whether the current block is coded with affine mode or not.

28. The method of clause 7, wherein one context is used for the syntax element for MVD precision indications for an affine coded block and another context is used for a non-affine coded block.

29. The method of clause 7, wherein a context for MVD precision indications is determined based on a size, shape, or MVD precisions of neighboring blocks, a temporal layer index, or prediction directions.

30. The method of clause 7, wherein whether to enable or disable a usage of the allowed multiple MVD precisions for the affine mode is signaled in a sequence parameter set (SPS), a picture parameter set (PPS), a video parameter set (VPS), a sequence header, a picture header, a slice header, or a group of coding tree units (CTUs).

31. The method of clause 7, wherein whether to enable or disable a usage of the allowed multiple MVD precisions for the affine mode depends on the one or more syntax elements.

32. The method of clause 7, wherein information whether to enable or disable a usage of the allowed multiple MVD precisions is signaled upon an enablement of the affine mode and is not signaled upon a disablement of the affine mode.

33. The method of any of clauses 7 to 32, wherein the one or more syntax elements are included at a slice level, a picture level, or sequence level.

34. The method of clause 5, 30, or 33, wherein the slice is replaced with a tile group or tile.

35. The method of any of clauses 1 to 34, wherein, in a VPS, SPS, PPS, slice header, or tile group header, a syntax element equal to 1 specifies a requirement to conform the coded representation, the requirement requiring that both of a first syntax element to indicate whether a first set of multiple MVD precisions is enabled for a non-affine mode and a second syntax element to indicate whether a second set of multiple MVD precisions is enabled for the affine-mode are 0.

36. The method of any of clauses 1 to 34, wherein a syntax element is signaled in a VPS, SPS, PPS, slice header, tile group header, or other video data units, 37. The method of clause 36, wherein the syntax element equal to 1 specifies a requirement to conform the coded representation, the requirement requiring that the syntax element to indicate whether multiple MVD precisions is enabled for the affine mode is equal to 0.

38. The method of any of clauses 7 to 37, wherein a motion vector predictor is utilized in a same MVD precision for affine coded blocks.

39. The method of any of clauses 7 to 37, wherein a final motion vector of the current block is utilized in a same MVD precision for affine coded blocks.

40. The method of any of clauses 1 to 39, wherein the performing of the conversion includes generating the coded representation from the current block.

41. The method of any of clauses 1 to 39, wherein the performing of the conversion includes generating the current block from the coded representation.

42. An apparatus in a video system comprising a processor and a non-transitory memory with instructions thereon, wherein the instructions upon execution by the processor, cause the processor to implement the method in any one of clauses 1 to 41.

43. A computer program product stored on a non-transitory computer readable media, the computer program product including program code for carrying out the method in any one of clauses 1 to 41.

The second set of clauses use some of the techniques described in the previous section, including, for example, items 3, 4, and 12 in the previous section.

1. A method of video processing, comprising: determining, for a video region comprising one or more video blocks of a video and a coded representation of the video, a usage of multiple motion vector difference (MVD) precisions for the conversion of the one or more video blocks in the video region; and performing the conversion based on the determining.

2. The method of clause 1, wherein the conversion of at least some of the one or more video blocks is based on affine mode coding.

3. The method of clause 1 or 2, wherein the usage is indicated in the coded representation including a Sequence Parameter Set (SPS), a Picture Parameter Set (PPS), a Video Parameter Set (VPS), a sequence header, a picture header, a slice header, or a group of coding tree units (CTUs)

4. The method of clause 3, wherein the usage is indicated depending on a syntax element used to indicate the MVD precisions.

5. A method of video processing, comprising: determining, for a video region comprising one or more video blocks of a video and a coded representation of the video, whether to apply an adaptive motion vector resolution (AMVR) process to a current video block for a conversion between the current video block and the coded representation of the video; and performing the conversion based on the determining.

6. A method of video processing, comprising: determining, for a video region comprising one or more video blocks of a video and a coded representation of the video, how to apply an adaptive motion vector resolution (AMVR) process to a current video block for a conversion between the current video block and the coded representation of the video; and performing the conversion based on the determining.

7. The method of clause 5 or 6, wherein the conversion of the current video block is based on affine mode coding.

8. The method of clause 7, wherein the determining depends on a reference picture of the current video block.

9. The method of clause 8, wherein, in a case that the reference picture is a current picture, the determining determines not to apply the AMVR process.

10. The method of clause 5 or 6, wherein the determining depends on whether an intra block copying (IBC) is applied to the current block or not.

11. The method of clause 10, wherein the determining determines to apply the AMVR process to the current block coded by the IBC.

12. the method of clause 11, wherein candidate MV (motion vector), MVD, or MVP (motion vector prediction) precisions for IBC coded blocks are different from those used for another video block not coded by the IBC.

13. the method of clause 11, wherein candidate MV (motion vector), MVD, or MVP (motion vector prediction) precisions for IBC coded blocks are different from those used for another video block coded with affine mode.

14. The method of any of clauses 1 to 13, wherein the performing of the conversion includes generating the coded representation from the current block.

15. The method of any of clauses 1 to 13, wherein the performing of the conversion includes generating the current block from the coded representation.

16. An apparatus in a video system comprising a processor and a non-transitory memory with instructions thereon, wherein the instructions upon execution by the processor, cause the processor to implement the method in any one of clauses 1 to 15.

17. A computer program product stored on a non-transitory computer readable media, the computer program product including program code for carrying out the method in any one of clauses 1 to 15.

The third set of clauses use some of the techniques described in the previous section, including, for example, items 5-10 and 13 in the previous section.

1. A method of video processing, comprising: determining, based on a coding mode of a parent coding unit of a current coding unit that uses an affine coding mode or a rate-distortion (RD) cost of the affine coding mode, a usage of an adaptive motion vector resolution (AMVR) for a conversion between a coded representation of a current block of a video and the current block; and performing the conversion according to a result of the determining.

2. The method of clause 1, wherein, in case that the coding mode of the parent coding unit is not AF_Inter mode or AF_MERGE mode, then the determining disables the usage of the AMVR for the current coding unit.

3. The method of clause 1, wherein, in case that the coding mode of the parent coding unit is not AF_Inter mode, then the determining disables the usage of the AMVR for the current coding unit.

4. The method of clause 1, wherein, in case that the RD of the affine coding mode is greater than a multiplication of a positive threshold and an RD cost of an advanced motion vector prediction (AMVP) mode, then the determining disables the usage of the AMVR for the current coding unit.

5. The method of clause 4, wherein the determination is applied for ¼-pel MV precision.

6. The method of clause 1, wherein, in case that a minimum RD cost is greater than a multiplication of a positive threshold and an RD cost of a merge mode, then the determining disables the usage of the AMVR for the current coding unit, wherein the minimum RD cost is a minimum of the RD cost of the affine coding mode and an RD cost of an advanced motion vector prediction (AMVP) mode.

7. The method of clause 6, wherein the determination is applied for ¼-pel MV precision.

8. A method of video processing, comprising: determining a usage of an adaptive motion vector resolution (AMVR) for a conversion between a coded representation of a current block of a video and the current block that uses an advanced motion vector prediction (AMVP) coding mode, the determining based on a rate-distortion (RD) cost of the AMVP coding mode; and performing the conversion according to a result of the determining.

9. The method of clause 8, wherein, in case that the RD cost of the AMVP coding mode is greater than a multiplication of a positive threshold and an RD cost of an affine mode, the determining disables the usage of the AMVR.

10. The method of clause 8, wherein the determination is applied for ¼-pel MV precision.

11. The method of clause 8, wherein, in case that a minimum RD cost is greater than a multiplication of a positive threshold and an RD cost of a merge mode, the determining disables the usage of the AMVR, and wherein the minimum RD cost is a minimum of an RD cost of an affine mode and an RD cost of the AMVP coding mode.

12. The method of clause 11, wherein the determination is applied for ¼-pel MV precision.

13. A method of video processing, comprising: generating, for a conversion between a coded representation of a current block of a video and the current block, a set of MV (Motion Vector) precisions using a 4-parameter affine model or 6-parameter affine model; and performing the conversion based on the set of MV precisions.

14. The method of clause 13, wherein the 4-parameter affine model or the 6-parameter affine model obtained in a single MV precision is used as a candidate start search point for other MV precisions.

15. The method of clause 14, wherein the single MV precision comprises 1/16 MV accuracy.

16. The method of clause 14, wherein the single MV precision comprises 1/4 MV accuracy.

17. A method of video processing, comprising: determining, based on a coding mode of a parent block of a current block that uses an affine coding mode, whether an adaptive motion vector resolution (AMVR) tool is used for a conversion, wherein the AMVR tool is used to refine motion vector resolution during decoding; and performing the conversion according to a result of the determining.

18. The method of clause 17, wherein, in case that the parent block of the current block is not the affine coding mode, the determining causes not to check the AMVR for the current block.

19. A method of video processing, comprising: determining, based on a usage of MV precisions for previous blocks that has been previously coded using an affine coding mode, a termination of a rate-distortion (RD) calculations of MV precisions for a current block that uses the affine coding mode for a conversion between a coded representation of the current block and the current block; and performing the conversion according to a result of the determining.

20. The method of clause 19, wherein the current block and the previous blocks are included in a current image segment and a previous image segment, respectively, and the current image segment and the previous image segments are pictures, slices, tiles, or CTU (Coding Tree Unit) rows.

21. The method of any of clauses 1 to 20, wherein the performing of the conversion includes generating the coded representation from the current block.

22. The method of any of clauses 1 to 20, wherein the performing of the conversion includes generating the current block from the coded representation.

23. An apparatus in a video system comprising a processor and a non-transitory memory with instructions thereon, wherein the instructions upon execution by the processor, cause the processor to implement the method in any one of clauses 1 to 22.

24. A computer program product stored on a non-transitory computer readable media, the computer program product including program code for carrying out the method in any one of claims 1 to 22.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
determining that a coding mode for a first video block is an affine inter mode or a non-affine inter mode;
determining, for motion information of the first video block, a motion precision from a motion precision set including multiple motion precisions; and
coding the first video block based on the determined coding mode and the determined motion precision;
wherein multiple syntax elements are selectively present in a video bitstream to indicate the motion precision in the motion precision set, and semantics of at least one syntax element of the multiple syntax elements are different in the non-affine inter mode and in the affine inter mode;
wherein the multiple syntax elements include a first syntax element and a second syntax element, whether the first syntax element for the first video block is present in the video bitstream based on motion vector differences (MVDs) of control point motion vectors of the first video block and at least one motion vector difference of at least one control point motion vectors of the first video block being non-zero, and the second syntax element is present in the video bitstream only in case that the first syntax element is present in the video bitstream with a specific value;
wherein the first syntax element is coded using context-based coding that includes a use of at least one context model and at least one context, wherein at least one same context model is used for the first syntax element of both blocks coded with the affine inter mode and blocks coded with the non-affine inter mode, and selection of context is dependent on whether the coding mode of the block is the affine inter mode or the non-affine inter mode; and
wherein the second syntax element is coded using context-based coding that includes a use of at least one context model and at least one context, wherein at least one same context model is used for the second syntax element of both blocks coded with the affine inter mode and blocks coded with the non-affine inter mode, and selection of context is dependent on whether the coding mode of the block is the affine inter mode or the non-affine inter mode.

2. The method of claim 1, wherein the coding includes encoding the first video block into the video bitstream.

3. The method of claim 1, wherein the coding includes decoding the first video block from the video bitstream.

4. The method of claim 1, wherein the first syntax element is not present in the video bitstream based on at least one condition being satisfied:
motion vector differences (MVDs) of all control point motion vectors of the first video block being zero;
multiple MVD precisions for affine inter coded blocks being disabled.

5. The method of claim 1, wherein the motion vector differences (MVDs) of control point motion vectors of the first video block comprises an MVD in each valid prediction direction for each control point motion vector, wherein when both a horizontal component and a vertical component of the MVD are zero, the MVD is a zero MVD.

6. The method of claim 1, wherein the motion precision for the first block is a first motion precision which is a default precision, in respond to the first syntax element being not present in the video bitstream or the first syntax element being equal to zero.

7. The method of claim 6, wherein the first motion precision is ¼ luma sample.

8. The method of claim 1, wherein the second syntax element is present in the video bitstream based on at least one condition being satisfied:
the first syntax element being equal to non-zero;
the coding mode of the first video block being the affine inter mode.

9. The method of claim 1, wherein the second syntax element is equal to zero corresponding to the motion precision being 1/16 luma sample, and is equal to non-zero corresponding to the motion precision being integer luma sample.

10. The method of claim 1, wherein the semantics of at least one syntax element of the multiple syntax elements are different in the non-affine inter mode and in the affine inter mode comprises: a same value of the second syntax element indicates different motion precisions for blocks coded with the affine inter mode and for blocks coded with the non-affine inter mode.

11. The method of claim 1, wherein the second syntax element is selectively present in a video bitstream to indicate a motion precision in a motion precision set for a block coded with an intra block copy mode, wherein the first syntax element is skipped for the block coded with the intra block copy mode.

12. The method of claim 1, wherein the motion information of the first video block comprises at least one of a motion vector difference (MVD), motion vector predictor (MVP) and motion vector (MV).

13. A video processing apparatus comprising a processor and a non-transitory memory with instructions thereon, wherein the instructions upon execution by the processor, cause the processor to:
determine that a coding mode for a first video block is an affine inter mode or a non-affine inter mode;
determine, for motion information of the first video block, a motion precision from a motion precision set including multiple motion precisions; and
code the first video block based on the determined coding mode and the determined motion precision;

wherein multiple syntax elements are selectively present in a video bitstream to indicate the motion precision in the motion precision set, and semantics of at least one syntax element of the multiple syntax elements are different in the non-affine inter mode and in the affine inter mode;

wherein the multiple syntax elements include a first syntax element and a second syntax element, whether the first syntax element for the first video block is present in the video bitstream based on motion vector differences (MVDs) of control point motion vectors of the first video block and at least one motion vector difference of at least one control point motion vectors of the first video block being non-zero, and the second syntax element is present in the video bitstream only in case that the first syntax element is present in the video bitstream with a specific value;

wherein the first syntax element is coded using context-based coding that includes a use of at least one context model and at least one context, wherein at least one same context model is used for the first syntax element of both blocks coded with the affine inter mode and blocks coded with the non-affine inter mode, and selection of context is dependent on whether the coding mode of the block is the affine inter mode or the non-affine inter mode; and wherein the second syntax element is coded using context-based coding that includes a use of at least one context model and at least one context, wherein at least one same context model is used for the second syntax element of both blocks coded with the affine inter mode and blocks coded with the non-affine inter mode, and selection of context is dependent on whether the coding mode of the block is the affine inter mode or the non-affine inter mode.

14. The apparatus of claim 13, wherein the coding includes encoding the first video block into the video bitstream.

15. The apparatus of claim 13, wherein the coding includes decoding the first video block from the video bitstream.

16. The apparatus of claim 13, wherein the second syntax element is equal to zero corresponding to the motion precision being 1/16 luma sample, and is equal to non-zero corresponding to the motion precision being integer luma sample.

17. A non-transitory computer-readable storage medium storing instructions that cause a processor to:
  determine that a coding mode for a first video block is an affine inter mode or a non-affine inter mode;
  determine, for motion information of the first video block, a motion precision from a motion precision set including multiple motion precisions; and
  code the first video block based on the determined coding mode and the determined motion precision;
  wherein multiple syntax elements are selectively present in a video bitstream to indicate the motion precision in the motion precision set, and semantics of at least one syntax element of the multiple syntax elements are different in the non-affine inter mode and in the affine inter mode;
  wherein the multiple syntax elements include a first syntax element and a second syntax element, whether the first syntax element for the first video block is present in the video bitstream based on motion vector differences (MVDs) of control point motion vectors of the first video block and at least one motion vector difference of at least one control point motion vectors of the first video block being non-zero, and the second syntax element is present in the video bitstream only in case that the first syntax element is present in the video bitstream with a specific value, and
  wherein the first syntax element is coded using context-based coding that includes a use of at least one context model and at least one context, wherein at least one same context model is used for the first syntax element of both blocks coded with the affine inter mode and blocks coded with the non-affine inter mode, and selection of context is dependent on whether the coding mode of the block is the affine inter mode or the non-affine inter mode; and
  wherein the second syntax element is coded using context-based coding that includes a use of at least one context model and at least one context, wherein at least one same context model is used for the second syntax element of both blocks coded with the affine inter mode and blocks coded with the non-affine inter mode, and selection of context is dependent on whether the coding mode of the block is the affine inter mode or the non-affine inter mode.

18. The non-transitory computer-readable storage medium of claim 17, wherein the second syntax element is equal to zero corresponding to the motion precision being 1/16 luma sample, and is equal to non-zero corresponding to the motion precision being integer luma sample; and
  wherein the motion information of the first video block comprises at least one of a motion vector difference (MVD), motion vector predictor (MVP) and motion vector (MV).

19. A method for storing a video bitstream comprises:
  determining that a coding mode for a first video block is an affine inter mode or a non-affine inter mode;
  determining, for motion information of the first video block, a motion precision from a motion precision set including multiple motion precisions; and
  encoding the first video block into the video bitstream based on the determined coding mode and the determined motion precision; and
  storing the video bitstream in a non-transitory computer-readable recording medium;
  wherein multiple syntax elements are selectively present in the video bitstream to indicate the motion precision in the motion precision set, and semantics of at least one syntax element of the multiple syntax elements are different in the non-affine inter mode and in the affine inter mode;
  wherein the multiple syntax elements include a first syntax element and a second syntax element, whether the first syntax element for the first video block is present in the video bitstream based on motion vector differences (MVDs) of control point motion vectors of the first video block and at least one motion vector difference of at least one control point motion vectors of the first video block being non-zero, and the second syntax element is present in the video bitstream only in case that the first syntax element is present in the video bitstream with a specific value, and
  wherein the first syntax element is coded using context-based coding that includes a use of at least one context model and at least one context, wherein at least one same context model is used for the first syntax element of both blocks coded with the affine inter mode and blocks coded with the non-affine inter mode, and selection of context is dependent on whether the coding mode of the block is the affine inter mode or the non-affine inter mode; and wherein the second syntax element is coded using context-based coding that includes a use of at least one context model and at least one context, wherein at least one same context model is used for the second syntax element of both blocks coded with the affine inter mode and blocks coded with the non-affine inter mode, and selection of context is dependent on whether the coding mode of the block is the affine inter mode or the non-affine inter mode.

20. The method of claim 19, wherein the second syntax element is equal to zero corresponding to the motion precision being 1/16 luma sample, and is equal to non-zero corresponding to the motion precision being integer luma sample; and wherein the motion information of the first video block comprises at least one of a motion vector difference (MVD), motion vector predictor (MVP) and motion vector (MV).

* * * * *